United States Patent
Ichikawa et al.

(10) Patent No.: US 8,973,759 B2
(45) Date of Patent: Mar. 10, 2015

(54) SIEVING DEVICE, SIEVING DEVICE FOR DEVELOPING DEVICE, AND POWDER-CHARGING DEVICE

(75) Inventors: Hideo Ichikawa, Shizuoka (JP); Kaori Ozeki, Shizuoka (JP); Tatsushi Umayahara, Shizuoka (JP); Takashi Ono, Shizuoka (JP); Masayoshi Suzuki, Shizuoka (JP); Teruo Shibata, Shizuoka (JP); Keiichi Yano, Shizuoka (JP); Masato Suzuki, Shizuoka (JP); Eiichi Masushio, Shizuoka (JP); Hiroshi Sano, Shizuoka (JP); Yusuke Uchida, Shizuoka (JP); Junji Yamabe, Shizuoka (JP); Seiji Terazawa, Shizuoka (JP); Masashi Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/418,970

(22) Filed: Mar. 13, 2012

(65) Prior Publication Data

US 2012/0234735 A1    Sep. 20, 2012

(30) Foreign Application Priority Data

Mar. 17, 2011 (JP) ................................. 2011-059483
Jan. 18, 2012 (JP) ................................. 2012-008301
Jan. 18, 2012 (JP) ................................. 2012-008313
Jan. 23, 2012 (JP) ................................. 2012-011246

(51) Int. Cl.
  *G03G 15/08* (2006.01)
  *B07B 1/06* (2006.01)
  *B07B 1/55* (2006.01)

(Continued)

(52) U.S. Cl.
  CPC ... *B07B 1/06* (2013.01); *B07B 1/55* (2013.01); *B07B 4/08* (2013.01); *B07B 13/16* (2013.01); *B65G 65/48* (2013.01);

(Continued)

(58) Field of Classification Search
  CPC .......... G03G 15/0889; G03G 15/0891; G03G 15/0893; B07B 1/20
  USPC .......... 399/252–263; 209/245, 254, 255, 262, 209/389
  See application file for complete search history.

(56) References Cited

U.S. PATENT DOCUMENTS 172,693 A * 1/1876 Blair .............................. 209/283
3,536,043 A * 10/1970 Eppe et al. .................... 399/292

(Continued)

FOREIGN PATENT DOCUMENTS

CN    1952256    4/2007
DE    3138430    8/1982

(Continued)

OTHER PUBLICATIONS

Chinese official action dated Aug. 2, 2013 and English translation in connection with corresponding Chinese patent application No. 201210230106.1.

(Continued)

*Primary Examiner* — Jeremy R Severson
(74) *Attorney, Agent, or Firm* — Cooper & Dunham LLP

(57) ABSTRACT

A sieving device including a hollow cylindrical body, a filter disposed at a bottom portion of the hollow cylindrical body, and a blade configured to rotate in close proximity to the filter around a rotation axis thereof crossing the filter to thereby stir powder supplied to the hollow cylindrical body.

13 Claims, 48 Drawing Sheets

(51) Int. Cl.
*B07B 4/08* (2006.01)
*B07B 13/16* (2006.01)
*B65G 65/48* (2006.01)
*G03G 9/08* (2006.01)

(52) U.S. Cl.
CPC ............ *B65G 65/4809* (2013.01); *G03G 9/08* (2013.01); *G03G 9/0817* (2013.01)
USPC .......................................... 209/254; 399/253

(56) References Cited

U.S. PATENT DOCUMENTS

| | | | |
|---|---|---|---|
| 4,595,277 A | 6/1986 | Maczuszenko et al. | |
| 5,345,297 A * | 9/1994 | Katakabe et al. | 399/263 |
| 5,435,444 A * | 7/1995 | Satomi | 209/234 |
| 5,455,662 A | 10/1995 | Ichikawa et al. | |
| 5,489,976 A | 2/1996 | Ichikawa | |
| 5,500,719 A | 3/1996 | Ichikawa et al. | |
| 5,627,631 A | 5/1997 | Ichikawa et al. | |
| 5,653,346 A * | 8/1997 | Frei et al. | 209/254 |
| 5,655,195 A | 8/1997 | Ichikawa et al. | |
| 5,740,507 A | 4/1998 | Ichikawa et al. | |
| 5,822,663 A | 10/1998 | Ichikawa et al. | |
| 5,918,090 A | 6/1999 | Ichikawa et al. | |
| 6,075,963 A | 6/2000 | Ichikawa et al. | |
| 6,088,561 A | 7/2000 | Kawamura et al. | |
| 6,289,195 B1 | 9/2001 | Ichikawa et al. | |
| RE37,542 E | 2/2002 | Ichikawa et al. | |
| 6,418,293 B2 | 7/2002 | Ichikawa et al. | |
| 6,424,812 B1 * | 7/2002 | Hsu | 399/262 |
| 6,701,112 B2 | 3/2004 | Kusano et al. | |
| 6,751,431 B2 | 6/2004 | Ichikawa et al. | |
| 6,854,493 B2 | 2/2005 | Ichikawa et al. | |
| 6,901,230 B2 | 5/2005 | Ichikawa et al. | |
| 6,907,214 B2 | 6/2005 | Kusano et al. | |
| 7,149,462 B2 | 12/2006 | Kawamura et al. | |
| 7,313,349 B2 | 12/2007 | Suzuki et al. | |
| 7,505,718 B2 | 3/2009 | Kawamura et al. | |
| 7,702,262 B2 | 4/2010 | Taguchi et al. | |
| 7,706,699 B2 | 4/2010 | Taguchi et al. | |
| 7,721,895 B2 * | 5/2010 | Mueller et al. | 209/306 |
| 7,822,371 B2 | 10/2010 | Taguchi et al. | |
| 7,853,184 B2 | 12/2010 | Taguchi et al. | |
| 7,991,334 B2 | 8/2011 | Taguchi et al. | |
| 8,050,597 B2 | 11/2011 | Yoshizawa et al. | |
| 8,126,375 B2 | 2/2012 | Taguchi et al. | |
| 8,586,275 B2 * | 11/2013 | Akiyama et al. | 430/110.4 |
| 2007/0274740 A1 * | 11/2007 | Katoh et al. | 399/254 |
| 2009/0206008 A1 | 8/2009 | Makino et al. | |
| 2010/0124443 A1 * | 5/2010 | Ohmura et al. | 399/254 |
| 2010/0284710 A1 | 11/2010 | Sasaki et al. | |
| 2011/0038647 A1 | 2/2011 | Kawamura et al. | |
| 2013/0216269 A1 * | 8/2013 | Yamabe et al. | 399/258 |
| 2013/0216270 A1 * | 8/2013 | Yamabe et al. | 399/258 |
| 2013/0216271 A1 * | 8/2013 | Yamabe et al. | 399/258 |

FOREIGN PATENT DOCUMENTS

| | | |
|---|---|---|
| DE | 102006014234 A1 | 4/2007 |
| DE | 102008038645 A1 | 2/2010 |
| DE | 102009019664 A1 | 11/2010 |
| EP | 0807865 A2 | 11/1997 |
| GB | 20016 | 0/1913 |
| JP | 59-37157 | 10/1984 |
| JP | 59-210462 | 11/1984 |
| JP | 2-78147 | 6/1990 |
| JP | 5-127531 | 5/1993 |
| JP | 2000-15127 | 1/2000 |
| JP | 2000-338785 | 12/2000 |
| JP | 2000338785 A * | 12/2000 |
| JP | 2004-264510 | 9/2004 |
| JP | 2006-23782 | 1/2006 |
| JP | 4001309 | 8/2007 |
| JP | 2009-90167 | 4/2009 |

OTHER PUBLICATIONS

European Search Report dated Nov. 3, 2014 in corresponding European patent application No. 12 15 9721.5.

* cited by examiner

SIEVING DEVICE, SIEVING DEVICE FOR DEVELOPING DEVICE, AND POWDER-CHARGING DEVICE

BACKGROUND OF THE INVENTION

1. Field of the Invention

The present invention relates to sieving coarse particles from powder using a filter.

2. Description of the Related Art

Conventionally, a method for visualizing image information using a toner has been utilized in various fields. For example, in an image forming apparatus employing electrophotography, image information is visualized as follows. Specifically, a latent electrostatic image is formed on a photoconductor based on image information and developed with a developer containing a toner to form a toner image, which is then transferred and fixed on a paper sheet.

In recent years, small-particle-diameter toners have been used as the toner used in an image forming apparatus, in order to obtain high-quality images. Such toners may contain coarse particles in the production process. Alternatively, they may contain coarse particles which formed through loose aggregation caused during storage under high-temperature, high-humidity conditions. The toner containing such coarse particles cannot accurately develop a toner image based on image data.

In view of this, a sieving device has been used for sieving coarse particles contained in toner. One known sieving device which sieves coarse particles from toner is an ultrasonic sieve (see Japanese Patent Application Laid-Open (JP-A) No. 2006-23782). The ultrasonic sieve is configured to vibrate a filter with ultrasonic waves to thereby sieve coarse particles contained in toner. However, sieving by the ultrasonic sieve causes the following problems: filter clogging caused by softening of the toner due to frictional heat generated by vibrating the filter; and expansion of the openings of the filter due to stress applied by the vibration.

In view of this, there has been proposed a sieving device for sieving coarse particles from powder without vibrating a filter (see JP-A No. 2009-90167). This sieving device contains: a rotary shaft disposed in a predetermined direction; a cylindrical sieve disposed axially to the rotary shaft; and a rotary blade attached to the rotary shaft. This can sieve powder without vibrating the sieve according to the following mechanism: the rotary blade is rotated to feed powder, which has been supplied from upstream, from the inner region to the outer region of the cylindrical sieve.

However, the sieving device containing the cylindrical sieve requires a large space for collecting the powder having passed through the sieve, since it has the above-described mechanism of feeding the powder from the inner region to the outer region of the cylindrical sieve. That is, use of the cylindrical sieve problematically enlarges the sieving device.

Also, when the sieving device containing the cylindrical sieve is mounted in an image forming apparatus for sieving coarse particles from toner supplied from a developing device of the image forming apparatus, the image forming apparatus is problematically enlarged.

Furthermore, when the sieving device containing the cylindrical sieve is mounted in a powder-charging device for charging powder into a predetermined container, the powder-charging device is problematically enlarged.

SUMMARY OF THE INVENTION

An object of the present invention is to provide a sieving device which requires no large space for collecting the powder having passed through the filter and prevents enlargement of an apparatus in which the sieving device is to be mounted.

Another object of the present invention is to provide an image forming apparatus which is prevented from enlarging and contains a sieving device containing a cylindrical sieve for sieving coarse particles from toner supplied from a developing device thereof.

Still another object of the present invention is to provide a powder-charging device for charging powder into a predetermined container, which apparatus is prevented from enlarging and contains a sieving device containing a cylindrical sieve.

Means for solving the above existing problems are as follows.

A sieving device of the present invention includes:
a hollow cylindrical body;
a filter disposed at a bottom portion of the hollow cylindrical body, and
a blade configured to rotate in close proximity to the filter around a rotation axis thereof crossing the filter to thereby stir powder supplied to the hollow cylindrical body.

A sieving device for developing device of the present invention includes:
a sieve main body which includes: a hollow cylindrical body; a filter disposed at a bottom portion of the hollow cylindrical body; and a blade configured to rotate in close proximity to the filter around a rotation axis thereof crossing the filter to thereby stir toner supplied to the hollow cylindrical body; and
a feeding unit connected to a developing device for developing a latent electrostatic image and configured to feed, to the developing device, the toner which has passed through the filter by rotation of the blade.

A powder-charging device of the present invention includes:
a sieve main body which includes: a hollow cylindrical body; a filter disposed at a bottom portion of the hollow cylindrical body; and a blade configured to rotate in close proximity to the filter around a rotation axis thereof crossing the filter to thereby stir powder supplied to the hollow cylindrical body; and
a feeding unit configured to feed, to a predetermined container, the powder which has passed through the filter by rotation of the blade.

The sieving device of the present invention contains the blade that is disposed rotatably around the rotation axis thereof crossing the filter and is disposed in close proximity to the filter. The powder passing through the filter is mainly moved in the direction of the rotation axis of the blade. Thus, the sieving device does not require a large space for collecting the powder having passed through the filter. The sieving device of the present invention uses the above-described blade and thus can be prevented from enlargement.

The sieving device for developing device of the present invention contains the blade that rotates in close proximity to the filter around the rotation axis thereof crossing the filter. The powder passing through the filter is mainly moved in the direction of the rotation axis of the blade. Thus, the sieving device does not require a large space for collecting the powder having passed through the filter. The sieving device for developing device of the present invention uses the above-described blade and thus can prevent enlargement of an image forming apparatus in which it is to be mounted.

The powder-charging device of the present invention contains the blade that rotates in close proximity to the filter around the rotation axis thereof crossing the filter. With this configuration, the powder passing through the filter is mainly moved in the direction of the rotation axis of the blade. Thus, the powder-charging device does not require a large space for collecting the powder having passed through the filter. The powder-charging device of the present invention uses the above-described blade and thus can prevent enlargement of an image forming apparatus in which it is to be mounted.

DETAILED DESCRIPTION OF THE INVENTION (Sieving Device)

A sieving device of the present invention includes:
a hollow cylindrical body;
a filter disposed at a bottom portion of the hollow cylindrical body, and
a blade configured to rotate in close proximity to the filter around a rotation axis thereof crossing the filter to thereby stir powder supplied to the hollow cylindrical body.

If necessary, the sieving device of the present invention further includes other units or members.
[Embodiment No. 1]
<Entire Configuration of Sieving Device According to Embodiment No. 1>

Figure 1:
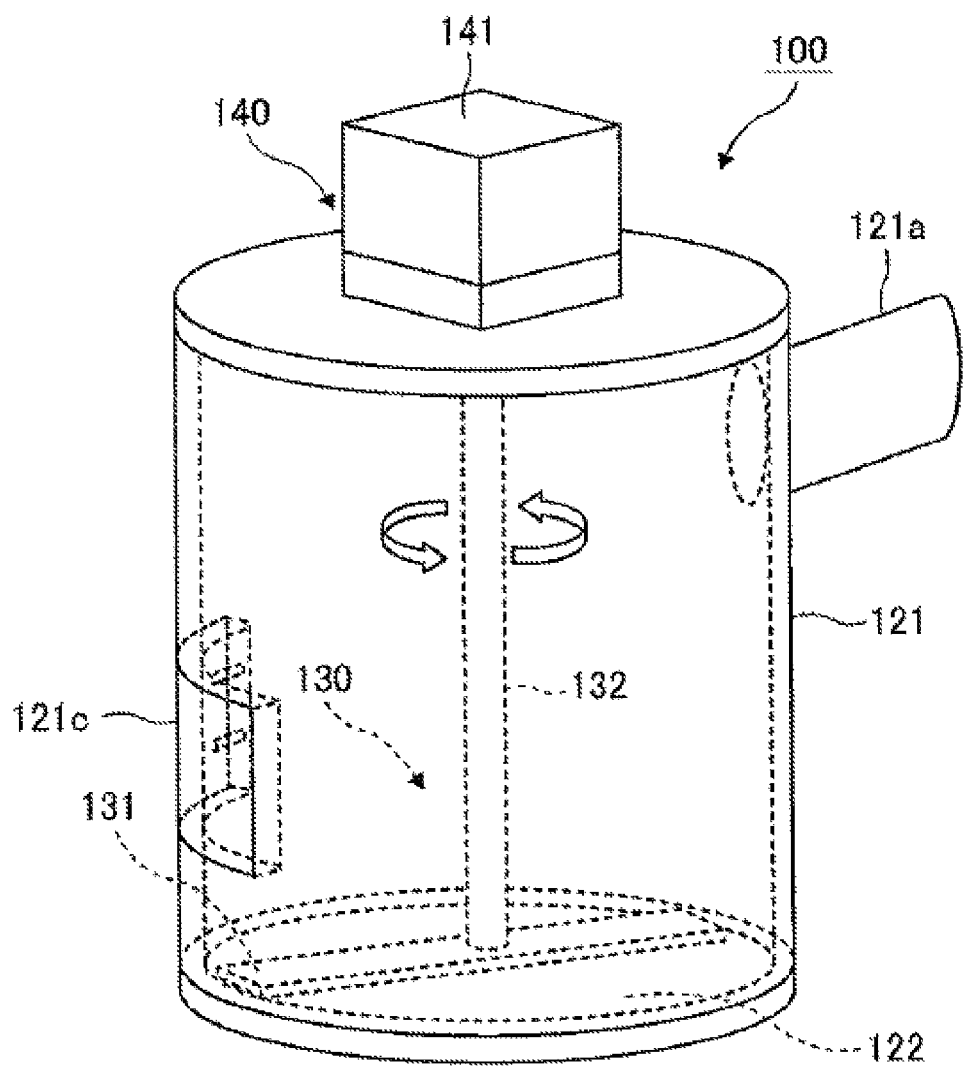
FIG. 1 is a perspective view of a sieving device according to embodiment No. 1 of the present invention.
Figure 2:
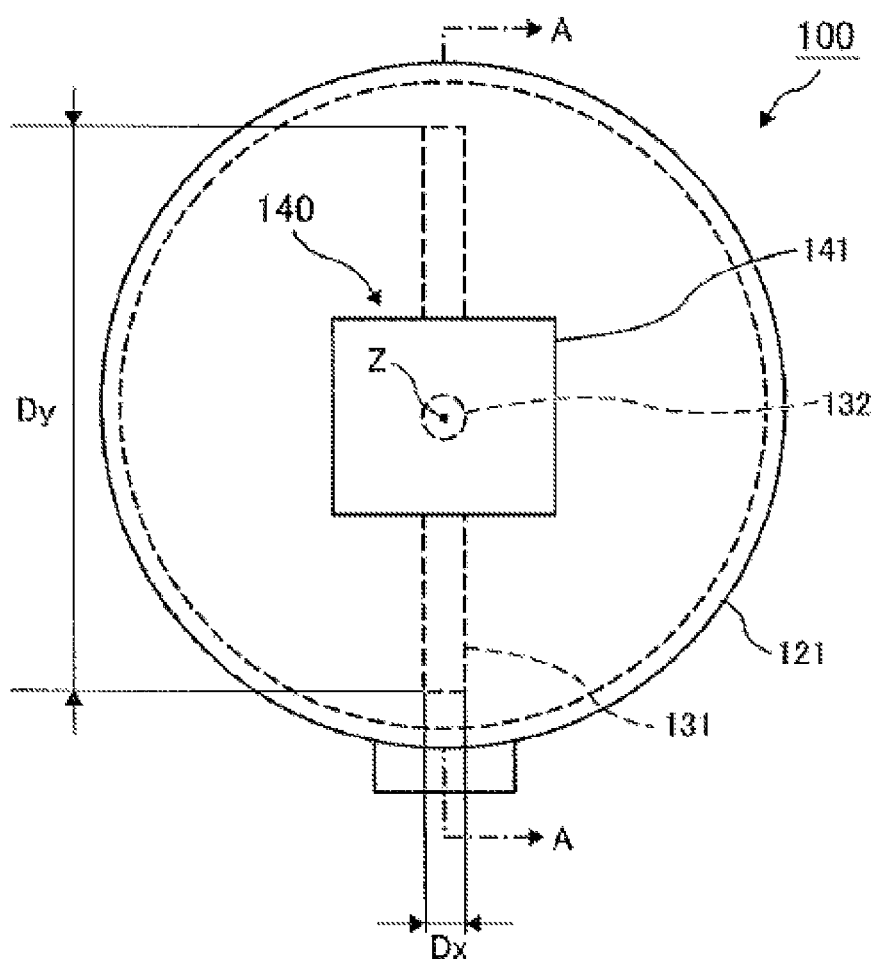
FIG. 2 is a plan view of the sieving device illustrated in FIG. 1.
Figure 3:
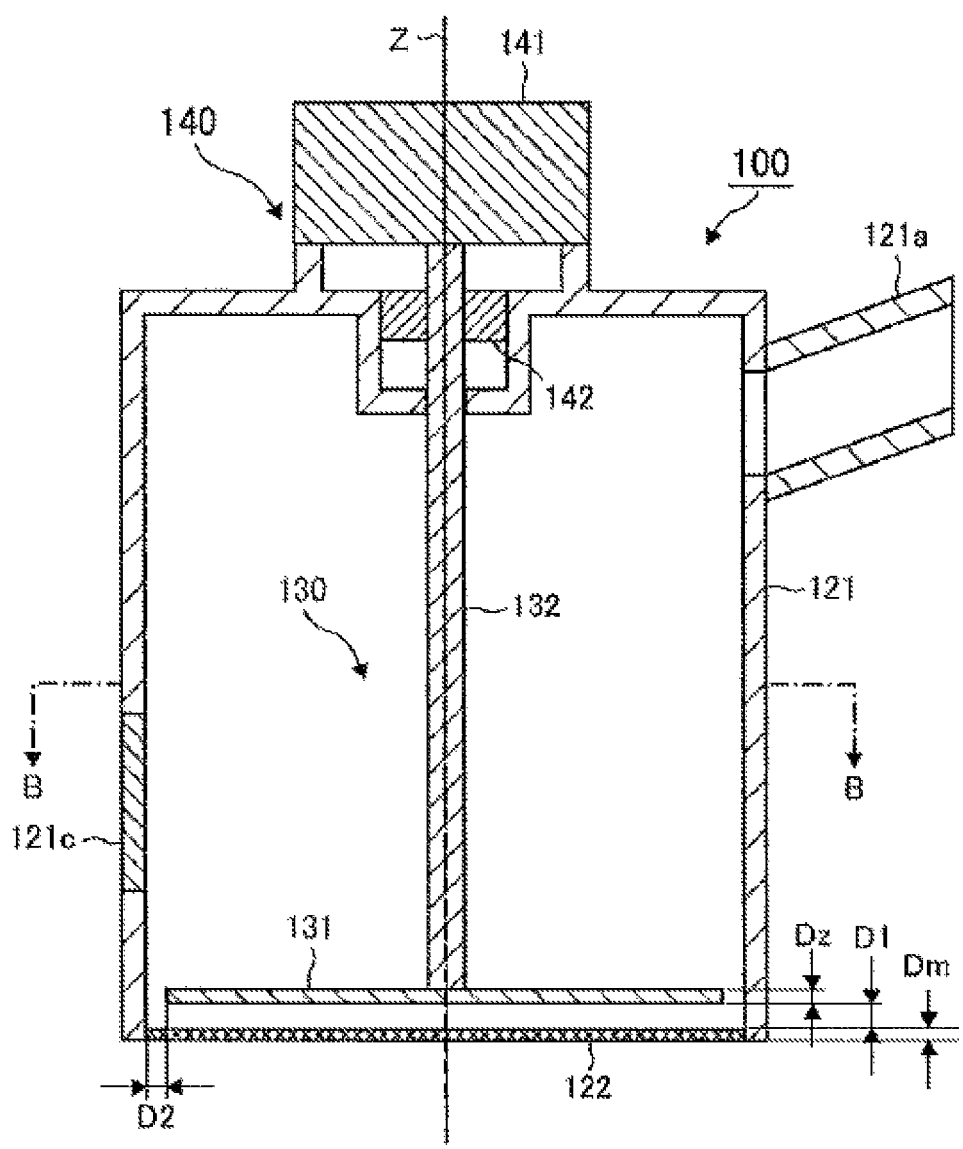
FIG. 3 is a cross-sectional view of the sieving device illustrated in FIG. 2 taken along line A-A.
Figure 4:
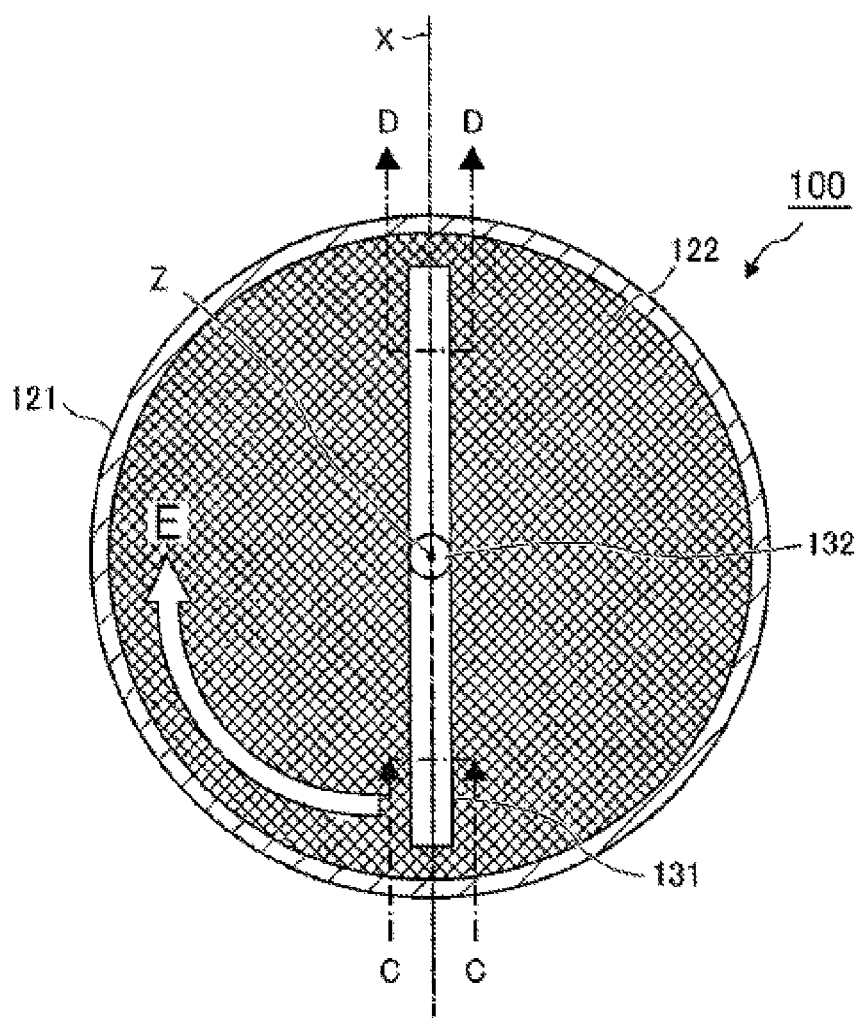
FIG. 4 is a cross-sectional view of the sieving device illustrated in FIG. 3 taken along line B-B.
Figure 7:
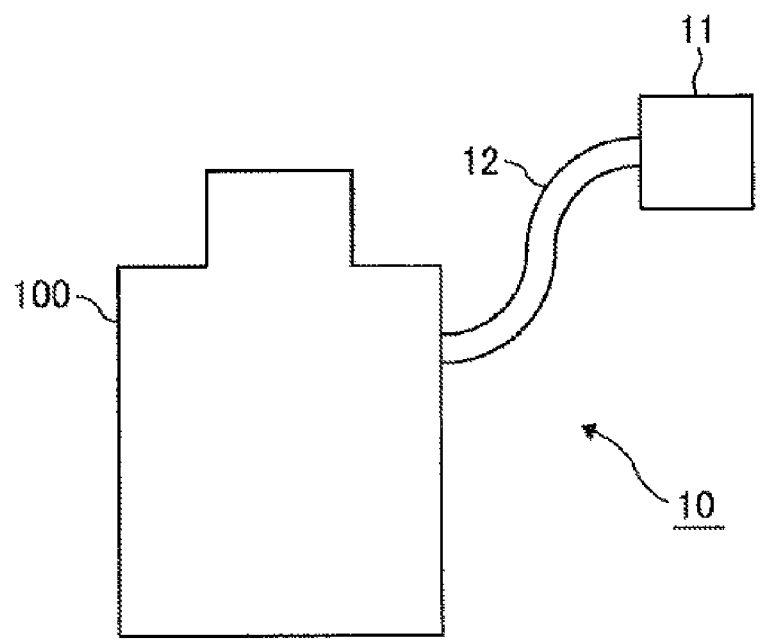
FIG. 7 is a schematic view of one exemplary sieving system.
Figure 8:
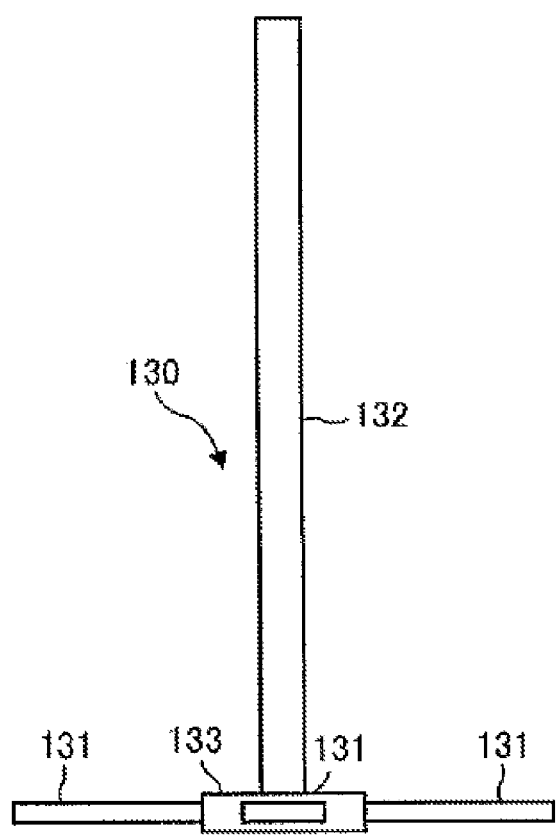
FIG. 8 is an elevational view of a rotator having three blades.
Figure 9:
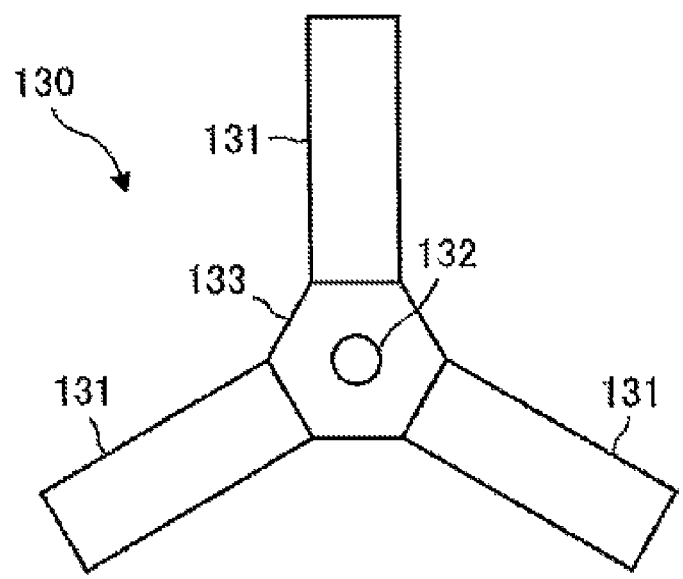
FIG. 9 is a plan view of the rotator illustrated in FIG. 8.
Figure 10:
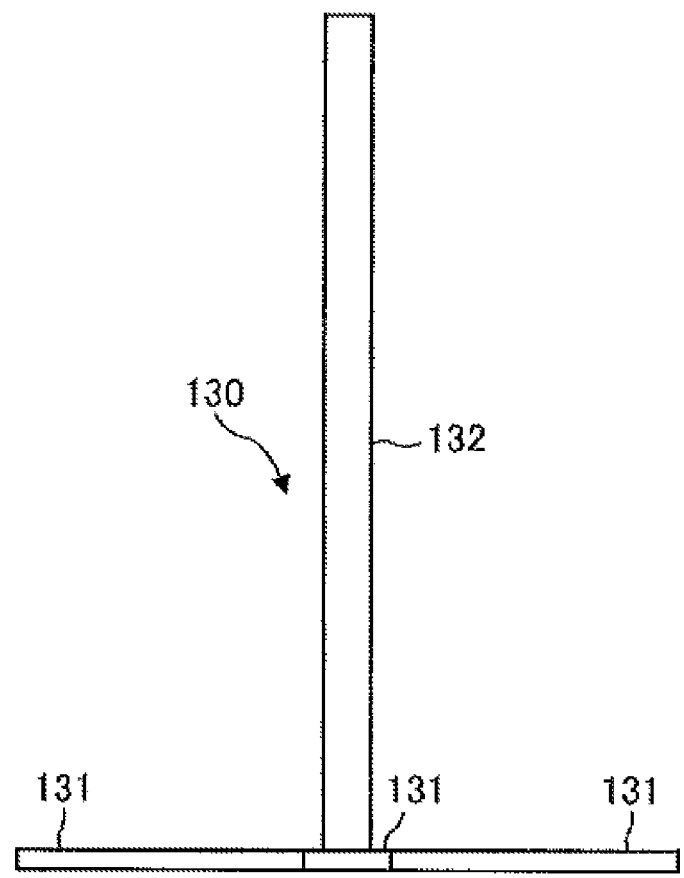
FIG. 10 is an elevational view of a rotator having four blades.
Figure 11:
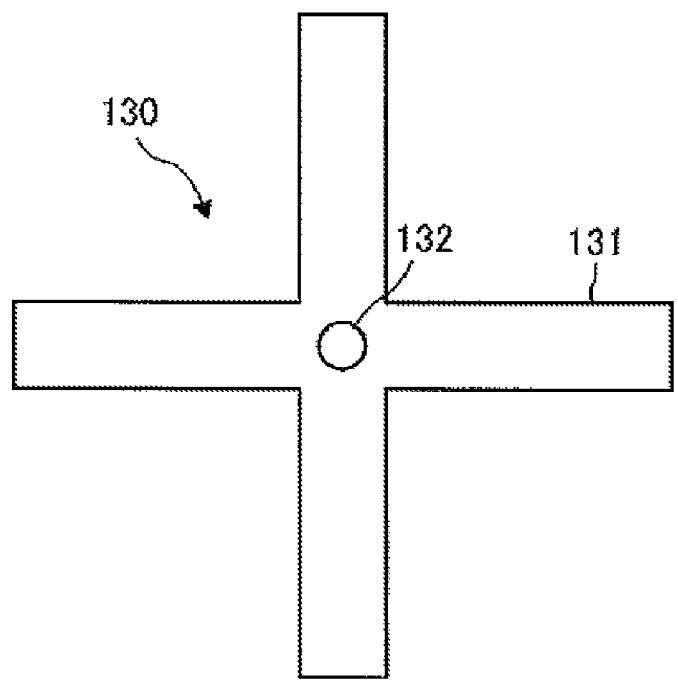
FIG. 11 is a plan view of the rotator illustrated in FIG. 10.

Referring now to drawings, a sieving device according to embodiment No. 1 of the present invention will be described. First, the entire configuration of the sieving device according to the embodiment No. 1 is described with reference to FIGS. 1 to 11. FIG. 1 is a perspective view of a sieving device according to the embodiment No. 1 of the present invention. FIG. 2 is a plan view of the sieving device illustrated in FIG. 1. FIG. 3 is a cross-sectional view of the sieving device illustrated in FIG. 2 taken along line A-A. FIG. 4 is a cross-sectional view of the sieving device illustrated in FIG. 3 taken along line B-B. FIGS. 5A to 5J each illustrate a cross-sectional view of the blade of the sieving device illustrated in FIG. 4 taken along line C-C. FIGS. 6A to 6J each illustrate a cross-sectional view of the blade of the sieving device illustrated in FIG. 4 taken along line D-D. FIG. 7 is a schematic view of one exemplary sieving system. FIG. 8 is an elevational view of a rotator having three blades. FIG. 9 is a plan view of the rotator illustrated in FIG. 8. FIG. 10 is an elevational view of a rotator having four blades. FIG. 11 is a plan view of the rotator illustrated in FIG. 10.

A sieving device 100 includes a frame 121 as an example of the hollow cylindrical body, a filter 122 disposed at a bottom portion of the frame 121, a rotator 130, a driving unit 140, and, if necessary, further includes suitably selected other units and members. The sieving device 100 serves as a container that accommodates powder (also called "powdery, particulate material" in some technical fields), which is supplied to the frame 121. In addition, the sieving device 100 serves to screen out coarse particles from the toner supplied to the frame 121. Typically, the sieving device 100 is preferably used with it being disposed vertically, but may be inclined.

<<Frame>>

The shape of the frame 121 may be suitably selected depending on the intended purpose without any restriction. Examples thereof include cylinder, circular truncated cone, prism, truncated pyramid, and hopper-shape. The size of the frame 121 is suitably selected depending on the intended purpose without any restriction. For example, the inner diameter may be 10 mm to 300 mm, preferably 16 mm to 135 mm. Examples of the material of the frame 121 include metals such as stainless steel, aluminum, and iron; resins such as ABS, FRP, polyester resins and polypropylene resins. The frame 121 may be composed of a single member or two or more members. In the frame 121, the end opposite to the filter 122 may be opened, or closed to prevent scattering of the powder.

A supplying portion 121a is mounted on at least a part of the side surface, end surface, or top surface of the frame 121. The supplying portion 121a supplies the powder into the frame 121. The size, shape and structure of the supplying portion 121a are suitably selected depending on the size, shape and structure of the supplying portion 121a without any restriction, provided that the supplying portion 121a can supply the powder into the frame 121.

The powder is supplied to the upper surface of the filter 122 through the supplying portion 121a by means of a hand or a powder-supplying device 11 such as a hopper or a pump for transporting powder. When the powder-supplying device 11 is used, it is connected to the sieving device 100 through, for example, a hose 12 which allows the passage of the powder as shown in FIG. 7. The sieving system 10 is thus composed of the powder-supplying device 11 and the sieving device 100. The shape and the size of the powder-supplying device 11 are suitably selected depending on the intended purpose without any restriction. The powder-supplying device 11 may supply the sieving device 100 with the powder intermittently or continuously. When the powder-supplying device supplies the sieving device 100 with the powder continuously, the sieving device 100 can be operated continuously.

The frame 121 contains a cleaning (recovering) door 121c which allows an opening to be open or closed. The opening is used for recovering the powder contained in the sieving device 100. The cleaning door 121c is mounted to the frame 121 with hinges so as to be openable or closable. When the operation of the sieving device 100 is terminated, the filter 122 can be cleaned by opening the cleaning door 121c and then by collecting coarse particles left on the filter 122.

<<Filter>>

The filter 122 is suitably selected depending on the intended purpose without any restriction, provided that coarse particles in the powder supplied to the sieving device 100 can be screened out. Examples of the applicable form of the filter 122 include net-like forms such as one in which lines are intersected at right angle with each other, one in which lines are intersected at oblique angles, one with meandering geometry and one with turtle shell-like or honeycomb geometry; forms where empty spaces are formed three-dimensionally, such as nonwoven fabric; and forms through which coarse particles cannot substantially pass, such as porous materials and hollow fibers. Among these, filters in the form of net are preferably used as the filter 122 in terms of satisfactory sieving efficiency.

The outer shape of the filter 122 may be suitably selected depending on the intended purpose without any restriction. Examples thereof include circular, ellipsoidal, triangular, quadrangular, pentagonal, hexagonal, and octagonal. Among these, circular filters are particularly preferable in terms of satisfactory sieving efficiency. When sieving is carried out in a multi-step, filters with different openings may be arranged in series as the filter 122.

The opening of the filter 122 may be suitably selected depending on the particle diameter of the powder and is preferably 10 µm or more, more preferably 15 µm or more, still more preferably 20 µm or more. If the filter 122 has a too small opening, it tends to have decreased performance per hour. Thus, it may be difficult to obtain the powder with desired particle diameters efficiently. In addition, filters tend to be clogged. The "opening of the filter 122" refers to the size of the apertures or open pores of the filter 122. When the open pore is circular, it refers to the diameter thereof and when the open pore is polygonal, it refers to the diameter of the inscribed circle. The upper limit of the opening of the filter 122 is not particularly limited, but the opening of the filter 122 is preferably 5 mm or less. When the opening of the filter is greater than 5 mm, the openings of the filter 122 cannot be bridged with the powder upon the termination of the rotation of the blade 131 and the sifted powder sometimes continues to be discharged.

The material of the filter 122 may be suitably selected depending on the intended purpose without any restriction. Examples thereof include metals such as stainless steel, aluminum, and iron; resins such as polyamide resins (e.g., nylon), polyester resins, polypropylene resins, and acryl resins; and natural fibers such as cotton. Among these, stainless steel and polyester resins are particularly preferable in terms of excellent durability after use for long hours.

When filters made of resins are used in conventional ultrasonic sieving, the vibrations of the filter cannot be efficiently conveyed due to its elasticity. The conventional sieving device that includes a cylindrical sieve works in such a way that powder is allowed to move from the inner region to the outer region of the sieve due to the centrifugal force. Thus, use of filters made of resins results in poor durability. In the sieving device 100 of the present embodiment, the blade 131 is rotated during sieving powder and thus vibrations of the filter 122 are not needed. In addition, in the sieving device 100, the powder passes through the filter 122 by its own weight. Therefore, filters made of resins are suitably used as the filter 122. In this case, filters made of resins with the same polarity as that of the powder are selected as the filter 122, thus reducing the adhesion of the powder to the filter 122.

It is preferable that the filter 122 be provided so that it is supported by the mechanism to retain the shape of the filter, such as a frame and the filter has less wrinkles and sags. Wrinkles and sags cause the failure of the filter 122 in some cases and also make it difficult to screen out the powder uniformly.

The filter 122 may be configured to be detachable from the frame 121 by sliding it in the radial direction of the frame 121.

This makes it easier to exchange the filter 122, thus improving the ease of the maintenance of the sieving device 100.

<<Rotator>>

In the present embodiment, the rotator 130 has the blade 131 and a shaft 132. The blade 131 is arranged so as to rotate around the rotation axis Z as the center, which crosses the filter 122, and to be in close proximity to the filter 122. The shaft 132 is arranged along the rotation axis Z, to which the blade 131 is attached. When the interior of the sieving body 120 of the sieving device 100 according to the present embodiment is seen from above, the blade 131 is configured to be rotatable around the shaft 132 as the center in the direction or opposite direction indicated by arrow E in FIG. 4 near the upper surface of the filter 122. Thus, the powder supplied to the frame 121 is stirred and fluidized by the blade 131.

In the present embodiment, the rotator 130 may be configured as desired without any restriction, as long as it is configured that the blade 131 can be rotated around the rotation axis Z as the center in close proximity to the filter 122. For example, the blade 131 may be rotated using not the shaft 132 but magnetic force. Furthermore, the blade 131 may be rotated using the shaft 132 and a hub. The angle formed between the filter 122 and the rotation axis Z crossing the filter 122 is not particularly limited, but 90° is preferable because the distance between the filter 122 and the blade 131 can be maintained constant, and contact therebetween can be prevented.

In the present embodiment, "the blade 131 in close proximity to the filter 122" refers to the state where the blade 131 and the filter 122 are close to each other to the degree which vortex generated by the rotation of the blade 131 reaches the filter 122. However, it should be noted "the blade 131 in close proximity to the filter 122" does not encompasses the state where the blade 131 is in contact with the filter 122. This applies to the entire rotational path. The distance between the facing surfaces of the blade 131 and the filter 122 that is in parallel with the rotation axis Z; i.e., D1 in FIG. 3, is preferably more than 0 mm but 5 mm or less, more preferably 0.01 mm or more but 5 mm or less, still more preferably 0.5 mm or more but 2 mm or less. When the above-mentioned distance that is in parallel with the rotation axis Z is changed depending on the location of the blade 131 in the rotational path or on the points at which the distance is to be determined, the distance, D1, means the shortest distance among all the distances determined at respective location of the blade 131 in the entire rotational path. When the distance between the blade 131 and filter 122 is more than 5 mm, the vortex generated by the rotation of the blade 131 does not reach the surface of the filter 122 and cannot clean the filter in some cases. In addition, the powder deposited on the filter 122 cannot be fluidized sufficiently in some cases. When the distance between the blade 131 and filter 122 is 0 mm, upward movement of the powder under the blade 131, which is deposited on the filter 122, is limited. Thus, the powder cannot be fluidized sufficiently in some cases.

In the present embodiment, the end of the blade 131 can be arranged with respect to the frame 121 without limitation, but it is preferable that the end of the blade 131 be in close proximity to the frame 121. The "end of the blade 131 be in close proximity to the frame 121" refers to the state where the distance between the end of the blade 131 and the frame 121; i.e., D2 in FIG. 3, is preferably 100 mm or less, more preferably 1 mm to 10 mm. When the distance between the end of the blade 131 and the frame 121 is changed depending on the location of the blade 131 in the rotational path or on the points at which the distance is to be measured, the distance, D2, means the shortest distance among all the distances determined at respective locations of the blade 131 in the entire rotational path. When the distance between the end of the blade 131 and the frame 121 is more than 100 mm, the powder flows towards the frame 121 due to the centrifugal force generated by the rotation of the blade 131. The vortex flow only affects the surroundings of the blade 131, thus sometimes making it difficult for the powder near the frame 121 to pass through the filter.

<<Blade>>

In the present embodiment, the material, structure, size and shape of the blade 131 is not particularly limited and may be suitably selected depending on the size, shape and structure of the frame 121. Examples of the material of the blade 131 include metals such as stainless steel, aluminum, and iron; resins such as ABS, FRP, polyester resins, and polypropylene resins. Among these, metals are preferable as the material in terms of strength. In addition, since the blade deals with the powder, resins that can contain an antistatic agent are preferable in terms of the prevention of exposure. The blade 131 may be formed of a single member or of two or more members.

The outer shape of the blade 131 is not particularly limited. Examples thereof include flat plates, bars, prisms, pyramids, cylinders, circular cones, and feather-like shapes. When the blade 131 is arranged in the sieving device 100, the thickness of the blade 131 in parallel with the rotation axis Z, i.e., Dz in FIG. 3 is preferably thin as long as the blade has sufficient strength. The thickness of the blade 131, Dz, is determined based on the distance between the opposite surfaces of the blade 131 that is in parallel with the rotation axis Z. When the distance that is in parallel with the rotation axis Z is changed depending on the points at which the distance is to be determined, the thickness of the blade 131, Dz, means the shortest distance among all the distances determined.

The thickness of the blade 131, Dz, can be set to, for example, 0 mm to 10.0 mm, preferably 0 mm to 5.0 mm, and more preferably 0 mm to 3.0 mm. If the thickness of the blade 131, Dz, is greater than 5.0 mm, the vortex generated behind the blade 131 is reduced. This deteriorates the performance of cleaning the surface of the filter 122. If the thickness is greater than 10.0 mm, the energy in the rotational direction of the blade 131, given to the powder, or the velocity of the powder in the circumferential direction, is increased. This sometimes prevents the movement of the powder in the direction to which the powder is passed through the filter 122, i.e., the direction in parallel with the rotation axis Z. In addition, the burden to a blade driving motor 141 of the rotator 130 is increased and more energy may be required.

In order to maintain the strength of the blade 131, it is preferable that the thickness of the blade 131, Dz, be smaller than the length of the blade 131 in the rotational direction when the blade rotates around the rotation axis Z as the center, i.e., Dx in FIG. 2. The length of the blade 131, Dx, is determined based on the distance between the opposite surfaces of the blade 131 in the rotational direction. When the distance in the rotational direction is changed depending on the points at which the distance is to be determined, the length of the blade, Dx, means the shortest distance among all the distances determined. If the thickness of the blade 131, Dz, is greater than the length of the blade 131, Dx, the strength of the blade 131 is sometimes deteriorated due to the resistance caused by the toner during the rotation of the blade 131. The blade 131 gives the powder the velocity in the rotational direction more than needed. This prevents the movement of the powder that passes through the filter 122 in some cases.

Figure 5A:
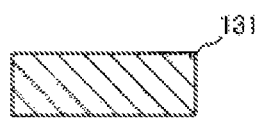
FIGS. 5A to 5J each illustrate a cross-sectional view of the blade of the sieving device illustrated in FIG. 4 taken along line C-C.
Figure 5B:
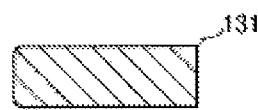
Figure 5C:
Figure 5D:
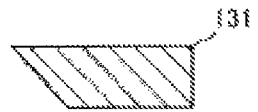
Figure 5E:
Figure 5F:
Figure 5G:
Figure 5H:
Figure 5I:
Figure 5J:
Figure 6A:
FIGS. 6A to 6J each illustrate a cross-sectional view of the blade of the sieving device illustrated in FIG. 4 taken along line D-D.
Figure 6B:
Figure 6C:
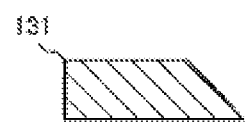
Figure 6D:
Figure 6E:
Figure 6F:
Figure 6G:
Figure 6H:
Figure 6I:
Figure 6J:

The cross-sectional shape of the blade 131 may be suitably selected depending on the intended purpose without any restriction. In the present embodiment, the cross-sectional shape of the blade 131 may be asymmetric shape such as cross-sectional shapes A to G in FIGS. 5 and 6 or symmetrical shape such as cross-sectional shapes H to J in FIGS. 5 and 6. Any of these shapes A to J may be suitably used. The shape of C-C cross-section and the shape of D-D cross-section of the blade 131 may be the same, for example, as in the case where both shapes are shown in FIG. 5C.

The number of the blade 131 placed on the same plane is suitably selected depending on the intended purpose without any restriction. The number of the blade 131 may be, for example, two (see FIG. 1 or 4), three (see FIGS. 8 and 9), or four (see FIGS. 10 and 11). The rotator 130 shown in FIGS. 8 and 9 is an example where the blades 131 and the shaft 132 are fixed with a hub 133. The number of the blade 131 is preferably 1 to 8, more preferably 1 to 4, and particularly preferably 2. If the number of the blade 131 is more than 8, the blade 131 potentially prevents the powder from passing through the filter 122 and maintenance ability is also impaired.

The angle of the blade 131 with respect to the filter 122 seen in the direction of X axis in FIG. 4 may be suitably selected depending on the intended purpose without any restriction. The angle with respect to the filter 122 is preferably −3° to 10°, more preferably 0° to 10°, particularly preferably 0° (horizontal). If the angle of the blade 131 with respect to the filter 122 is greater than 10°, the vortex generated behind the blade 131 is reduced. This deteriorates cleaning ability. In addition, the energy in the circumferential direction, given to the powder, is increased. This prevents the powder from moving towards the filter 122 in some cases. Furthermore, the burden to the blade driving motor 141 of the rotator 130 is increased in some cases.

The ratio of the trajectory area generated by the rotation of the blade 131, X, to the area of the filter 122, Y; i.e., (X/Y)×100, is preferably 60% to 150%, and more preferably 80% to 100%. If the ratio, (X/Y)×100 is less than 60%, the energy generated by the rotation of the blade 131 potentially does not reach the entire surface of the filter 122. Moreover, the powder accumulates near the frame 121 due to the centrifugal force generated by the rotation of the blade 131. This may result in the failure of the blade 131 to give energy to the powder. If the ratio is greater than 150%, the powder moves outside the filter 122 due to the centrifugal force generated by the rotation of the blade 131. This reduces the powder on the filter 122, making sieving impossible in some cases.

The rotational or circumferential speed of the blade 131 may be suitably selected depending on the intended purpose without any restriction, but it is preferably 3 m/s to 30 m/s. If the circumferential speed of the blade 131 is less than 3 m/s, the energy given to the powder by the blade 131 is small. This may result in inefficient cleaning and insufficient fluidization of the powder. If the circumferential speed of the blade 131 is greater than 30 m/s, excessive energy is given to the powder and the speed of the powder in the circumferential direction is increased. This potentially inhibits the powder from falling towards the surface of the filter 122. Excessive fluidization of the powder sometimes results in decreased mass of the powder that passes through the filter 122.

<<Shaft>>

The shaft 132 is provided along the rotation axis Z in the frame 121. One end is connected to the driving unit 140 and the other end is connected to the blade 131. The driving unit 140 drives the rotation of the blade 131 and the shaft 132 around the rotation axis Z as the center. The size, shape, structure and material of the shaft 132 are not particularly limited and may be suitably selected depending on the size, shape and structure of the frame 121. Examples of the material used for the shaft 132 include metals such as stainless steel, aluminum, and iron; resins such as ABS, FRP, polyester resins, and polypropylene resins. The shaft 132 may be formed of a single member or two or more members. Examples of the shape of the shaft 132 include bars and prisms.

<<Driving Unit>>

In the present embodiment, the driving unit 140 contains the blade driving motor 141 and a bearing 142. The blade driving motor 141 is a unit configured to drive the rotation of the rotator 130 that includes blade 131. The operation of the blade driving motor 141 is controlled by a controlling unit such as a PLC (programmable logic controller) and a computer. The bearing 142 is a unit configured to support the shaft 132 in order to ensure accurate rotation of the rotator 130. The bearing 142 is provided outside the frame 121 to avoid the failure due to the entry of the powder. When there is a possibility that the powder enters the driving unit 140 passing through the gap between the shaft 132 and the frame 121, a mechanism can be provided to prevent the entry of the powder. Examples of such mechanism include an air seal in which air is blown in between the bearing 142 and the frame 121 and air is blown out from the gap between the shaft 132 and the frame 121; and an air outlet that does not allow the entry of the powder into the driving unit 140.

Moreover, the driving unit 140 may be provided with a known brake system that stops the rotation of the rotator 130 upon the termination of the operation of the device. By allowing the rotation of the blade 131 to be stopped by the brake system upon the termination of the operation of the device, fluidization of the toner is immediately stopped, improving the accuracy of the toner discharge by the sieving device 100.

<<Powder>>

The powder used for the sieving device 100 is suitably selected depending on the intended purpose without any restriction. Specific examples of the powder include synthetic resins, or powder and/or particulate materials that include them, such as toner, powders and particulate materials of synthetic resins, and powder compounds; powder of natural organic products such as starch and wood flour; grains such as rice, bean, and wheat, or powders thereof; powder of inorganic compounds such as calcium carbonate, calcium silicate, zeolites, hydroxyapatite, ferrite, zinc sulfide, and magnesium sulfide; metallic powders such as iron powder, copper powder, and nickel alloy powder; inorganic pigments such as carbon black, titanium oxide, and red iron oxide; organic pigments such as phthalocyanine blue and indigo; and dyes.

—Toner—

The production method of the toner may be suitably selected depending on the intended purpose without any restriction, but those prepared by wet method are preferable. The wet method is a production method of a toner for developing electrostatic images in which a dispersion medium such as water is used in the step of producing toner base particles. Methods listed below are examples of the wet method.

(a) Suspension polymerization method in which a polymerizable monomer, a polymerization initiator and a colorant are suspended and dispersed in an aqueous medium and then polymerized to produce toner base particles.

(b) Emulsification polymerization aggregation method in which a polymerizable monomer is emulsified in an aqueous medium that includes a polymerization initiator and emulsifying agent and the polymerizable monomer is allowed to undergone polymerization to obtain a dispersion liquid of polymerized primary particles; then a colorant and other materials are added thereto; and finally the polymerized primary particles are allowed to aggregate and subjected to aging to produce toner base particles.

(c) Dissolution suspension method in which a polymer and a colorant are dissolved and dispersed in a solvent to prepare a dispersion liquid (a dispersion liquid in which toner components are dissolved and dispersed) beforehand; then the dispersion liquid is dispersed in an aqueous medium and finally the solvent is removed by heating or leaving under reduced pressure the dispersion liquid to produce toner base particles dispersed in the aqueous medium.

The toner is suitably composed of any one of the mixtures selected from the following (1) to (4):
(1) mixtures consisting of at least a binder resin and a colorant;
(2) mixtures consisting of at least a binder resin, a colorant, and a charge controlling agent;
(3) mixtures consisting of at least a binder resin, a colorant, a charge controlling agent, and wax; and
(4) mixtures consisting of at least a binder resin, a magnetic agent, a charge controlling agent, and wax.

—Binder Resin—

The binder resin may be suitably selected depending on the intended purpose without any restriction, but a thermoplastic resin is preferable. Examples of the thermoplastic resin include vinyl resins, polyester resins, and polyol resins. These may be used alone or in combination. Among these, polyester resins and polyol resins are particularly preferred.

Examples of the vinyl resin include styrene polymers and substituted products thereof (e.g., polystyrenes, poly-p-chlorostyrenes and polyvinyltoluenes); styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloro methacrylate copolymers, styrene-acrylonitrile copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers); polymethyl methacrylates; polybutyl methacrylates; polyvinyl chlorides; and polyvinyl acetates.

The polyester resin is prepared from a dihydric alcohol such as those listed in group A below and a dibasic acid or salt thereof such as those listed in group B below. Moreover, a trihydric or higher alcohol or a tri- or higher carboxylic acid may be added as the third component.

The group A includes, for example, ethylene glycol, triethylene glycol, 1,2-propylene glycol, 1,3-propylene glycol, 1,4-butanediol, neopentyl glycol, 1,4-butenediol, 1,4-bis(hydroxy methyl)cyclohexane, bisphenol A, hydrogenated bisphenol A, polyoxyethylene bisphenol A, polyoxypropylene(2,2)-2,2'-bis(4-hydroxyphenyl)propane, polyoxypropylene(3,3)-2,2-bis(4-hydroxyphenyl)propane, polyoxyethylene(2,0)-2,2-bis(4-hydroxyphenyl)propane, and polyoxypropylene(2,0)-2,2'-bis(4-hydroxyphenyl)propane.

The group B includes, for example, maleic acid, fumaric acid, mesaconic acid, citraconic acid, itaconic acid, glutaconic acid, phthalic acid, isophthalic acid, terephthalic acid, cyclohexane dicarboxylic acid, succinic acid, adipic acid, sebacic acid, malonic acid, linolenic acid, and anhydrides or lower alcohol esters of these acids.

The group C includes, for example, trihydric or higher alcohols such as glycerin, trimethylolpropane, and pentaerythritol; and tri- or higher carboxylic acids such as trimellitic acid and pyromellitic acid.

Examples of the polyol resin include alkylene oxide adducts of epoxy resins and dihydric phenols; and a reactant of (a) a compound having in its molecule one active hydrogen which reacts with a glycidyl ether and epoxy radical, with (b) a compound having in its molecule two or more active hydrogens which react with epoxy resin.

If necessary, other resins can be used in combination with the aforementioned resins. Examples of the other resin include epoxy resins, polyamide resins, urethane resins, phenol resins, butyral resins, rosins, denatured rosins, and terpene resins. Typical examples of the epoxy resins include polycondensation products of a bisphenol such as bisphenol A and bisphenol F with epichlorohydrin.

—Colorant—

The colorant may be suitably selected from known colorants depending on the intended purpose without any restriction. For example, those listed below are used. These may be used alone or in combination.

Examples of black pigment include azine pigments such as carbon black, oil furnace black, channel black, lamp black, acetylene black and aniline black; metal salts of azo pigments; metal oxides; and composite metal oxides. Examples of yellow pigment include cadmium yellow, mineral fast yellow, nickel titan yellow, naples yellow, Naphthol Yellow S, Hansa Yellow G, Hansa Yellow 10G, benzidine yellow GR, quinoline yellow lake, permanent yellow NCG, and tartrazine lake. Examples of orange pigment include molybdenum orange, permanent orange GTR, pyrazolone orange, Vulcan orange, indanthrene brilliant orange RK, benzidine orange G, and indanthrene brilliant orange GK. Examples of red pigment include red iron oxide, cadmium red, permanent red 4R, lithol red, pyrazolone red, watching red calcium salts, lake red D, brilliant carmine 6B, eosin lake, rhodamine lake B, alizarin lake, and brilliant carmine 3B. Examples of violet pigment include fast violet B and methyl violet lake. Examples of blue pigment include cobalt blue, alkali blue, Victoria blue lake, phthalocyanine blue, metal-free phthalocyanine blue, partially chlorinated phthalocyanine blue, fast sky blue, and indanthrene blue BC. Examples of green pigment include chrome green, chrome oxide, pigment green B, and malachite green lake.

An amount of the colorant is preferably 0.1 parts by mass to 50 parts by mass, and more preferably 5 parts by mass to 20 parts by mass, based on 100 parts by mass of the binder resin.

—Wax—

The wax is added for providing the formed toner with releaseability, and is not particularly limited and may be appropriately selected from those known in the art depending on the intended purpose. Examples thereof include: synthetic waxes such as low-molecular-weight polyethylenes and polypropylenes; and natural waxes such as carnauba wax, rice wax and lanolin. The amount of the wax is preferably 1% by mass to 20% by mass, more preferably 3% by mass to 10% by mass, per 100 parts by mass of the toner.

—Charge Controlling Agent—

The charge controlling agent is not particularly limited and may be appropriately selected depending on the intended purpose. Examples thereof include nigrosine, acetylacetone metal complexes, monoazo metal complexes, naphthoic acid, fatty acid metal salts (e.g., metal salts of salicylic acid or salicylic acid derivatives), triphenylmethane dyes, molybdenum acid chelate pigments, rhodamine dyes, alkoxy amines, quaternary ammonium salts (including fluorine-modified quaternary ammonium salts), alkylamides, phosphorus, phosphorus compounds, tungsten, tungsten compounds and fluorine-containing surfactants. These may be used alone or in combination.

The amount of the charge controlling agent is preferably 0.1% by mass to 10% by mass, more preferably 0.5% by mass to 5% by mass, per 100 parts by mass of the toner.

—Other Ingredients—

Examples of the other ingredients which can optionally be added include a magnetizing agent and an external additive.

The magnetizing agent is not particularly limited and may be appropriately selected depending on the intended purpose. Examples thereof include hematite, iron powder and ferrite. The amount of the magnetizing agent is preferably 5% by mass to 50% by mass, more preferably 10% by mass to 30% by mass, per 100 parts by mass of the toner.

Examples of the external additive which can be added for imparting flowability to the toner include inorganic micorpowder such as silica micropowder and titanium oxide micropowder.

The number average particle diameter of the toner is preferably 3.0 μm to 10.0 μm, more preferably 4.0 μm to 7.0 μm. The ratio of weight average particle diameter to number average particle diameter (weight average particle diameter/number average particle diameter) of the toner is preferably 1.03 to 1.5, more preferably 1.06 to 1.2. Here, number average particle diameter and the ratio of weight average particle diameter to number average particle diameter of the toner can be measured using, for example, "COULTER COUNTER MULTISIZER" (product of Beckman Coulter Inc.).

<<Operation of Sieving Device According to Embodiment>>

Figure 12:
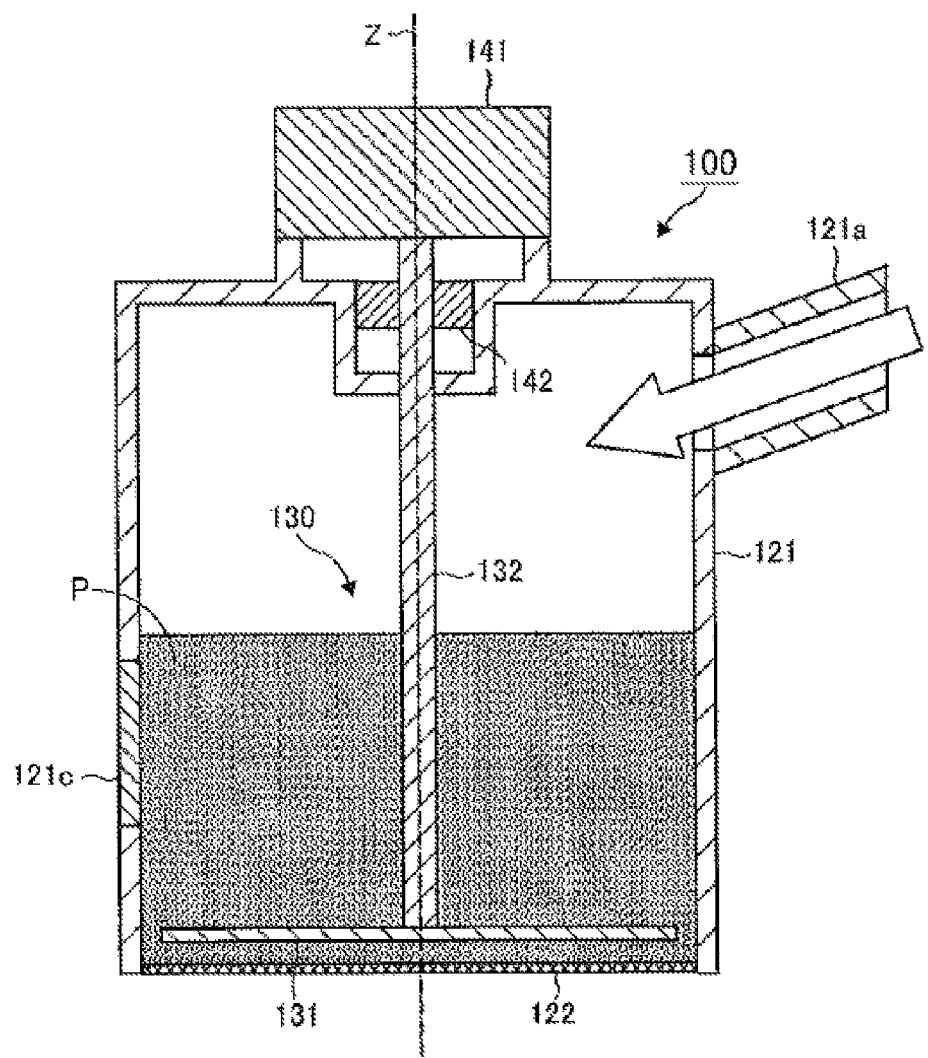
FIG. 12 schematically illustrates a state where powder is supplied to the sieving device illustrated in FIG. 1.
Figure 13:
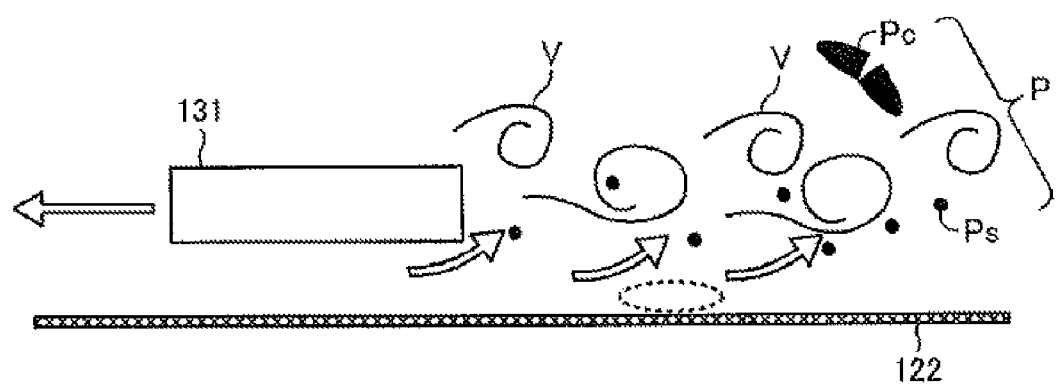
FIG. 13 schematically illustrates a state where powder is being sieved by the sieving device illustrated in FIG. 1.
Figure 14:
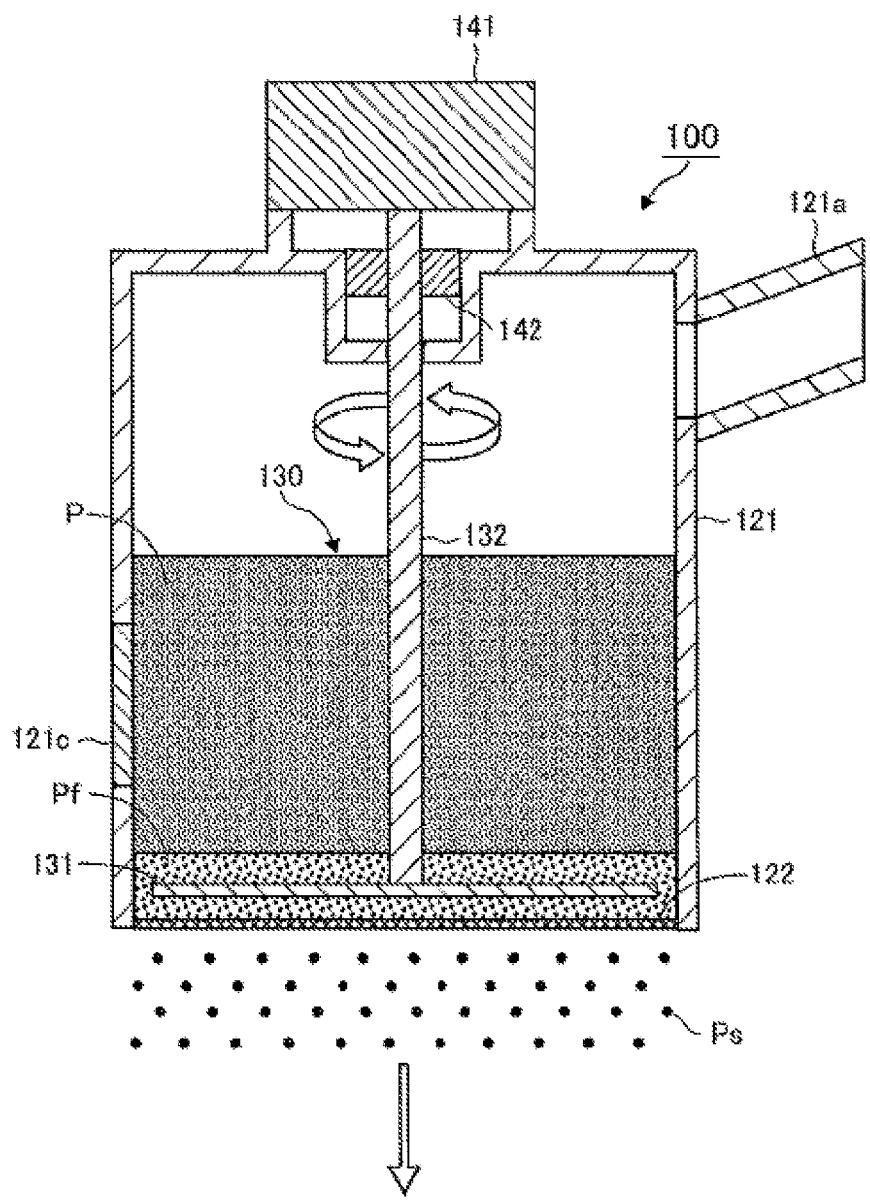
FIG. 14 schematically illustrates a state where powder is being sieved by the sieving device illustrated in FIG. 1.

Referring to FIGS. 7 and 12 to 14, the operation of a sieving device 100 will next be described. FIG. 12 schematically illustrates a state where powder is supplied to the sieving device illustrated in FIG. 1. FIGS. 13 and 14 each schematically illustrate a state where powder is being sieved by the sieving device illustrated in FIG. 1.

As illustrated in FIGS. 7 and 12, a certain amount of powder P is supplied from a powder-supplying device 11 into a frame 121 via a supply portion 121a (supplying step). The powder P supplied to the frame 121 is deposited on the filter 122. Here, when the ratio of the opening of the filter to the particle diameter of the powder is equal to or smaller than a certain value, even particles (powder) P the diameter of which is smaller than the opening of the filter support each other to be deposited (bridged) on the filter 122. Notably, the supply of the powder P may be performed continuously or intermittently.

The blade-driving motor 141 causes a shaft 132 to rotate whereby the blade 131 attached to the tip of the shaft 132 rotates in close proximity to the filter 122 around the rotation axis Z. The rotation speed is not particularly limited but is 500 rpm to 4,000 rpm. The blade 131 rotates in the powder deposited on the filter 122 to fluidize the powder (stirring step, see FIG. 13). In the frame 121 in which the powder P has been deposited, the rotating blade 131 generates vortex V in the opposite direction to the direction in which the blade 131 rotates (fluidizing step, see FIG. 13). Here, the vortex refers to a flow of fluid generated alternatively or randomly in the opposite direction to the direction in which a solid is moved in the fluid.

Coarse particles Pc deposited on the filter 122 are brought into contact with the blade 131 and beaten by the blade 131 as well as blown up by the vortex V generated through the rotation of the blade 131 (see FIG. 13, cleaning effect of the surface of the filter).

Small-particle-diameter powder particles Ps easily pass through the filter 122 by virtue of this cleaning effect. Also, fluidized powder particles Pf illustrated in FIG. 14 are mixed with air by the action of the vortex V to be lower in bulk density. When the fluidized powder particles Pf fall by their own weight, small-particle-diameter powder particles Ps efficiently pass through the filter 122 with low stress. Notably, the sieving device 100 according to the present embodiment does not vibrate the filter 122 with ultrasonic waves or vibrating waves and thus, can prevent the following problems: clogging of the filter 122 caused by aggregating or softening of the powder due to frictional heat; and expansion of the openings of the filter 122 due to frictional stress.

The sieving device 100 and sieving method according to the present embodiment can efficiently sieve from powder foreign matter such as coarse particles and dust with low stress and thus are suitably used for sieving of toners and raw materials for cosmetics, pharmaceutical drugs, foods, and chemicals.

[Embodiment No. 2]

Figure 15:
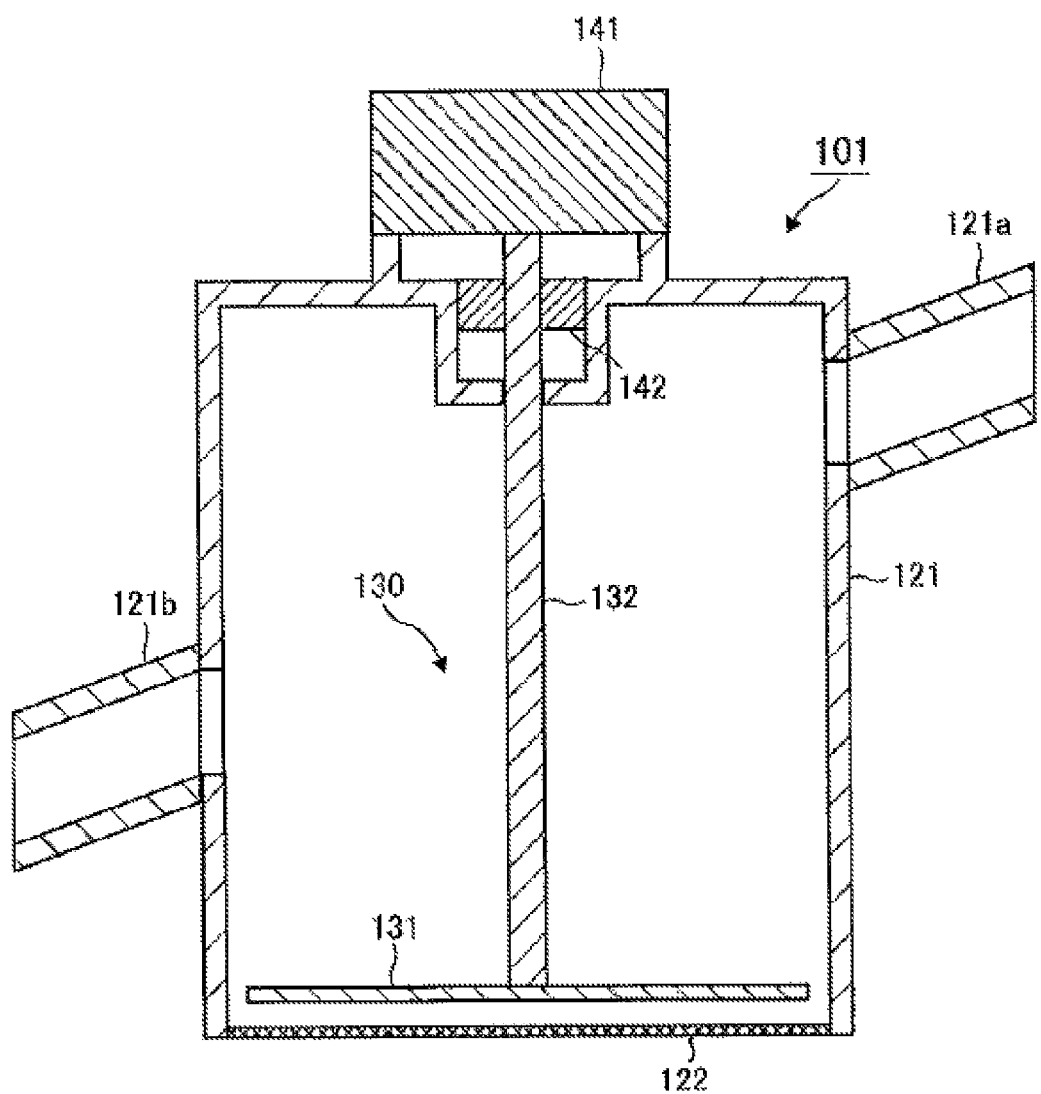
FIG. 15 is a cross-sectional view of a sieving device according to embodiment No. 2 of the present invention.

Referring now to FIG. 15, a sieving device according to embodiment No. 2 of the present invention will be described. Different points from the sieving device according to embodiment No. 1 are described. FIG. 15 is a cross-sectional view of a sieving device according to embodiment No. 2 of the present invention. Notably, in FIG. 15, the same members as the sieving device according to the embodiment No. 1 are indicated by the same reference symbols, and their detail descriptions are omitted.

A sieving device 101 according to the present embodiment is the same as the sieving device 100 according to embodiment No. 1 except that a discharge portion 121b is provided in the frame 121.

<Powder Discharge Portion>

The frame 121 is provided with the discharge portion 121b through which excessive powder is discharged from the frame 121 when the powder deposited on the filter 122 and housed in the frame 121 exceeds a predetermined amount. When the amount of the powder supplied from the supply portion 121a is much larger than the amount of the powder passing through the filter 122, the amount of the powder deposited on the filter 122 continues to increase. In the present embodiment, the discharge portion 121b serves to discharge the excessive powder to the outside, enabling the sieving device 100 to continuously operate for a long period of time. In addition, it is possible to efficiently sieve a large amount of powder.

The size, shape, structure and material of the discharge portion 121b are not particularly limited, so long as the discharge portion 121b can discharge excessive powder from the frame 121, and may be appropriately selected depending on the size, shape and structure of the frame 121. Examples of the material of the discharge portion 121b include: metals such as stainless steel, aluminum and iron; and resins such as ABS, FRP, polyester resins and polypropylene resins. The shape and size of the discharge portion 121b are not particularly limited and may be appropriately selected depending on the intended purpose. The discharge portion 121b is preferably provided at the side surface, end surface or top surface of the frame 121 at the side where the powder is supplied. In one possible configuration, the powder discharged from the discharge portion 121b is directly supplied from the supply portion 121a and sieved again.

[Supplemental Description of Embodiments]

Although the sieving device (100, 101) according to each embodiment have been described, the present invention is not limited to the above embodiment and may be variously modified without departing from the spirit of the present invention. For example, in the above embodiments, although the shaft 132 is provided with the blade 131 in one step, the blades 131 in two steps may be provided at different heights of the shaft 132, if necessary.

Figure 16:
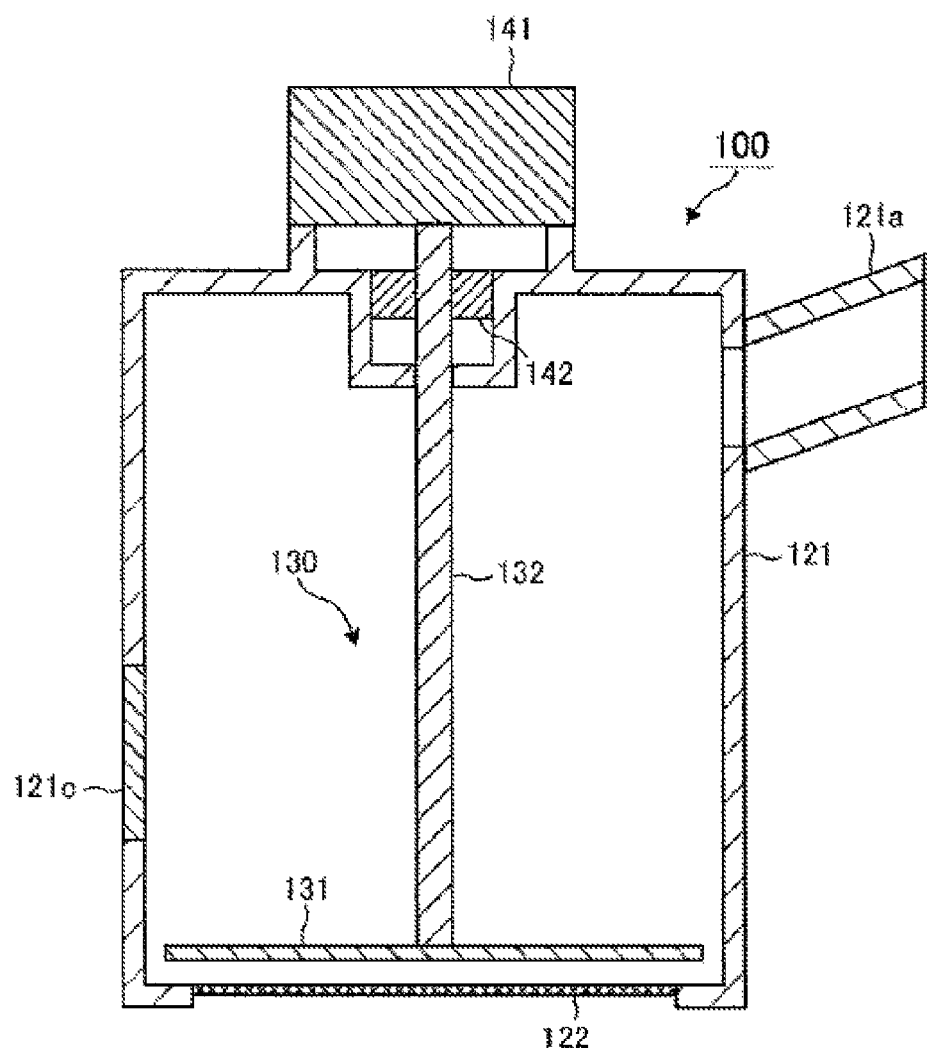
FIG. 16 is a cross-sectional view of a sieving device according to the one embodiment of the present invention.
Figure 17:
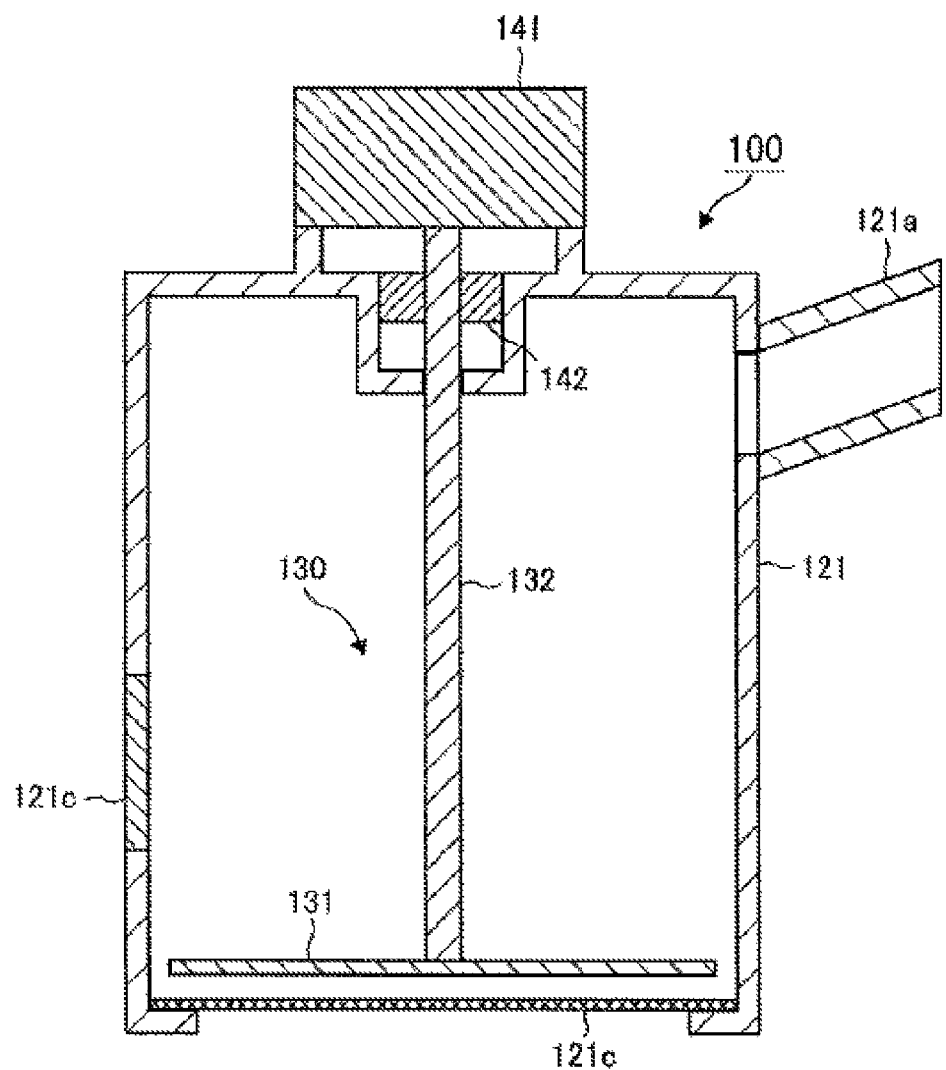
FIG. 17 is a cross-sectional view of a sieving device according to one embodiment of the present invention.
Figure 18:
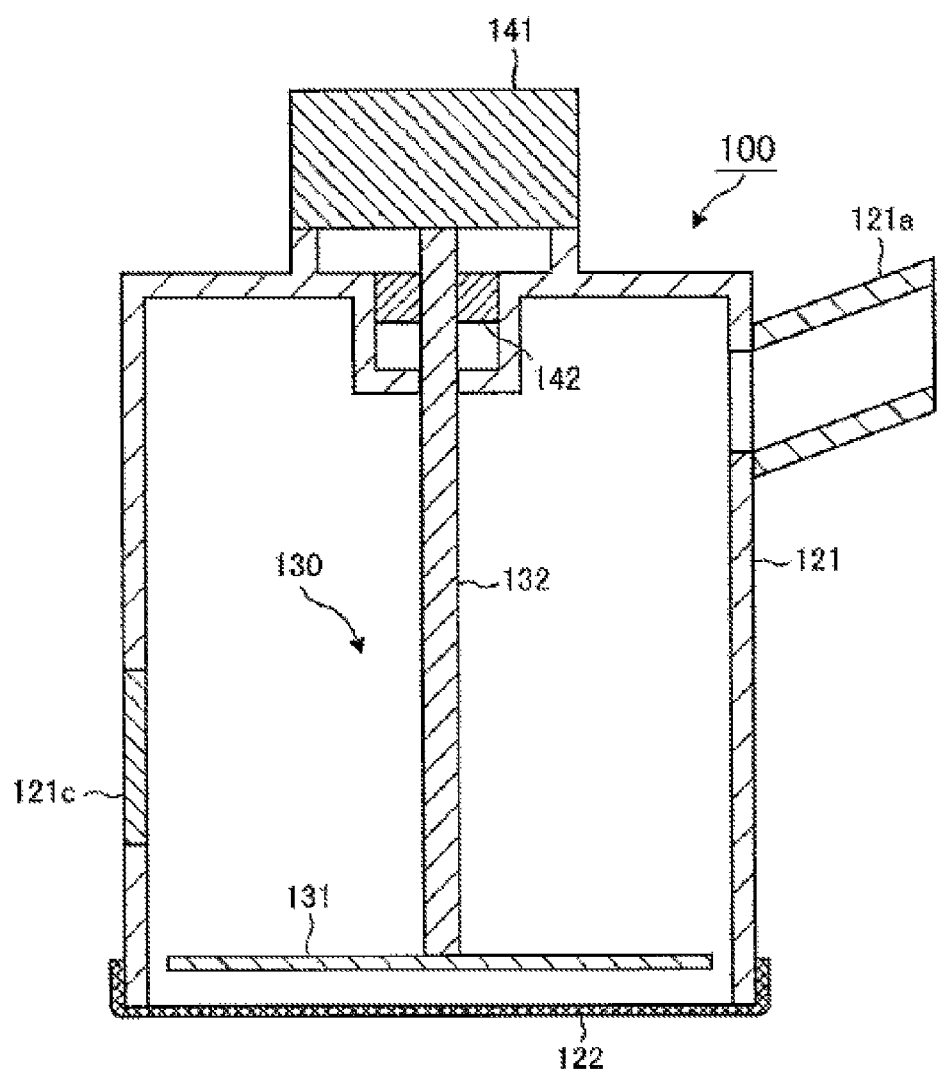
FIG. 18 is a cross-sectional view of a sieving device according to one embodiment of the present invention.
Figure 19:
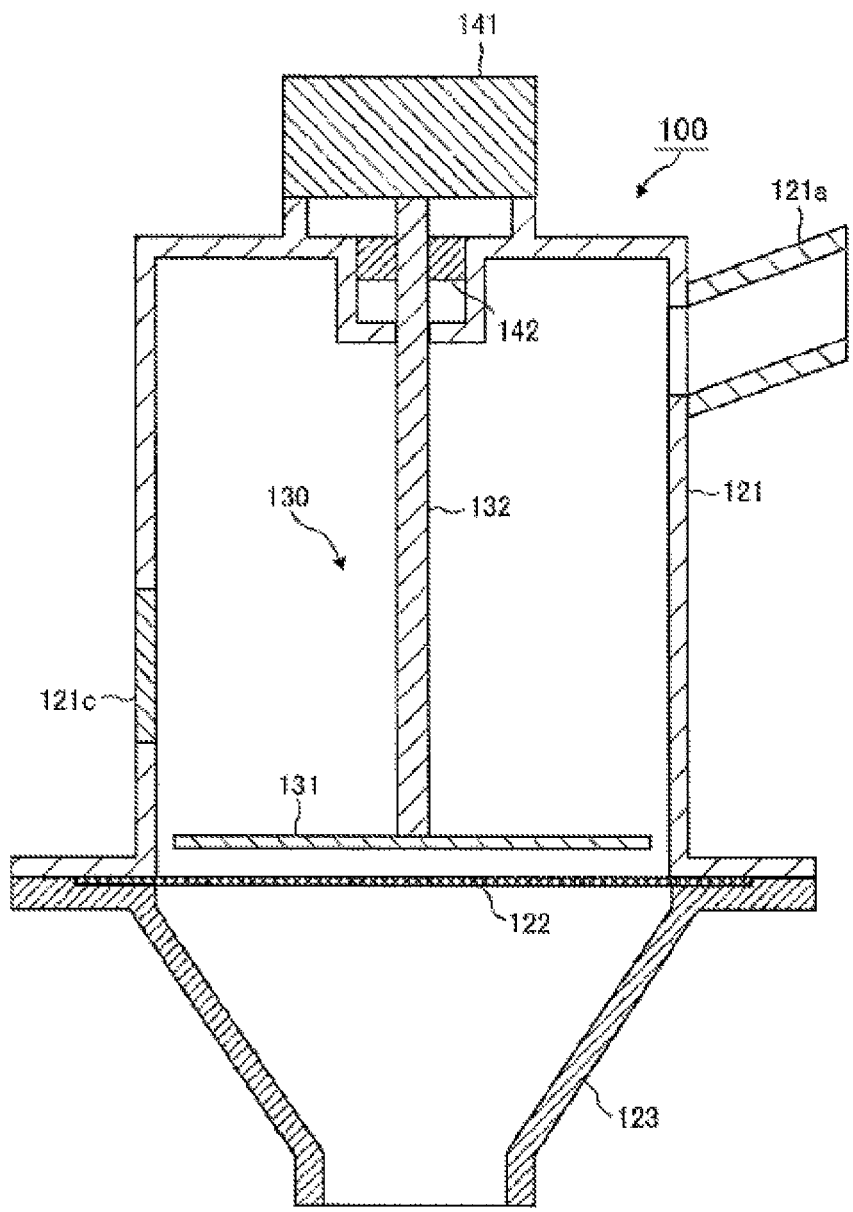
FIG. 19 is a cross-sectional view of a sieving device according to one embodiment of the present invention.

In the above embodiments, although the filter 122 is provided on the entire surface of the frame 121 at the side where the powder is discharged as illustrated in FIGS. 3 to 15, the sieving device 100 of the present invention is not limited to this configuration. Sieving devices according to other embodiments are described with reference to FIGS. 16 to 19. FIGS. 16 to 19 each are a cross-sectional view of a sieving device according to one embodiment of the present invention. As illustrated in FIG. 16, the filter 122 may be provided on a central part of the surface of the frame 121 where the toner is discharged. Alternatively, the filter 122 may be provided on the surface of the frame 121 where the toner is discharged as illustrated in FIGS. 17 and 18. As illustrated in FIG. 19, the filter 122 may be held between the frame 122 and the mesh holder 123.

[Effects Of Embodiments]

The sieving device (100, 101) according to the above embodiments has the blade 131 that rotates in close proximity to the filter 122 around the rotation axis Z crossing the filter 122. In the sieving, the blade 131 stirs only the powder present at the bottom of the frame 121 without entirely stirring the powder therein, leading to energy saving. Also, the toner particles passing through the filter 122 through rotation of the blade 131 are mainly moved in the direction of the rotation axis Z. Thus, the sieving device 100 does not require a large space for collecting the toner particles having passed through the filter 122. The sieving device 100 uses the blade 131 and thus can be prevented from enlargement. The sieving device 100 performs sieving by driving the blade 131 without vibrating the filter 122. The sieving device 100 provides an effect of preventing the continuation of the discharge of the toner due to the vibration of the filter after termination of the operation.

In the sieving device (100, 101) according to the embodiments, the blade 131 is set so that the length (Dz) of the blade 131 in the direction parallel with respect to the rotation axis Z is shorter than the length (Dx) of the blade 131 in the rotation direction around the rotation axis Z. With this configuration, the rotating blade 131 easily generates vortex in the opposite direction to the direction in which the blade 131 is rotated, to thereby efficiently fluidize powder particles.

In the sieving device (100, 101) according to the above embodiments, the distance between the blade 131 and the filter 122 can be set to 5 mm or less. With this configuration, the vortex generated in the opposite direction to the direction in which the blade 131 is rotated can easily reach the filter 122, sufficiently fluidizing the powder deposited on the filter 122.

In the sieving device (100, 101) according to the above embodiments, the blade 131 is attached to the shaft 132 disposed along the rotation axis Z. With this configuration, the blade 131 can accurately be rotated around the rotation axis Z.

In the sieving device (100, 101) according to the above embodiments, each of the ends of the blade 131 is in close proximity to the frame 121. In this case, the blade 131 is rotated in close proximity to the frame 121 and above the filter 122. Even when the toner is collected near the frame 121 by the action of centrifugal force generated by rotation of the blade 131, the vortex generated by rotation of the blade 131 can easily reach powder, efficiently sieving powder.

In the sieving device 101 of the above embodiment, the frame 121 is provided with the discharge portion 121b. With this configuration, it is possible to discharge excessive toner and air in the frame 121 to the outside, enabling the sieving device 101 to continuously operate for a long period of time.

(Sieving Device for Developing Device)

A sieving device for developing device of the present invention includes:

a sieve main body which includes: a hollow cylindrical body; a filter disposed at a bottom portion of the hollow cylindrical body; and a blade configured to rotate in close proximity to the filter around a rotation axis thereof crossing the filter to thereby stir toner supplied to the hollow cylindrical body; and a feeding unit connected to a developing device for developing a latent electrostatic image and configured to feed, to the developing device, the toner which has passed through the filter by rotation of the blade.

If necessary, the sieving device for developing device of the present invention further includes other units or members.

[Embodiment No. 1A]

<Entire Configuration of Sieving Device According to Embodiment No. 1A>

Figure 20:
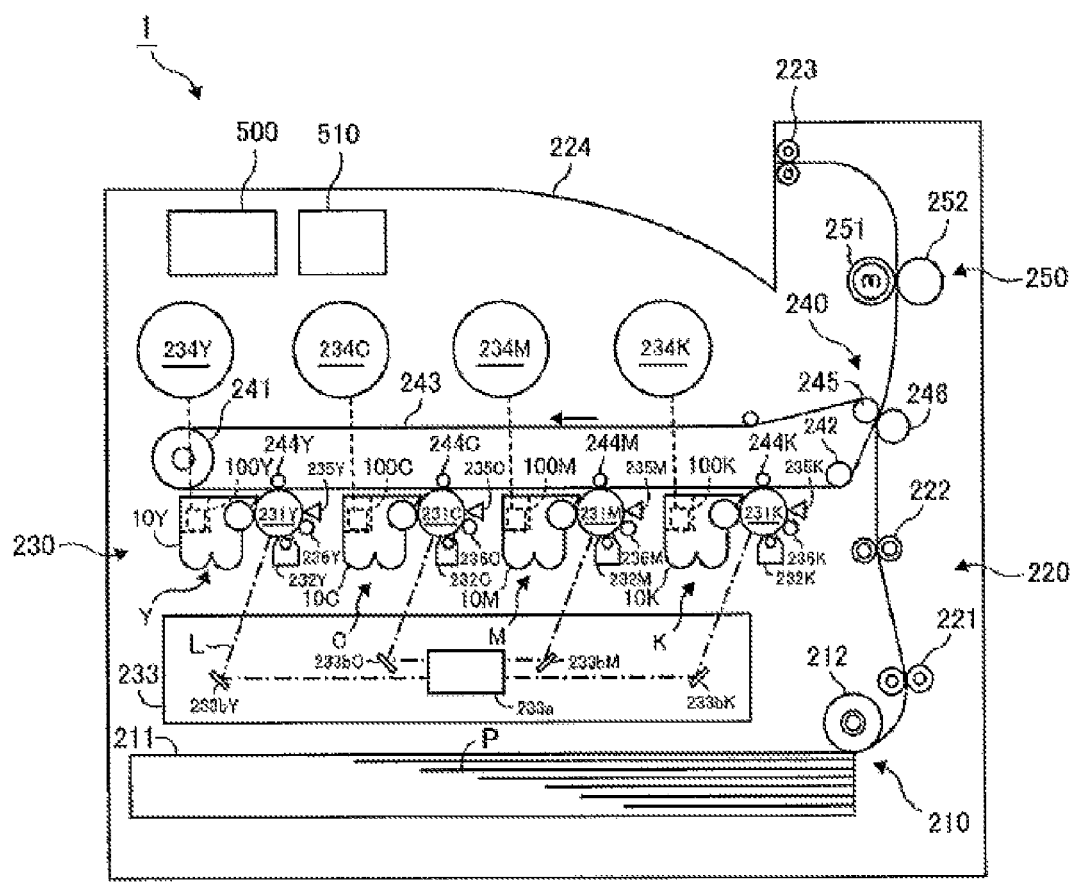
FIG. 20 is a schematic view of an image forming apparatus according to one embodiment of the present invention.

Referring now to drawings, a sieving device according to embodiment No. 1A of the present invention will be described. First, the entire configuration of the sieving device according to the embodiment No. 1A is described with reference to FIG. 20. FIG. 20 is a schematic view of an image forming apparatus according to one embodiment of the present invention. An image forming apparatus 1 is configured to form an image by fixing a toner on a paper sheet which is one exemplary recording medium.

As illustrated in FIG. 20, the image forming apparatus 1 contains a paper-feeding portion 210, a conveyance portion 220, an image-forming portion 230, a transfer portion 240, a fixing portion 250, a control section 500 and an operation panel 510.

As illustrated in FIG. 20, the paper-feeding portion 210 has a paper-feeding cassette 211 in which paper sheets to be fed are stacked on top of one another, and a paper-feeding roller 212 configured to feeding the paper sheets stacked in the paper-feeding cassette 211 one by one.

The conveyance portion 220 has a roller 221 for conveying to the transfer portion 240 the paper sheets fed by the paper-feeding roller 212, a pair of timing rollers 222 which holds the tip of the paper sheet conveyed by the roller 221 and feeds the paper to the transfer portion 240 at a predetermined timing, and a paper-discharging roller 223 for discharging to a discharge tray 224 the paper sheet on which the toner has been fixed in a fixing portion 250.

The image-forming portion 230 has, from left to right in FIG. 20 at predetermined intervals, an image-forming unit Y configured to form an image with a developer containing a yellow toner (toner Y), an image-forming unit C configured to form an image with a developer containing a cyan toner (toner C), an image-forming unit M configured to form an image with a developer containing a magenta toner (toner M), an image-forming unit K configured to form an image with a developer containing a black toner (toner K), and an exposing device 233. Notably, in the present embodiment, when referring to any image-forming unit of the image-forming units (Y, C, M and K), "image-forming unit" is used.

The four image-forming units in FIG. 20 have substantially the same mechanical configuration except that only the developer used is different from each other. Each image-forming unit is provided so as to be rotatable clockwise in FIG. 20 and has a photoconductor drum (231Y, 231C, 231M or 231K) which bears a latent electrostatic image and a toner image, a charger (232Y, 232C, 232M or 232K) for uniformly charging a surface of a photoconductor drum (231Y, 231C, 231M or 231K), a toner cartridge (234Y, 234C, 234M or 234K) for supplying the toner (Y, C, M or K), a developing unit (10Y, 10C, 10M or 10K) for developing a latent electrostatic image, which has been formed on the photoconductor drum (231Y, 231C, 231M or 231K) with the exposing device 233, using the toner supplied from a toner cartridge (234Y, 234C, 234M or 234K) to thereby form a toner image, a charge-eliminating device (235Y, 235C, 235M or 235K) for charge-eliminating the surface of the photoconductor drum (231Y, 231C, 231M or 231K) from which the toner image has been primarily transferred to a recording medium, and a cleaning device (236Y, 236C, 236M or 236K) for removing the residual toner on the surface of the photoconductor drum (231Y, 231C, 231M or 231K) which has been charge-eliminated with the charge-eliminating device (235Y, 235C, 235M or 235K).

In the present embodiment, when referring to any photoconductor drum of the photoconductor drums (231Y, 231C, 231M and 231K), "photoconductor drum 231" is used. When referring to any charging device of the charging devices (232Y, 232C, 232M and 232K), "charging device 232" is used. When referring to any toner cartridge of the toner cartridges (234Y, 234C, 234M and 234K), "toner cartridge 234" is used. When referring to any developing unit of the developing units (10Y, 10C, 10M and 10K), "developing unit 10" is used. When referring to any charge-eliminating device of the charge-eliminating devices (235Y, 235C, 235M and 235K), "charge-eliminating device 235" is used. When referring to any cleaning device of the cleaning devices (236Y, 236C, 236M and 236K), "cleaning device 236" is used.

The exposing device 233 is a device which reflects laser light L, emitted from a light source 233a based on image information, using a polygon mirror (233bY, 233bC, 233bM or 233bK) rotated by a motor to apply the laser light L to the photoconductor drum (231Y, 231C, 231M or 231K). The exposing device 233 forms a latent electrostatic image based on image information on the photoconductor drum 231.

The transfer portion 240 has a drive roller 241, a following roller 242, an intermediate transfer belt 243 which is a transfer medium wound around these rollers and rotatable counterclockwise in FIG. 20 with the rotation of the drive roller 241, a primary transfer roller (244Y, 244C, 244M or 244K) disposed so as to face the photoconductor drum 231 via the intermediate transfer belt 243, and a secondary transfer roller 246 disposed so as to face a secondary opposite roller 245 via the intermediate transfer belt 243 at a position where the toner image is to be transferred onto a paper sheet. When referring to any primary transfer roller of the primary transfer rollers (244Y, 244C, 244M and 244K), "primary transfer roller 244" is used.

In the transfer portion 240, a primary transfer bias is applied to the primary transfer roller 244, and then the toner image formed on the surface of the photoconductor drum 231 is primarily transferred onto the intermediate transfer belt 243 (primary transfer). Also, a secondary transfer bias is applied to the secondary transfer roller 246, and then the toner image is transferred from the intermediate transfer belt 243 onto a paper sheet being conveyed and held between the secondary transfer roller 246 and the secondary opposite roller 245 (secondary transfer).

The fixing portion 250 contains a heater therein and also has a heating roller 251 configured to heat the paper sheet at a temperature higher than the minimum fixing temperature of the toner, and a pressing roller 252 configured to be pressed against the heating roller 251 in a rotatable manner to form a contact surface (nip portion). In the present embodiment, the minimum fixing temperature is the minimum temperature at which the toner is fixed.

The control section 500 has a CPU (Central Processing Unit), a ROM (Read Only Memory) and a RAM (Random Access Memory) and controls the entire operation of the image forming apparatus 1.

The operation panel 510 is a display device having; a display panel which displays operation status of the image forming apparatus 1; and an operation panel which receives operational inputs from users.

<<Configuration of Developing Unit>>

Figure 21:
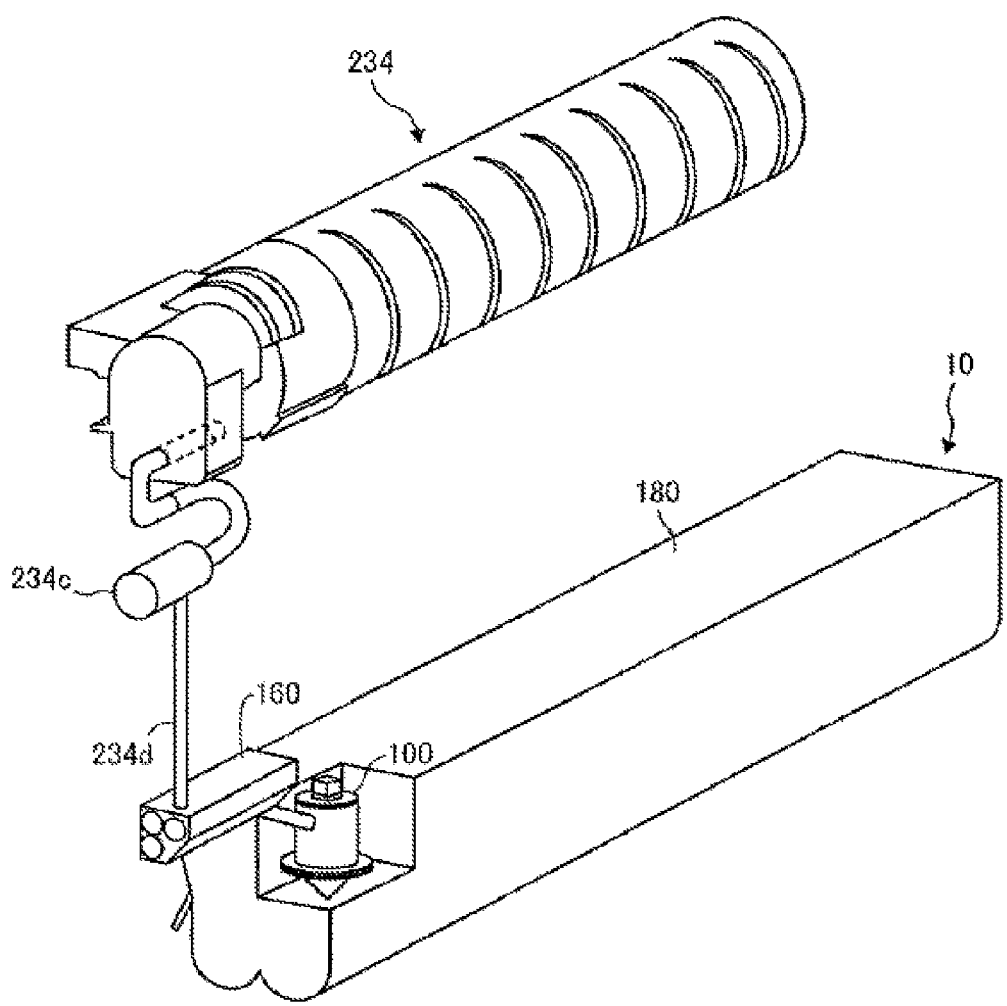
FIG. 21 is a perspective view showing a toner cartridge and a developing unit.

Next, the developing unit 10 will be described in more detail. First, the entire configuration of the developing unit 10 is described with reference to FIG. 21. FIG. 21 is a perspective view showing a toner cartridge and a developing unit.

The developing unit 10 has a subhopper 160, which is one exemplary supply device of the toner, a sieving device 100 and a developing device 180. The subhopper 160 supplies the toner supplied from the toner cartridge 234 to the sieve main body of the sieving device 100. The sieving device 100 sieves coarse particles from the toner supplied from the subhopper 160. The developing device 180 develops the latent electrostatic image formed on the photoconductor 231 using the toner having passed through the sieving device 100.

Next, the supply path of the toner from the toner cartridge 234 to the developing unit 10 will be briefly described. As illustrated in FIG. 21, the toner housed in the toner cartridge 234 is sucked with a suction pump 234c and supplied via a supply tube 234d to the subhopper 160 of the developing unit 10.

<<Subhopper>>

Figure 22:
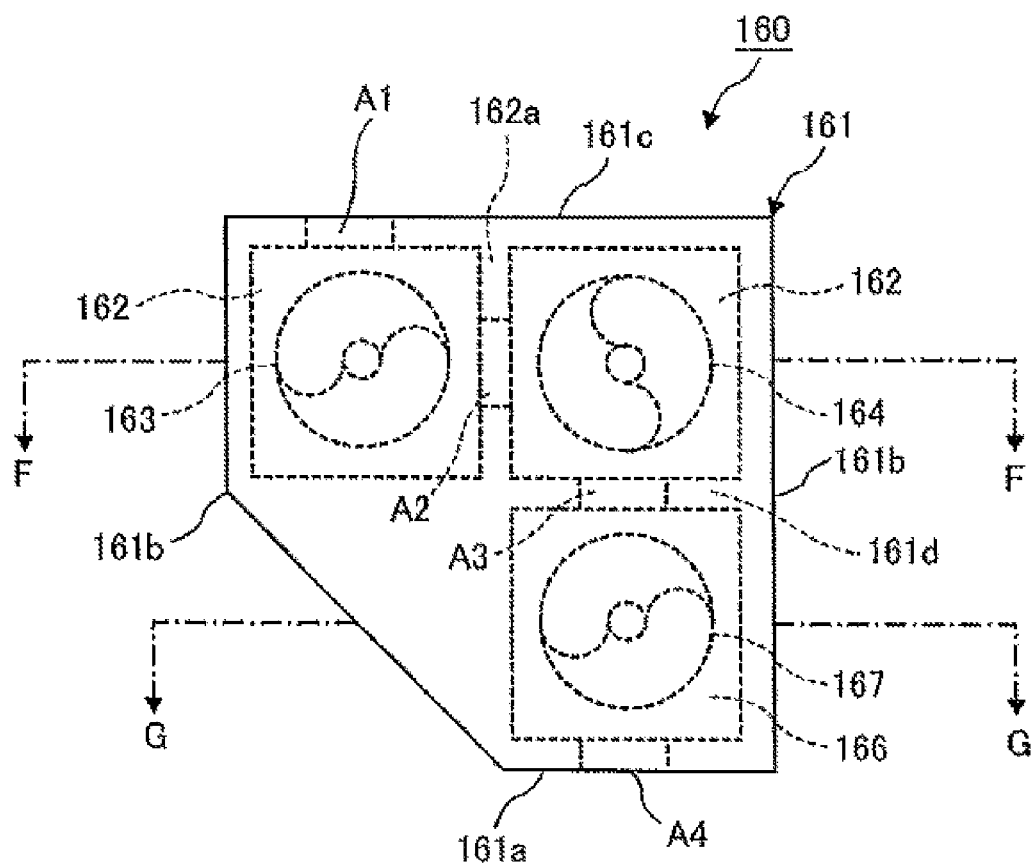
FIG. 22 is an elevational view of a subhopper.
Figure 23:
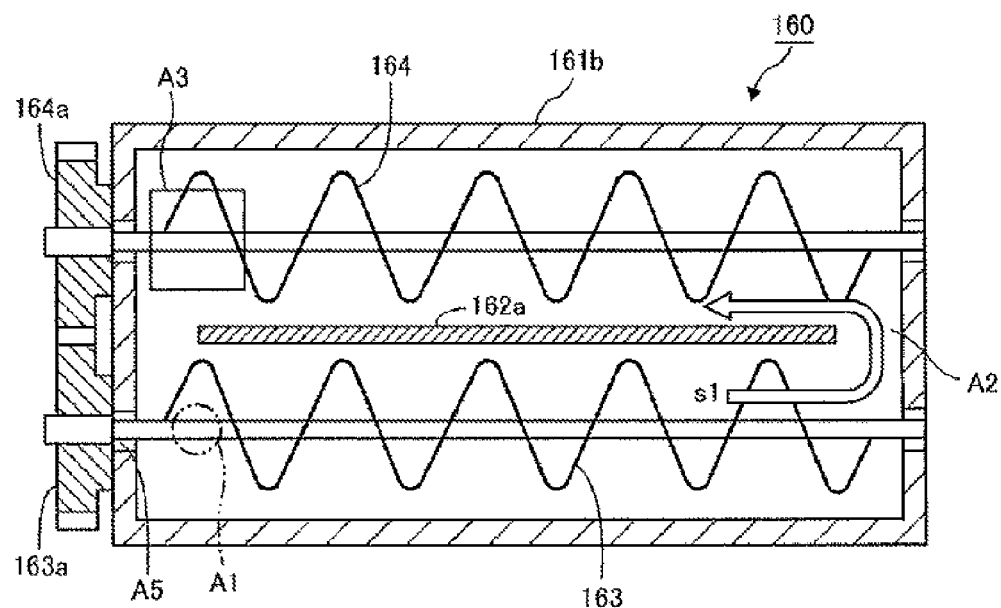
FIG. 23 is a cross-sectional view of the subhopper illustrated in FIG. 22 taken along line F-F.
Figure 24:
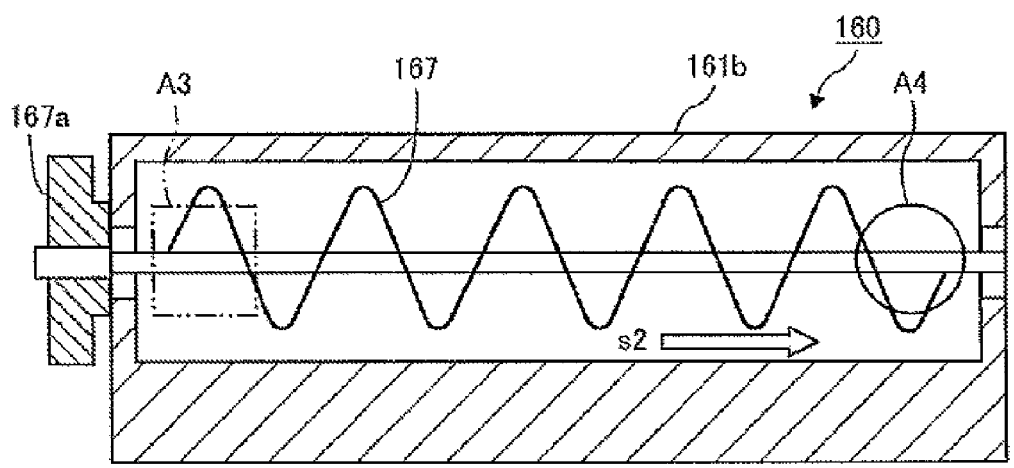
FIG. 24 is a cross-sectional view of the subhopper illustrated in FIG. 22 taken along line G-G.

Next, the subhopper 160 will be described with reference to FIGS. 22 to 24. FIG. 22 is an elevational view of a subhopper. FIG. 23 is a cross-sectional view of the subhopper illustrated in FIG. 22 taken along line F-F. FIG. 24 is a cross-sectional view of the subhopper illustrated in FIG. 22 taken along line G-G. The subhopper 160 has a subhopper main body 161, and a first upper screw 163, a second upper screw 164 and a lower screw 167 each serving as a conveyance unit configured to convey the toner introduced from an introduction port A1 to a supply port A4 and supply the toner to the sieving device 100, where the subhopper main body has a bottom plate 161a having a supply port A4 for supplying the toner to the sieving device 100, a subhopper frame 161b which is a hollow cylindrical body vertically provided at the periphery of the bottom plate 161a, an upper plate 161c provided at the upper portion of the subhopper frame 161b and having the introduction port A1 for introducing the toner supplied from the toner cartridge 234. In the present embodiment, "being vertically provided" means that the subhopper frame 161b is provided on the bottom plate 161a at, for example, an angle greater than 0° but smaller than 180°. The first upper screw 163, the second upper screw 164 and the lower screw 167 are held on the subhopper frame 161b. The first upper screw 163, the second upper screw 164 and the lower screw 167 are connected to gears (163a, 164a and 167a) and driven to rotate with a motor serving as a driving unit.

The interior of the subhopper 160 is divided by a partition plate 161d into an upper chamber 162 and a lower chamber 166 each serving as a housing unit configured to house the toner. The introduction port A1 is formed in an upper plate 161c above and proximately to a holding portion A5 of the first upper screw 163. The toner introduced into the introduction port A1 is conveyed in the direction indicated by the arrow s1 in FIG. 23 through rotation of the first upper screw 163 and the second upper screw 164. The conveyed toner passes through communication holes (A2, A3) to fall down the lower chamber 166.

The toner having fallen from the upper chamber 162 through the communication hole A3 is conveyed in the direction indicated by the arrow s2 in FIG. 24 through rotation of the lower screw 167. The conveyed toner falls through the supply port A4 to be supplied to the sieving device 100.

<Sieving Device>

Figure 25:
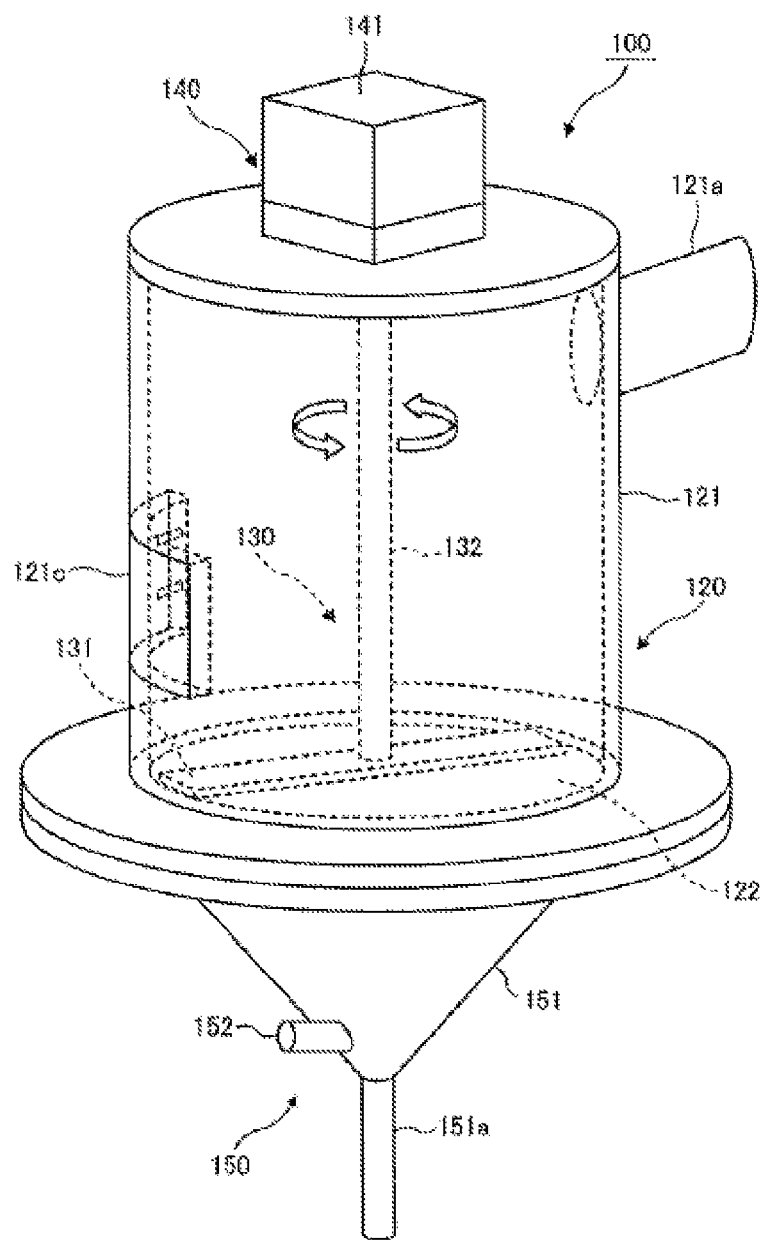
FIG. 25 is a perspective view of one exemplary sieving device.
Figure 26:
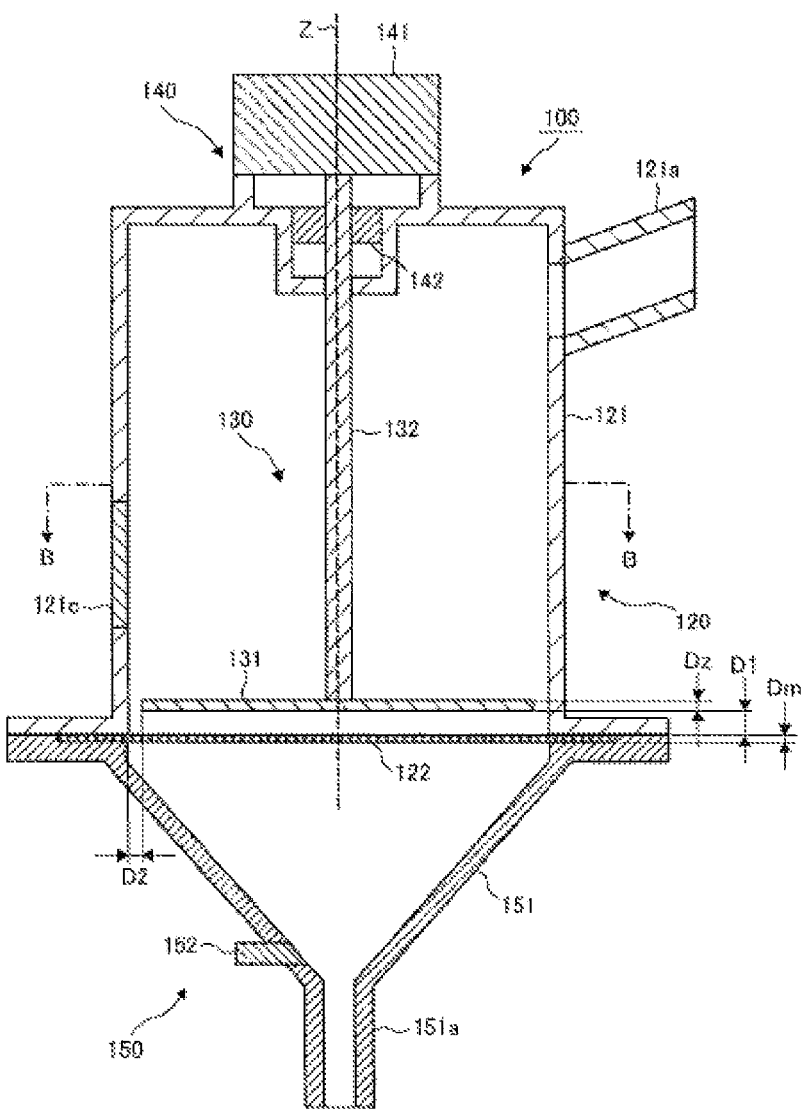
FIG. 26 is a cross-sectional view of another exemplary sieving device.

Next, the sieving device 100 will be described with reference to FIGS. 25 and 26. FIG. 25 is a perspective view of one exemplary sieving device. FIG. 26 is a cross-sectional view of another exemplary sieving device. The sieving device 100 includes a sieve main body 120 and a replenishing portion 150; and, if necessary, further includes appropriately selected other units and members.

<<Sieve Main Body>>

The sieve main body 120 may be the same as the above-described sieving device of the present invention and thus its description is omitted.

<<Replenishing Portion>>

In the present embodiment, the replenishing portion 150 has a nozzle 151, which is one exemplary introducing unit, and a toner sensor 152. The nozzle 151 is a device which is connected with a developing device and introduces the toner having passed through the filter 122 through rotation of the blade 131 to the developing device. The member constituting the nozzle 151 is not particularly limited so long as it can introduce the toner to the developing device, but is a stainless steel tube, for example. The nozzle 151 has an engage portion 151a with which it is engaged with a toner-replenishing port of the developing device. The engage portion 151a may be provided with, for example, a packing for accurately engaging the nozzle 151 with the toner-replenishing port. When the charging port of the developing device is small, the configuration where the toner is directly introduced from the nozzle 151 to the developing device may be replaced a configuration where the toner is introduced via a funnel.

The toner sensor 152 detects the toner having passed through the filter 122. The toner sensor 152 may be those known in the art, and examples thereof include sensors that detect toner based on magnetic permeability and sensors that detect toner based on transmittance.

<Developing Device>

Figure 27:
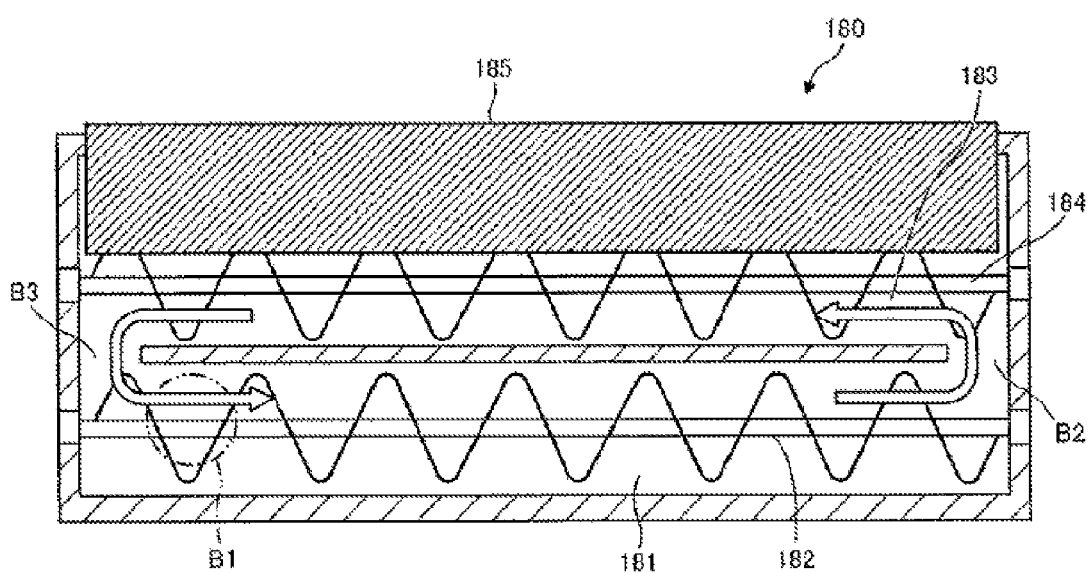
FIG. 27 is a lateral cross-sectional view of one exemplary developing device.
Figure 28:
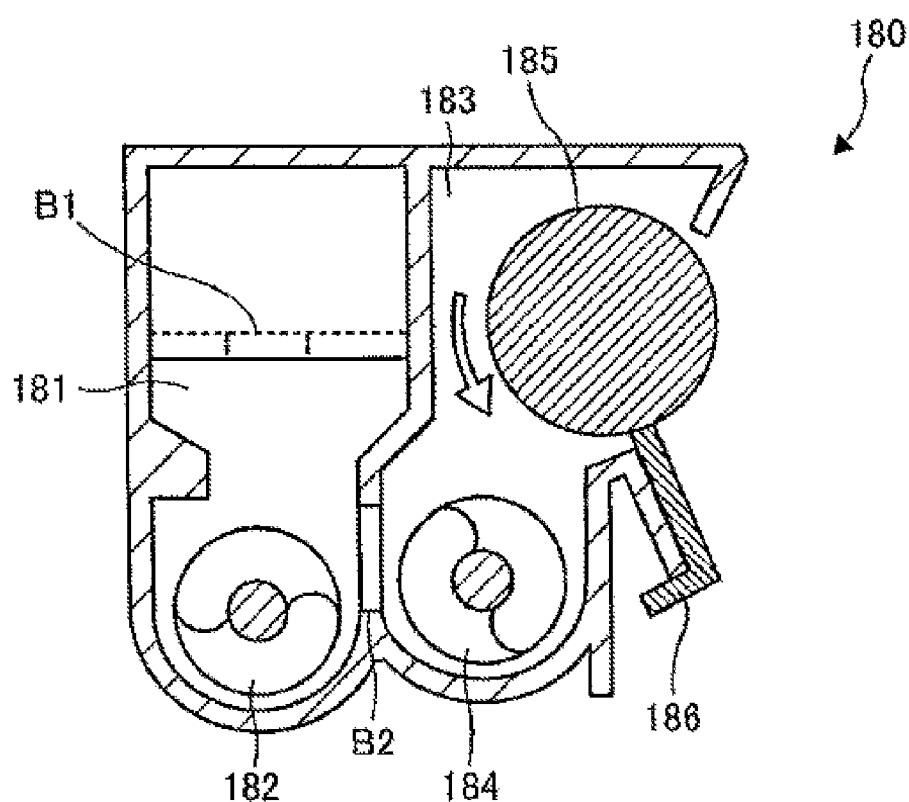
FIG. 28 is a vertical cross-sectional view of one exemplary developing device.

Next, the developing device 180 will be described with reference to FIGS. 27 and 28. FIG. 27 is a lateral cross-sectional view of the developing device. FIG. 28 is a vertical cross-sectional view of the developing device. As illustrated in FIG. 27, the developing device 180 has a first conveyance screw 182 disposed in a first housing portion 181, a second conveyance screw 184 disposed in a second housing portion 183, a developing roller 185, and a doctor blade 186. The first housing portion 181 and the second housing portion 183 have magnetic carrier.

A replenishing port B1 connected with the nozzle 151 of the sieving device 100 is formed above the position indicated by reference character B1 in FIG. 27. The first conveyance screw 182 is rotated by a driving unit such as a motor to thereby convey from left to right in FIG. 27 a developer containing the toner and the magnetic carrier supplied via the replenishing port B1. The conveyed developer enters the second housing portion 183 via a communication hole B2 formed in a part of a partition wall between the first housing portion 181 and the second housing portion 183. The second conveyance screw 184 is rotated by a driving unit such as a motor to thereby convey the developer from right to left in FIG. 27.

The developing roller 185 contains a magnet roller therein. The developer conveyed to the second conveyance portion 183 adsorbs on the developing roller 185 by the action of magnetic force generated by the magnet roller. The developer adsorbed on the developing roller 185 is conveyed with rotation of the developing roller 185 in the arrow direction in FIG. 28, and controlled in layer thickness with the doctor blade 186. The developer is then conveyed to a position facing the photoconductor drum 231 and attached to the latent electrostatic image on the photoconductor drum 231 whereby a toner image is formed on the photoconductor drum 231. The developer whose toner has been used for the development is rotated with rotation of the developing roller 185 and returned to the second housing portion 183. Next, the developer is conveyed by the second conveyance screw 184 in the second housing portion 183 from right to left in FIG. 27 and returned to the first housing portion 181 via a communication hole B3.

<Control Section>

Figure 29:
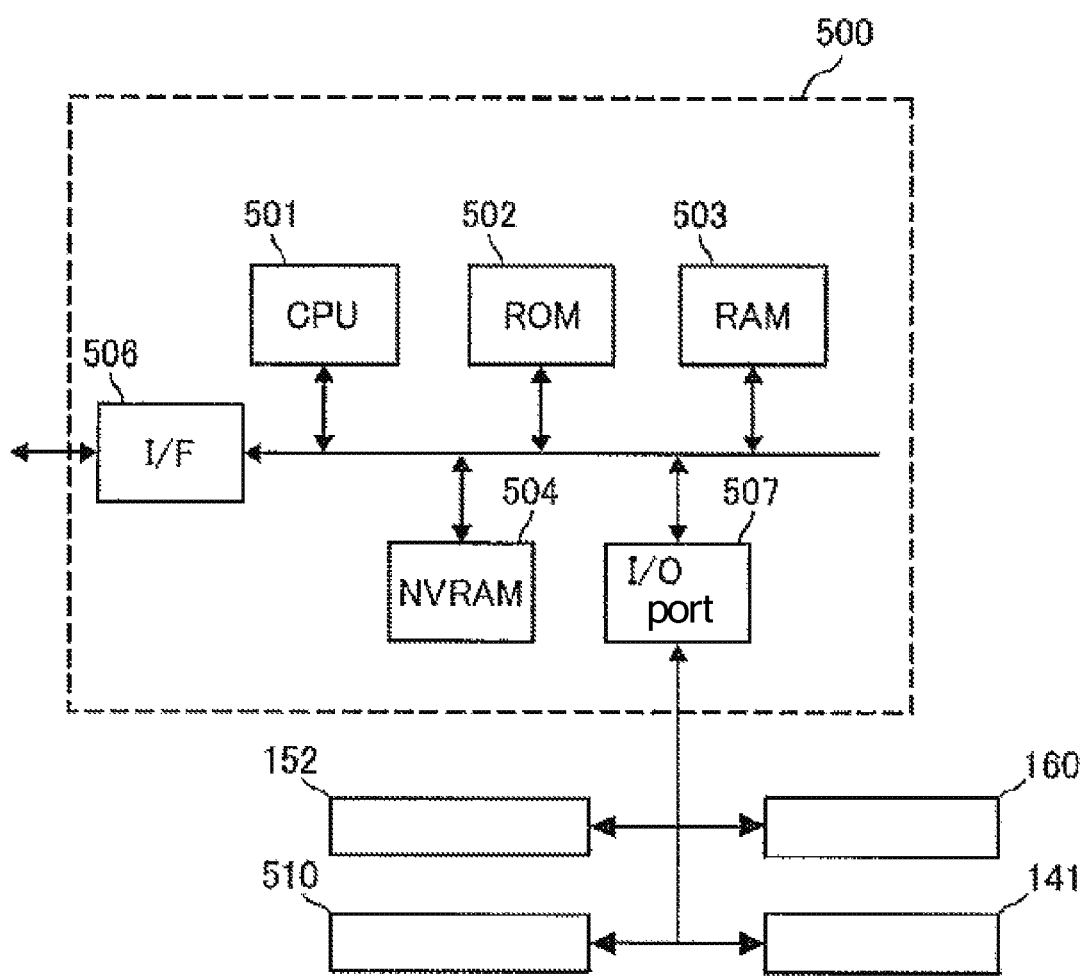
FIG. 29 is a hardware configurational diagram of a control section.
Figure 30:
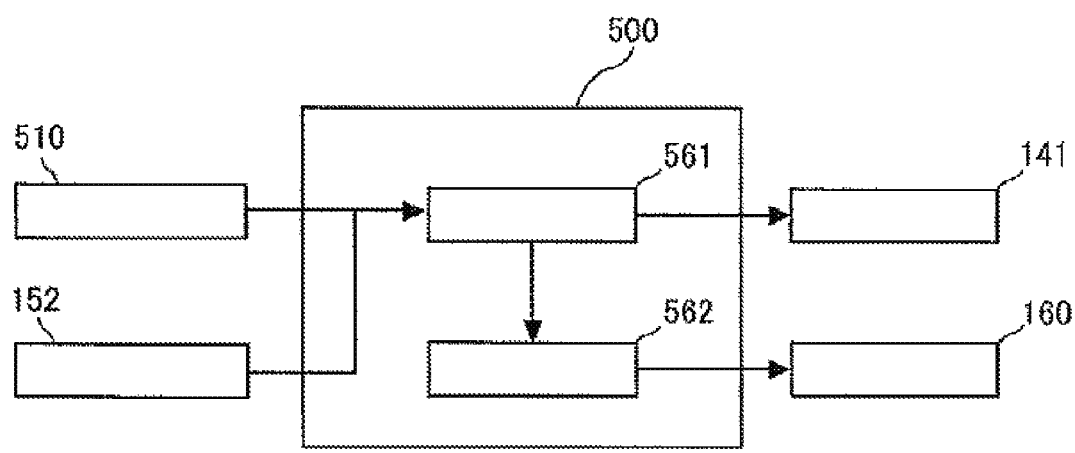
FIG. 30 is a functional block diagram of a control section.

Next, the control section 500 will be described with reference to FIGS. 29 and 30. FIG. 29 is a hardware configurational diagram of the control section. FIG. 30 is a functional block diagram of the control section.

First, the hardware configuration of the control section 500 is described. As illustrated in FIG. 29, the control section 500 has a CPU 501 controlling the entire operation of the image forming apparatus 1, a ROM 502 storing a program for operation of the image forming apparatus 1, a RAM 503 used as a work area of the CPU 501, a nonvolatile memory (NVRAM) 504 retaining data while the power of the image forming apparatus 1 is off, an I/F (Interface) 506 for sending information to and receiving information from external devices such as a host computer, the blade-driving motor (driving unit) 141 of the sieving device 100, a driving unit for the subhopper 160, the toner sensor 152, and an I/O (Input/Output) port 507 for sending information to and receiving information from the operation panel 510.

Next, the functional configuration of the control section 500 will be described. As illustrated in FIG. 30, the control section 500 has the drive control section 561 and the conveyance control section 562. Each of these sections is a function or means realized when any of the constituent elements illustrated in FIG. 29 operate following the order from the CPU 501 according to the program stored in the ROM 502.

Based on the detection results of the toner sensor 152, the drive control section 561 controls the rotation of the blade 131 by the blade-driving motor 141. The conveyance control section 562 controls the conveyance of the toner by the subhopper 160 based on the control of the initiation of the operation of the blade-driving motor 141 by the drive control section 561.

<Developer>

Next, a developer used in the developing device 180 will be described. The developer used in the developing device 180 is not particularly limited and may be appropriately selected depending on the intended purpose. Specifically, the developer may be a one-component developer containing only a toner or a two-component developer containing a toner and a magnetic carrier.

The toner may be the same toner as described in the above sieving device.

Notably, the toner is, for example, a colored toner in yellow, cyan, magenta, black or other colors, or a clear toner.

—Magnetic Carrier—

The magnetic carrier is not particularly limited, so long as it contains a magnetic material, and may be appropriately selected depending on the intended purpose. Specific examples of the magnetic carrier include hematite, iron powder and ferrite. The amount of the magnetic carrier is preferably 5% by mass to 50% by mass, more preferably 10% by mass to 30% by mass, per 100 parts by mass of the toner.

<<Operation and Process of the Image Forming Apparatus According to Embodiment 1A>>

Figure 31:
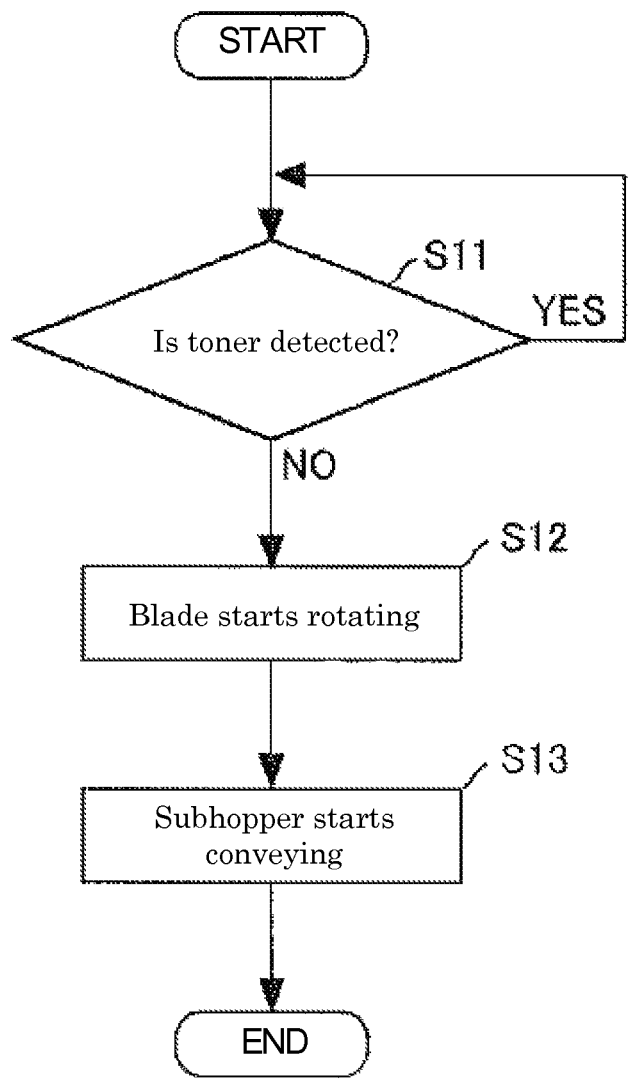
FIG. 31 is a flow diagram of the process of an image forming apparatus.
Figure 32:
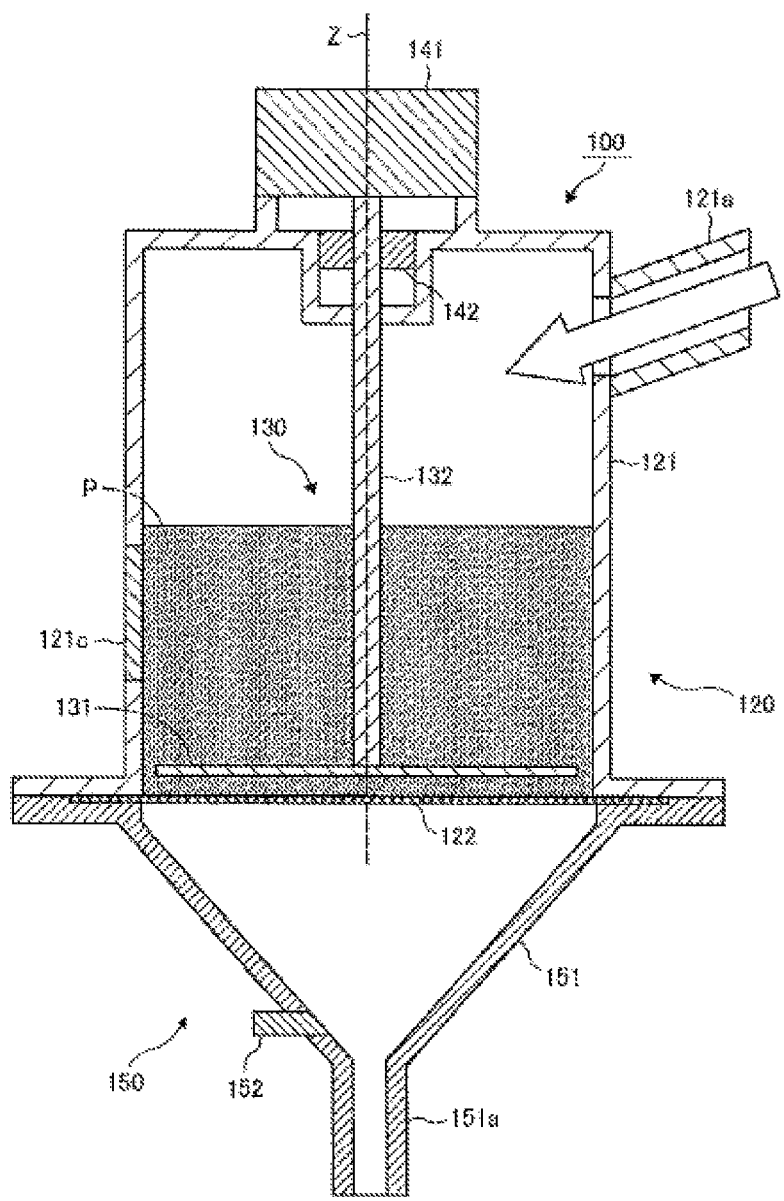
FIG. 32 schematically illustrates a state where toner is supplied to the sieving device illustrated in FIG. 25.
Figure 33:
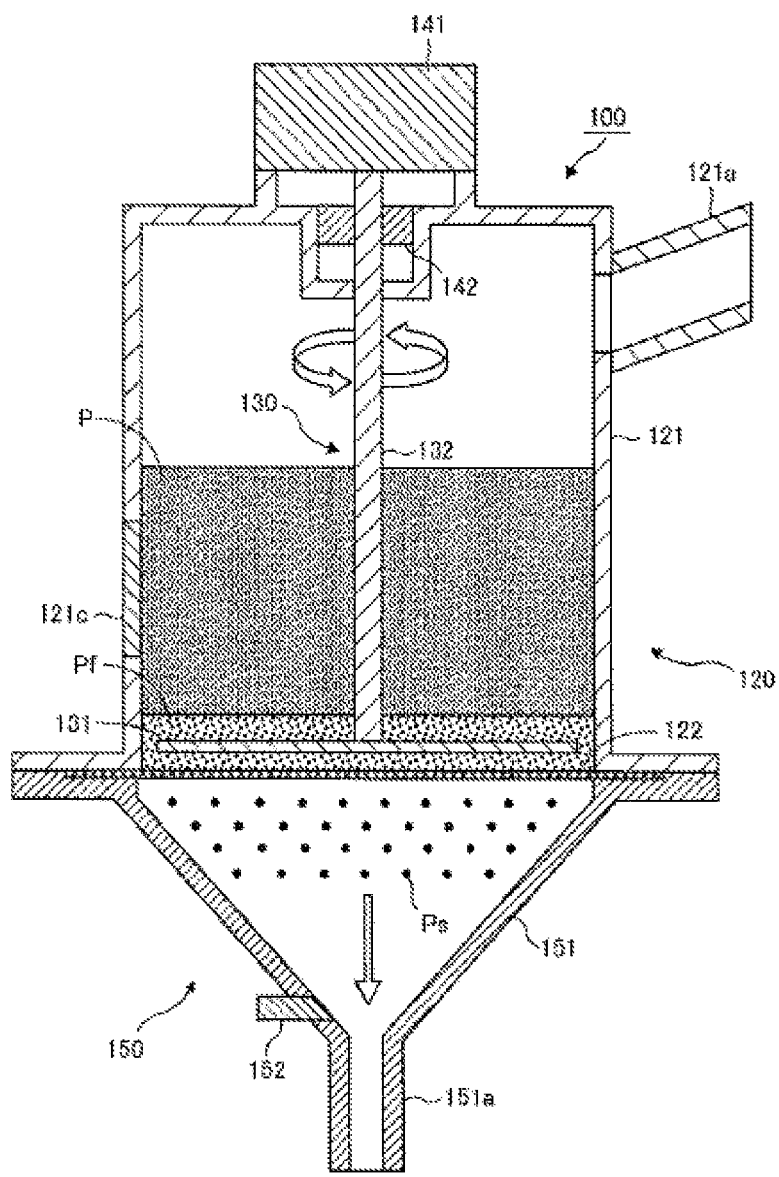
FIG. 33 schematically illustrates a state where toner is sieved by the sieving device illustrated in FIG. 25.

Next, referring to FIGS. 31 to 33, the operation and process of the image forming apparatus 1 will be described. FIG. 31 is a flow diagram of the process of an image forming apparatus. FIG. 32 schematically illustrates a state where toner is supplied to the sieving device illustrated in FIG. 25. FIG. 33 schematically illustrates a state where powder is being sieved by the sieving device illustrated in FIG. 25.

<<Operation and Process Upon Initiation of Printing>>

When the operation panel 510 or I/F 506 receives a request of initiating printing, a drive control section 561 judges based on a signal sent from the toner sensor 152 whether the toner sensor 152 detects a toner (step S11). When the drive control section 561 judges that the toner sensor 152 detects the toner (YES in step S11), the sieving device 100 does not start supplying a toner to the developing device 180, since the developing device 180 houses the toner in a sufficient amount.

In contrast, when the drive control section 561 judges that the toner sensor 152 does not detect the toner (NO in step S11), the sieving device 100 starts supplying a toner to the developing device 180, since the developing device 180 houses the toner in an insufficient amount. In this case, the drive control section 561 sends to the blade-driving motor 141 a signal for the blade 131 to start rotating (step S12). The blade-driving motor 141 causes the rotator 130 to rotate based on the signal sent. As a result, the shaft 132 is rotated whereby the blade 131 attached to the tip of the shaft 132 rotates in close proximity to the filter 122 around the rotation axis Z. The rotation speed is not particularly limited but is 500 rpm to 4,000 rpm. In the present embodiment, when the blade 131 is rotated prior to supplying the toner from the subhopper 160 to the sieving device 100, the coarse particles remaining on the filter 122 after the previous operation can be fluidized to lead to cleaning of the surface of the filter 122. Thus, when the toner starts to be supplied, the sieving device 100 can efficiently sieve the toner.

Subsequently, the conveyance control section 562 sends signals for rotating the first upper screw 162, the second upper screw 163 and the lower screw 167 of the subhopper 160 to a drive unit configured to drive each of the screws (step S13). Then, the drive unit causes each screw to rotate, whereby the toner housed in the subhopper 160 is conveyed to the sieving device 100.

As illustrated in FIG. 32, the toner supplied from the subhopper 160 passes through the supply portion 121a and then is supplied to the frame 121 of the sieve main body 120 in a certain amount (supplying step). The toner P supplied to the frame 121 is deposited on the filter 122. Here, when the ratio of the opening of the filter to the particle diameter of the toner is equal to or smaller than a certain value, even particles (powder) P the diameter of which is smaller than the opening of the filter support each other (bridge) to be deposited on the filter 122. The blade 131 rotates in the toner deposited on the filter 122 to fluidize the toner (stirring step, see FIG. 13). In the sieve main body 120 in which the powder P has been deposited, the rotating blade 131 generates vortex V in the opposite direction to the direction in which the blade 131 rotates. Here, the vortex refers to a flow of fluid generated alternatively or randomly in the opposite direction to the direction in which a solid is moved in the fluid.

Coarse particles Pc deposited on the filter 122 are brought into contact with the blade 131 and beaten by the blade 131 as well as blown up by the vortex V generated through the rotation of the blade 131 (see FIG. 13, cleaning effect of the surface of the filter). Small-particle-diameter toner particles Ps easily pass through the filter 122 by virtue of this cleaning effect. Also, fluidized toner particles Pf illustrated in FIG. 33 are mixed with air by the action of the vortex V to be lower in bulk density. When the fluidized toner particles Pf fall by their own weight, small-particle-diameter toner particles Ps efficiently pass through the filter 122 with low stress. The toner particles Ps having passed through the filter 122 pass through a nozzle 151 to be introduced into the developing device 180.

The developing device 180 uses the toner particles having passed through the filter 122 to develop a latent electrostatic image formed on the otoconductor drum 231 to form a toner image (developing step). In the transfer portions 240, a primary transfer bias is applied to the primary transfer roller 244, which then transfers (primarily transfers) each toner image formed on the photoconductor drum 231 onto the intermediate transfer belt 243. Also, a secondary transfer bias is applied to the secondary transfer roller 246, which then transfers (secondarily transfers) the toner image from the intermediate transfer belt 243 onto a paper sheet conveyed between the secondary transfer roller 246 and the secondary opposite roller 245 (transfer step). The paper sheet onto which the toner image has been transferred is heated with the heat roller 251 at a temperature higher than the minimum fixing temperature and pressed with the press roller 252. As a result, the melted toner image is fixed on the paper sheet (fixing step).

<<Operation and Process Upon Termination of Printing>>

Next, the operation and process upon termination of printing of the image forming apparatus 1 will be described with reference to FIG. 34.

Figure 34:
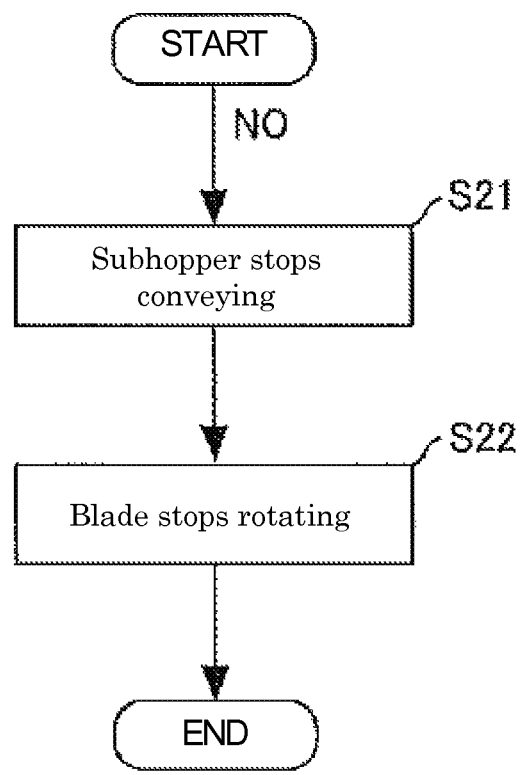
FIG. 34 is a flow diagram of the process of an image forming apparatus.

FIG. 34 is a flow diagram of the process of the image forming apparatus.

After completion of the printing based on the request received by the operation panel 510 or I/F 506, the conveyance control section 562 sends signals for terminating the rotation of the first upper screw 162, the second upper screw 163 and the lower screw 167 of the subhopper 160 to the drive unit configured to drive each screw (step S21). Then, the drive unit terminates the rotation of the screw to thereby terminate the supply of the toner from the subhopper 160 to the sieving device 100.

By allowing the blade 131 to rotate in this state where the supply of the toner from the subhopper 160 to the sieving device 100 is terminated, the toner deposited on the filter 122 is discharged by the blade 131 whereby the surface of the filter 122 is cleaned. In this case, the coarse particles not having passed through the filter 122 are moved to near the frame 121 by the action of centrifugal force.

Next, the drive control section 561 sends a signal for terminating the rotation of the blade 131 to the blade-driving motor 141 (step S22). The blade-driving motor 141 terminates the rotation of the rotator 130 based on the signal. As a result, the supply of the toner by the sieving device 100 to the developing device 180 is terminated. In this case, the coarse particles can easily be collected from the cleaning door 121c, since they have been moved to near the frame 121.

[Embodiment No. 2A]

Figure 35:
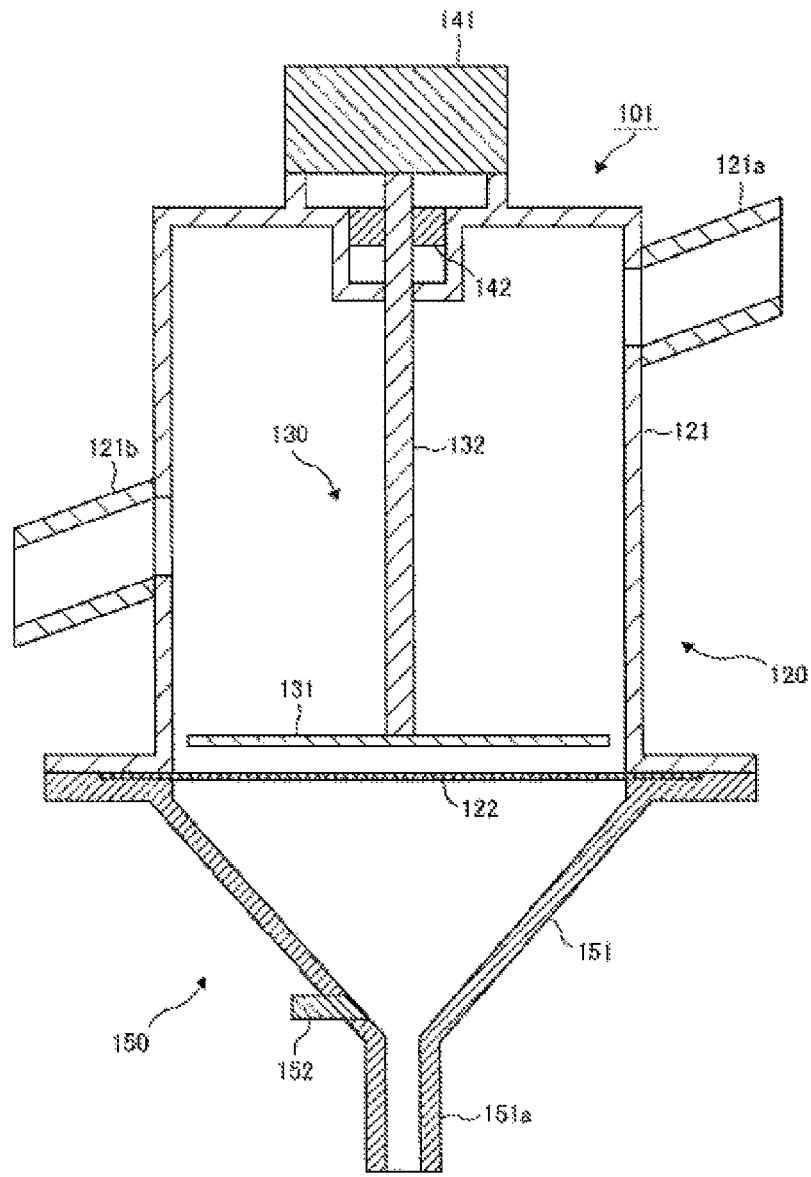
FIG. 35 is a cross-sectional view of a sieving device according one embodiment of the present invention.

Referring now to FIG. 35, a sieving device according to embodiment No. 2A of the present invention will be described. Different points from the sieving device according to embodiment No. 1A are described. FIG. 35 is a cross-sectional view of a sieving device according one embodiment of the present invention. Notably, in FIG. 35, the same members as the sieving device according to the embodiment No. 1A are indicated by the same reference symbols, and their detail descriptions are omitted.

A sieving device 101 illustrated in FIG. 35 is the same as the sieving device 100 according to embodiment No. 1A except that a discharge portion 121b is provided in the frame 121.

<Discharge Portion>

The frame 121 is provided with the discharge portion 121b through which excessive toner is discharged from the sieve main body 120 when the toner deposited on the filter 122 and housed in the sieve main body 120 exceeds a predetermined amount. When the amount of the toner supplied from the supply portion 121a is much larger than the amount of the toner passing through the filter 122, the amount of the toner deposited on the filter 122 continues to increase. In the present embodiment, the discharge portion 121b serves to discharge the excessive toner to the outside, enabling the sieving device 101 to continuously operate for a long period of time. In addition, it is possible to efficiently sieve a large amount of toner.

The size, shape, structure and material of the discharge portion 121b are not particularly limited, so long as the discharge portion 121b can discharge toner from the sieve main body 120, and may be appropriately selected depending on the size, shape and structure of the sieve main body 120. Examples of the material of the discharge portion 121b include: metals such as stainless steel, aluminum and iron; and resins such as ABS, FRP, polyester resins and polypropylene resins. The shape and size of the discharge portion 121b are not particularly limited and may be appropriately selected depending on the intended purpose. The discharge portion 121b is preferably provided at the side surface, end surface or upper surface of the frame 121 at the side where the toner is supplied. In one possible configuration, the toner discharged from the discharge portion 121b is directly supplied from the supply portion 121a and sieved again.

[Supplemental Description of Embodiments]

Although the sieving device (100, 101) according to each embodiment have been described, the present invention is not limited to the above embodiment and may be variously modified without departing from the spirit of the present invention. For example, in the above embodiments, although the shaft 132 is provided with the blade 131 in one step, the blades 131 in two steps may be provided at different heights of the shaft 132, if necessary.

In the embodiment, although the filter 122 is provided on the entire surface of the sieve main body 120 at the side where the toner is discharged as illustrated in FIGS. 26 to 35, the sieving device of the present invention is not limited to this configuration. The filter 122 may be provided on a part of the surface of the sieve main body 120 where the toner is discharged.

In the above embodiments, the subhopper 160 is used as a device for supplying the toner to the sieving device 100. However, the present invention is not limited to the embodiments. In the above embodiments, the subhopper 160 can be replaced with a pump such as a bellows-type pump, a diaphragm-type pump or a snake-type pump; a unit such as force feeding by compression air, a coil screw, or an auger; or falling by the own weight of the toner.

[Effects Of Embodiments]

The sieving device (100, 101) according to the above embodiments has the blade 131 that rotates in close proximity to the filter 122 around the rotation axis Z crossing the filter 122. The developing device 180 with this sieving device uses previously sieved toner particles containing no coarse particles to from a toner image. The formed image can be prevented in image quality from being degraded by the coarse particles. In the sieving, the blade 131 stirs only the toner present at the bottom of the frame 121 without entirely stirring the toner, leading to energy saving. Also, the toner particles passing through the filter 122 are mainly moved in the direction of the rotation axis Z. Thus, the sieving device 100 does not require a large space for collecting the toner particles having passed through the filter 122. When the sieving device 100 is mounted in the image forming apparatus 1, the image forming apparatus 1 can be prevented from enlargement. The sieving device 100 performs sieving by driving the blade 131 without vibrating the filter 122. The sieving device 100 provides an effect of preventing the continuation of the discharge of the toner due to the vibration of the filter after termination of the operation.

In sieving device 100 of the above embodiments, the toner particles P are fluidized by allowing the blade 131 to rotate. When the fluidized toner particles Pf fall by their own weight, the small-particle-diameter toner particles Ps efficiently pass through the filter 122 with low stress. The sieving device 100 is downsized as compared with the unitrasonic sieving device having the comparable performance. When the sieving device 100 is mounted in the image forming apparatus 1, the image forming apparatus 1 can be prevented from enlargement.

The nozzle 151 of the sieving device 100 according to the embodiments has an engage portion 151a for being engaged with a supply port B1 of the developing device 180. With this configuration, it is possible to immediately supply the toner sieved with the filter 122 to the developing device 180. In the present embodiment, the filter 122 is not a portion driven and thus vibration can be prevented from being transmitted from the sieving device 100 to the developing device 180, enabling the engage portion 151a to be engaged with the developing device 180.

In the sieving device (100, 101) according to the embodiments, the blade 131 is set so that the length (Dz) of the blade 131 in the direction parallel with respect to the rotation axis Z is shorter than the length (Dx) of the blade 131 in the rotation direction around the rotation axis Z. With this configuration, the rotating blade 131 easily generates vortex in the opposite direction to the direction in which the blade 131 is moved, to thereby efficiently fluidize toner particles.

In the sieving device (100, 101) according to the above embodiments, the distance between the blade 131 and the filter 122 can be set to 5 mm or less. With this configuration, the vortex generated in the opposite direction to the direction in which the blade 131 is rotated can easily reach the filter 122, sufficiently fluidizing the toner deposited on the filter 122.

In the sieving device (100, 101) according to the above embodiments, the blade 131 is attached to the shaft 132 disposed along the rotation axis Z. With this configuration, the blade 131 can accurately be rotated around the rotation axis Z.

In the sieving device (100, 101) according to the above embodiments, each of the ends of the blade 131 is in close proximity to the frame 121. In this case, the blade 131 is moved in close proximity to the frame 121 and above the filter 122. Even when the toner is collected near the frame 121 by the action of centrifugal force generated by rotation of the blade 131, the vortex generated by rotation of the blade 131 can easily reach powder, efficiently sieving toner.

In the sieving device 101 of the above embodiment, the frame 121 is provided with the discharge portion 121b. With this configuration, it is possible to discharge excessive toner and air in the sieve main body 120 to the outside, enabling the sieving device 101 to continuously operate for a long period of time.

Also in the sieving device 100 according to the above embodiment, the frame 121 is provided with the cleaning door 121c openable and closable. With this configuration, when the operation of the sieving device 100 is terminated, the cleaning door 121c can be opened to collect the toner on the filter 122 for cleaning.

(Powder-Charging Device)

A powder-charging device of the present invention includes:

a sieve main body which includes: a hollow cylindrical body; a filter disposed at a bottom portion of the hollow cylindrical body; and a blade configured to rotate in close proximity to the filter around a rotation axis thereof crossing the filter to thereby stir powder supplied to the hollow cylindrical body; and a feeding unit configured to feed, to the predetermined container, the powder which has passed through the filter by rotation of the blade.

If necessary, the powder-charging device of the present invention further includes other units or members.

[Embodiment No. 1B]

<Entire Configuration of Powder-Charging Device According to Embodiment No. 1B>

Figure 36:
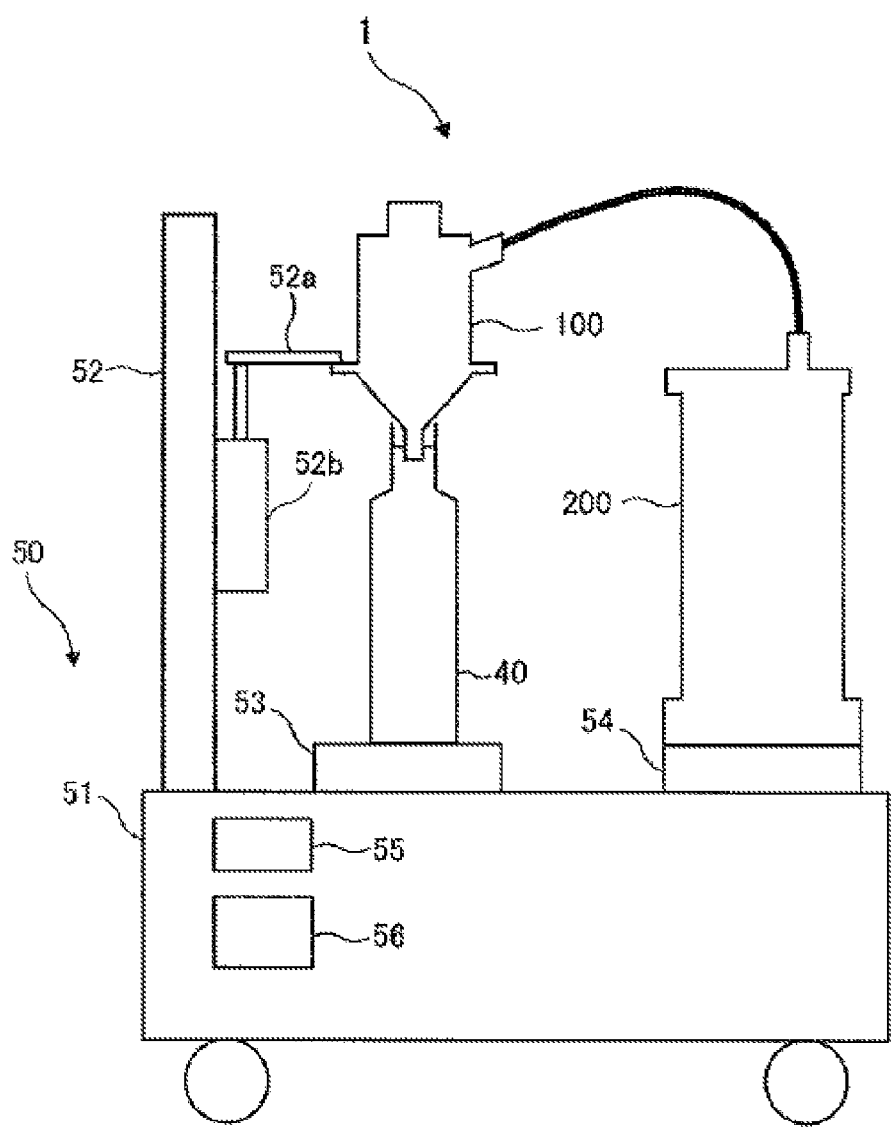
FIG. 36 is a schematic view of a powder-charging system according to one embodiment of the present invention.

Referring now to drawings, a powder-charging device according to embodiment No. 1B of the present invention will be described. First, the entire configuration of the powder-charging device according to the embodiment No. 1B is described with reference to FIG. 36. FIG. 36 is a schematic view of a powder-charging system according to one embodiment of the present invention.

A powder-charging system 1 includes: a powder-charging device 100 configured to sieve coarse particles from powder and charge the powder to a powder-charged container 40; a powder-supplying device 200 configured to supply powder to the powder-charging device 100; and a powder-charging system main body 50 configured to control the operation of the powder-charging device 100 and the powder-supplying device 200. A powder-charging method of the present embodiment is performed by the powder-charging system 1 according to the present embodiment. Through description of the powder-charging system 1 of the present embodiment, the powder-charging method of the present embodiment will also be described in detail.

<Configuration of Powder-Charging Device>

Figure 37:
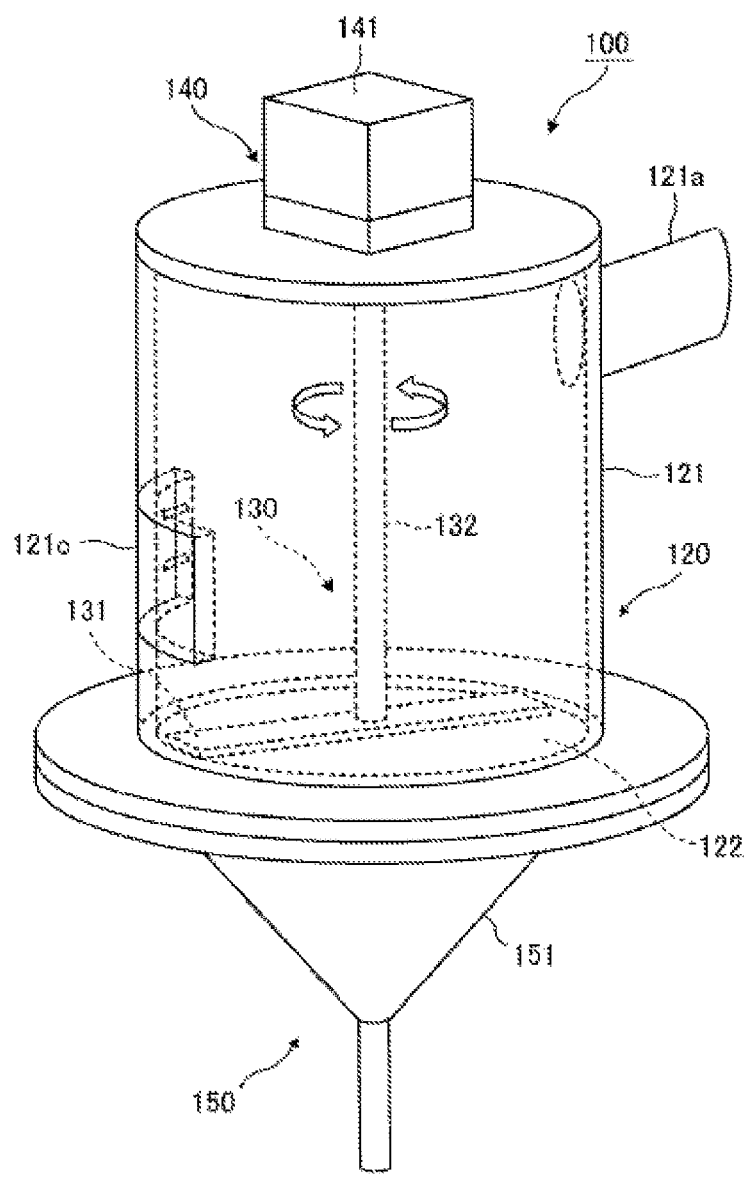
FIG. 37 is a perspective view of one exemplary powder-charging device.
Figure 38:
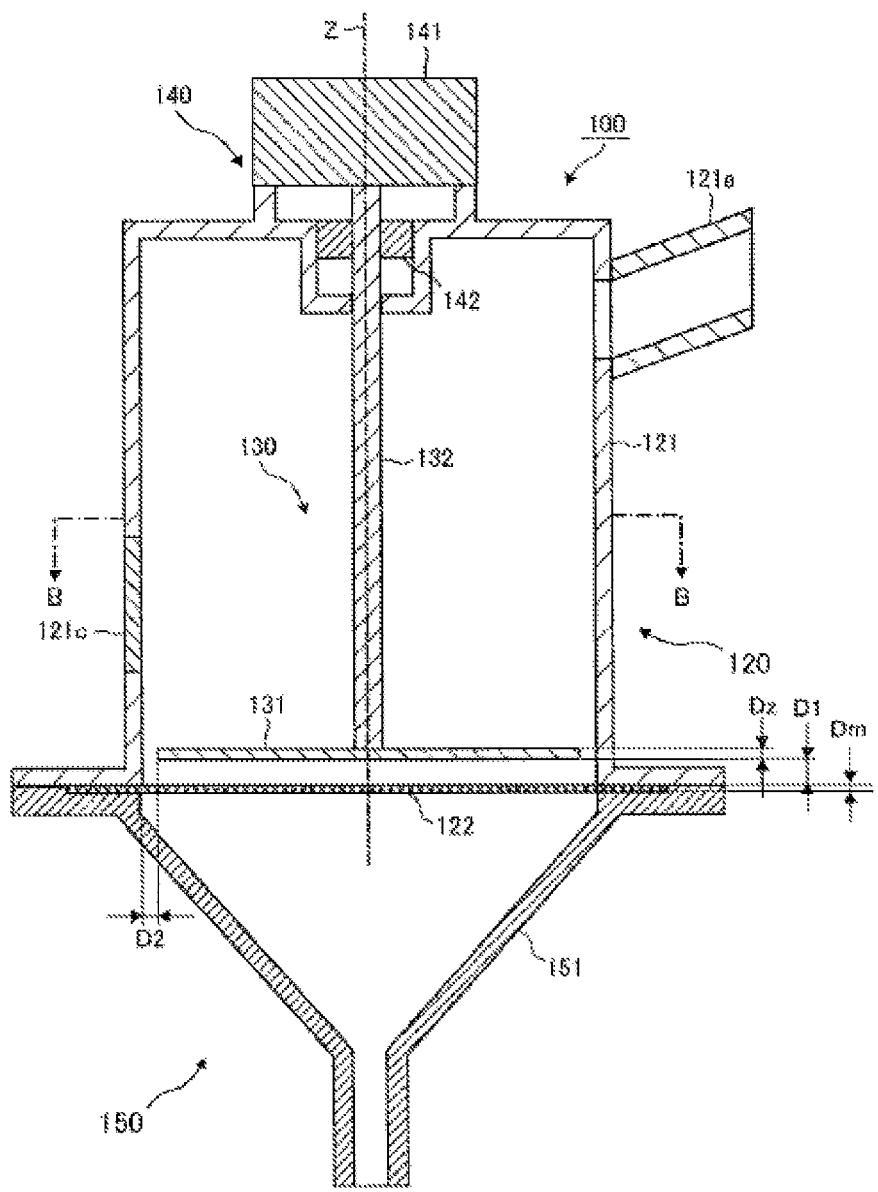
FIG. 38 is a cross-sectional view of one exemplary powder-charging device.

First, the powder-charging device 100 of the powder-charging system 1 is described with reference to FIGS. 37 and 38. FIG. 37 is a perspective view of the powder-charging device. FIG. 38 is a cross-sectional view of the powder-charging device. The powder-charging device 100 includes a sieve main body 120 and a charging portion 150; and, if necessary, further includes appropriately selected other units and members.

<<Sieve Main Body>>

The sieve main body 120 may be the same as the above-described sieving device of the present invention and thus its description is omitted.

<<Charging Portion>>

In the present embodiment, the charging portion 150 has a nozzle 151 which is one exemplary introducing unit. The nozzle 151 is a device which introduces the powder having passed through the filter 122 through rotation of the blade 131 to the powder-charged container 40. The member constituting the nozzle 151 is not particularly limited so long as it can introduce the powder to the powder-charged container 40, but is a stainless steel tube, for example. The nozzle 151 may be provided with a packing, with which the nozzle 151 is engaged with the powder-charged container 40. In the present embodiment, the nozzle 151 is not limited to those which charge powder to the powder-charged container 40 by its own weight, but may be those which apply pressure to powder using air and a pressing means to introduce the powder the powder-charged container 40. When the charging port of the powder-charged container 40 is small, the configuration where the powder is directly charged from the nozzle 151 to the powder-charged container 40 may be replaced a configuration where the powder is introduced via a funnel.

<<Powder-Charged Container>>

The powder-charged container 40 used in the present embodiment is not particularly limited, so long as it can be charged with powder by the powder-charging device 100. Examples thereof include a cylinder and a toner container (toner cartridge).

<<Powder-Supplying Device>>

Next, the powder-supplying device 200 of the powder-charging system 1 will be described with reference to FIG. 39.

Figure 39:
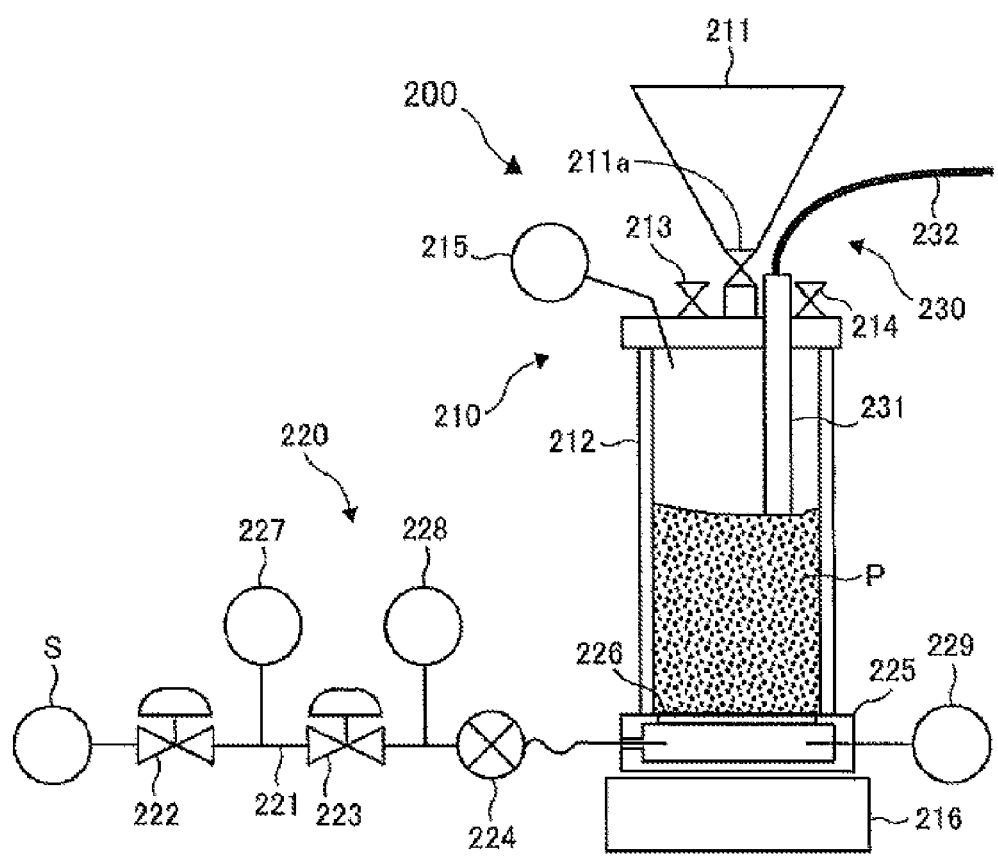
FIG. 39 is a schematic view of one exemplary powder-supplying device.

FIG. 39 is a schematic view of the powder-supplying device. The powder-supplying device 200 illustrated in FIG. 39 has a powder-supplying device main body 210, a gas-introducing unit 220 and a powder-supplying unit 230.

The powder-supplying device main body 210 has a powder-charging port 211, a powder-housing unit 212, a pressure release valve 213, a powder-flow-rate-adjusting valve 214, and a main-body-pressure meter 215. The powder-charging port 211 is a charging port through which the powder supplied to the powder-charging device 100 is charged to the powder-housing unit 212. The powder-charging port 211 is provided with a closing valve 211a. When powder is not supplied, the closing valve 211a is closed to seal the powder-housing unit 212. In the present embodiment, the closing valve 211a is opened or closed by driving a driving unit based on the control of the powder-charging system 1.

The powder-housing unit 212 is a unit configured to house the powder charged from the powder-charging port 211. The powder-housing unit is not particularly limited so long as it can house and seal powder therein. The powder-housing unit is, for example, a resin cylinder the top and bottom portions of which are sandwiched between metal flanges fixed together by a bolt.

The pressure release valve 213 is attached to the powder-housing unit 212, and seals or releases the interior of the powder-housing unit 212. In the present embodiment, the pressure release valve 213 is opened or closed by driving a driving unit based on the control of the powder-charging system 1. The powder-flow-rate-adjusting valve 214 is attached to the powder-housing unit 212, and finely adjusts the interior pressure of the powder-housing unit 212 to adjust the flow rate of powder supplied from the powder-supplying device 200. The main-body-pressure meter 215 measures the interior pressure of the powder-housing unit 212.

The gas-introducing unit 220 has a compressive air pipe 221, a first pressure-reducing valve 222, a second pressure-reducing valve 223, an air flow rate meter 224, an air header 225, a gas-permeating unit 226, a first pressure meter 227, a second pressure meter 228 and a third pressure meter 229. With this configuration, the gas-introducing unit 220 introduces gas to powder housed in the powder-housing unit 212 to thereby fluidize the powder.

The compressive air pipe 221 is a pipe through which compressive air supplied from a compressive air source S is fed to the air header 225. The member constituting the compressive air pipe 221 is not particularly limited so long as air can be fed therethrough to the air header 225, but is a stainless steel tube, for example. The compressive air source S may be mounted to the powder-supplying device 200 or may be provided outside of the powder-supplying device 200. When the compressive air source S is mounted to the powder-supplying device 200, the compressive air source S used is, for example, a pump.

The first pressure-reducing valve 222 and the second pressure-reducing valve 223 each reduce the pressure of the compressive air supplied from the compressive air source S, to thereby adjust the flow rate of the compressive air supplied to the air header 225. The air flow rate meter 224 measures the flow rate of the compressive air supplied to the air header 225.

The air header 225 is a unit configured to introduce into the powder-housing unit 212 the compressive air supplied from the compressive air pipe 221. The air header 225 has a connection portion with which it is connected with the compressive air pipe 221, and the compressive air is supplied via the connection portion from the compressive air pipe 221. The air header 225 is provided with a connection flange at the upper portion thereof where the connection flange can be attached to the lower portion of the powder-housing unit 212 (e.g., lower flange).

The gas-permeating unit 226 is provided at the boundary between the powder-housing unit 212 and the air header 225, and permeates the compressive air in the air header 225 to the powder-housing unit 212. The gas-permeating unit 226 is not particularly limited so long as it can permeate air, but is a porous plate such as a sintered metal plate, a sintered resin plate, a coarse metal net.

The first pressure meter 227 measures the interior pressure of the compressive air pipe 221 between the first pressure-reducing valve 222 and the second pressure-reducing valve 223. The second pressure meter 228 measures the interior pressure of the compressive air pipe 221 between the second pressure-reducing valve 223 and the air header 225. The third pressure meter 229 measures the interior pressure of the air header 226.

The powder-supplying unit 230 has a powder-discharging tube 231 and a powder-transporting tube 232. With this configuration, the powder-supplying unit 230 discharges powder fluidized by the gas-introducing unit 220 and supplies the powder to the powder-charged container 40.

The powder-discharging tube 231 is provided at the upper portion of the powder-housing unit 212 with, for example, an upper flange, and feeds powder P housed in the powder-housing unit 212 to the powder-transporting tube 232. The member constituting the powder-discharging tube 231 is not particularly limited so long as it can discharge powder P housed in the powder-housing unit 212, but is a stainless steel tube, for example.

The powder-transporting tube 232 is a tube for transporting the powder discharged from the powder-discharging tube 231 to the powder-charging device 100. The member constituting the powder-transporting tube 232 is not particularly limited so long as it can transport powder, but is a urethane tube, for example.

<<Powder-Charging System Main Body>>

Figure 40:
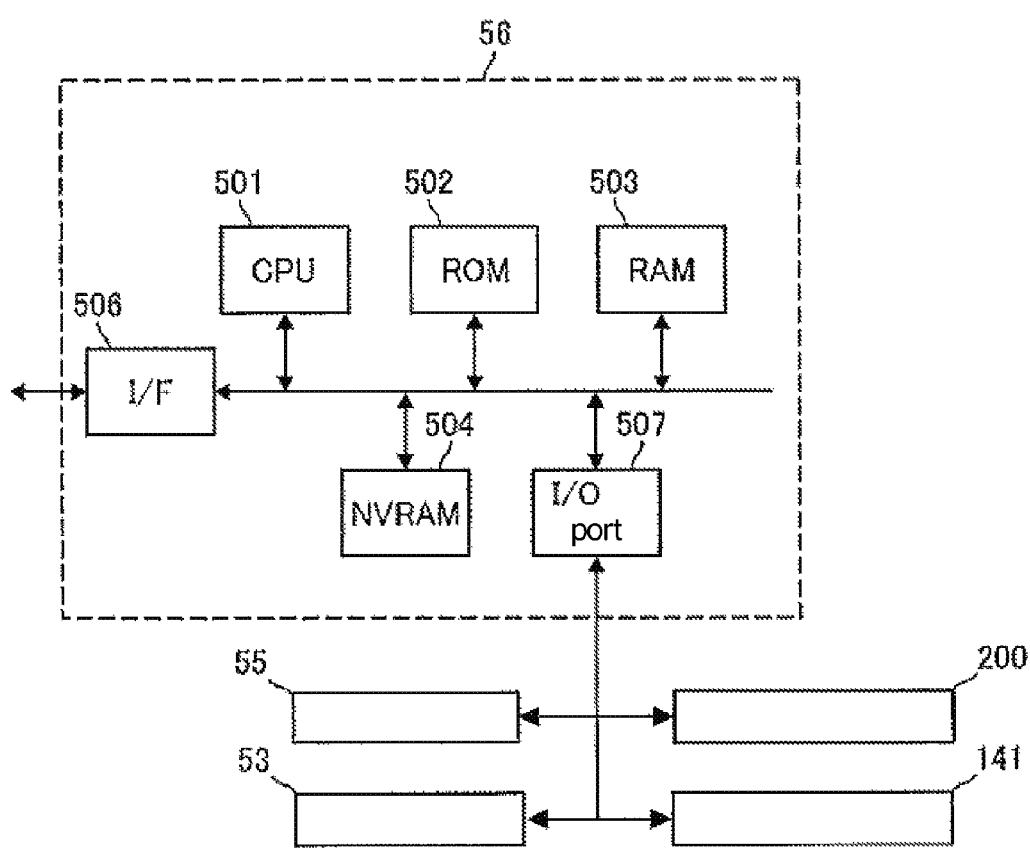
FIG. 40 is a hardware configurational diagram of a control section of the main body of a powder-charging system.
Figure 41:
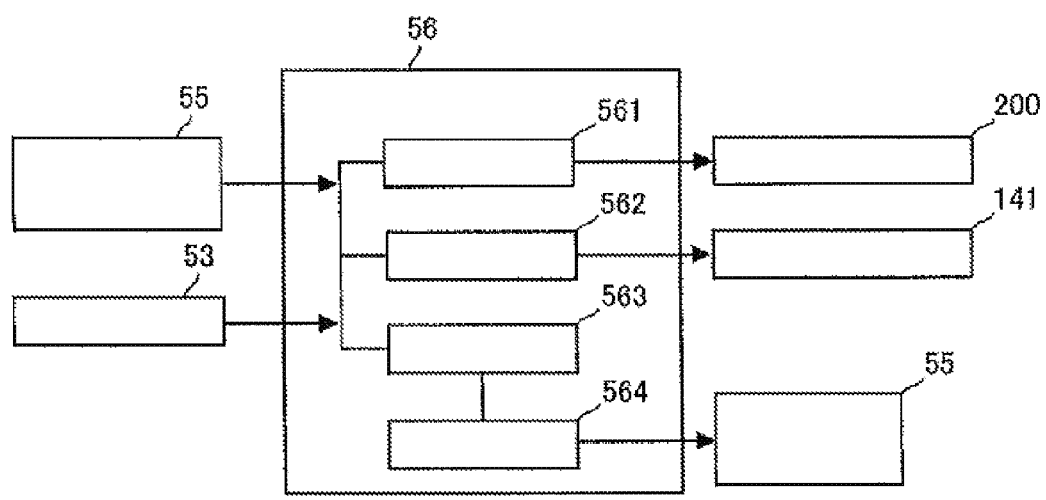
FIG. 41 is a functional block diagram of a control section of the main body of a powder-charging system.

Next, the powder-charging system main body 50 will be described with reference to FIGS. 36, 40 and 41. FIG. 40 is a hardware configurational diagram of a control section of the powder-charging system main body. FIG. 41 is a functional block diagram of a control section of the powder-charging system main body.

As illustrated in FIG. 36, the powder-charging system main body 50 has a casing 51, a raising and lowering unit 52, a powder-charging balance 53, a powder-supplying balance 54, a display 55 and a control section 56 which is one exemplary control device.

The casing 51 is a container for housing the display 55 and the control section 56 therein. In the present embodiment, the casing 51 has the raising and lowering unit 52, the powder-charging balance 53, and the powder-supplying balance 54. The casing 51 may be provided with casters, with which the powder-charging system 1 can easily be moved.

The raising and lowering unit 52 has a clamp 52a for fixing the powder-charging device 100 and a raising and lowering device 52b for raising and lowering the clamp 52a. The shape, material and size of the clamp 52a are not particularly limited so long as it can fix the powder-charging device 100 at a position where the nozzle 151 is to be attached to the charging port of the powder-charged container 40. The raising and lowering device 52b raises and lowers the clamp 52a to a position at which the nozzle 151 is attached to or removed from the powder-charged container 40. The raising and lowering device 52b may be moved manually or electrically. When the raising and lowering device 52b is moved electrically, known raising and lowering devices usch as a motor or air cylinder are suitably used. The raising and lowering device 52b may be directly attached to the casing 51, or may be attached to the casing 51 via a holding member holding the raising and lowering device 52b. When the charging port of the powder-charged container 40 is sufficiently large, it is not necessary to use the raising and lowering unit 52.

The powder-charging balance 53 measures the mass (charged amount) of the powder charged to the powder-charged container 40. In this case, with the mass of the powder-charged container 40 before supply of the powder set as tare, the powder-charging balance 53 can measure the charged amount of the powder. The powder-supplying balance 54 measures the mass (charged amount) of the powder supplied from the powder-supplying device 200. In this case, with the mass of the powder-supplying device 200 before supply of the powder set as tare, the powder-supplying balance 54 can measure the charged amount of the powder.

The display 55 is a display unit having a function as a display panel for notifying predetermined information of the powder-charging system 1 to an operator and a function of a touch panel for receiving input from the operator. The control section 56 controls the entire operation of the powder-charging system 1.

<<Hardware Configuration and Functional Configuration of Control Section>>

Next, the hardware configuration of the control section 56 of the powder-charging system main body 50 will be described. As illustrated in FIG. 40, the control section 56 has a CPU 501 controlling the entire operation of the powder-charging system 1, a ROM 502 storing a predetermined program, a RAM 503 used as a work area of the CPU 501, a nonvolatile memory (NVRAM) 504 retaining data while the power of the powder-charging system is off, an I/F (Interface) 506 for sending information to and receiving information from external devices such as a host computer, the display 55 and the powder-charging balance 53 of the powder-charging system main body 50, a blade-driving motor 141 of the powder-charging device 100, and an I/O (Input/Output) port 507 for sending information to and receiving information from the powder-charging device 200.

Next, the functional configuration of the control section 56 of the powder-charging system main body 50 will be described. As illustrated in FIG. 41, the control section 56 has a supply control section 561, a drive control section 562, a calculation section 563 and a notification section 564. Each of these sections is a function or means realized when any of the constituent elements illustrated in FIG. 40 operate following the order from the CPU 501 according to the program stored in the ROM 502.

The supply control section 561 controls the powder-supplying device 200 to control the supply of the powder therefrom based on the measurement result obtained by the powder-charging balance 53 and on the order received by the operation panel of the display 55. The drive control section 562 controls the blade-driving motor 141 to control the rotator 130 based on the above measurement result and order. The calculation section 563 calculates the powder-charging rate of the powder-charging device 100 based on the above measurement result. The notification section 564 displays, on the display 55, predetermined information to be notified to the operator based on the powder-charging rate calculated in the calculation section 563.

<<Powder>>

The powder used in the powder-charging system 1 is not particularly limited and may be appropriately selected depending on the intended purpose. Specific examples of the powder include a toner, synthetic resins such as synthetic resin powder or particles and powdery compounds or powder of products containing them; organic naturally occurring materials such as starch and wood powder; cereals such as rice, beans and flour or powder thereof; powder of inorganic compounds such as calcium carbonate, calcium silicate, zeolite, hydroxyapatite, ferrite, zinc sulfide and magnesium sulfide; metal powder such as iron powder, copper powder and nickel alloy powder; inorganic pigments such as carbon black, titanium oxide and red iron oxide; organic pigments such as phthalocyanine blue and indigo; and dyes. The sieve main body 120 according to the present embodiment can efficiently sieve from powder foreign matter such as coarse particles and dust with low stress and charge the powder with high accuracy. Thus, it is suitably used for sieving of toners and raw materials for cosmetics, pharmaceutical drugs, foods, and chemicals, which are required to be charged in constant amounts.

The toner may be the same toner as described in the above sieving device.

<<Operation and Process of Powder-Charging System According Embodiment>>

Figure 42:
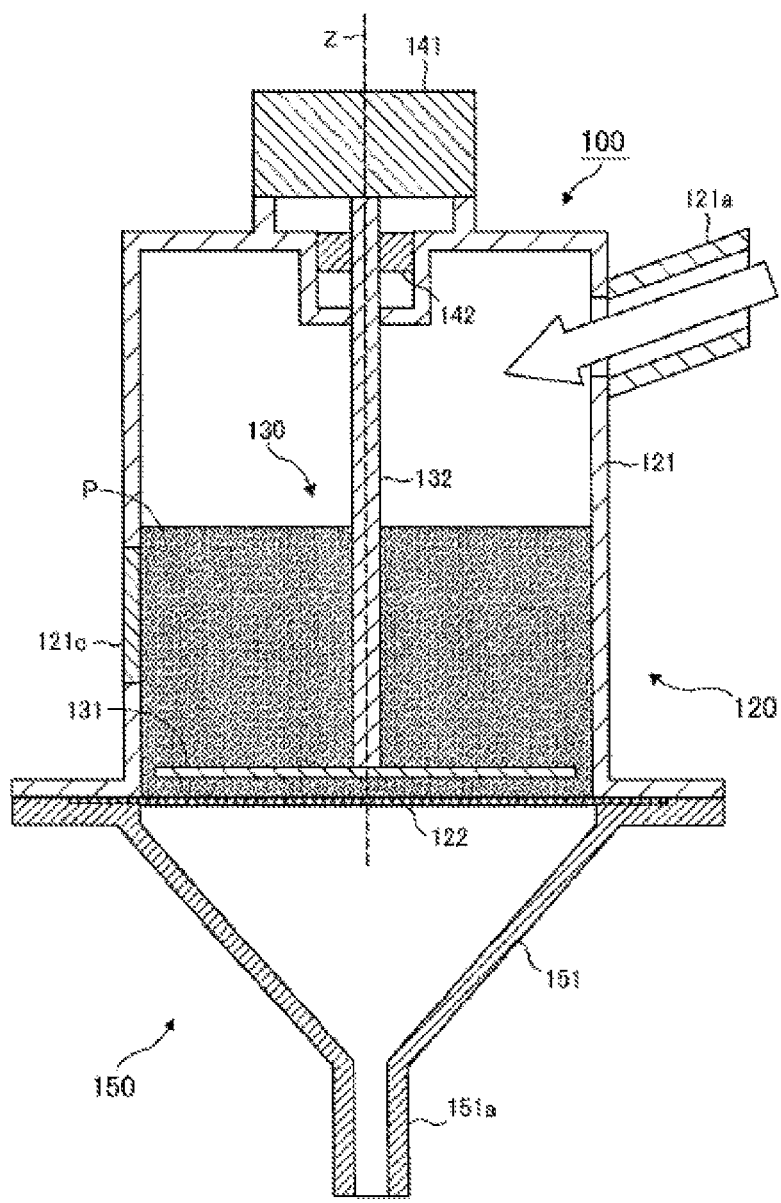
FIG. 42 schematically illustrates a state where powder is supplied to the powder-charging device illustrated in FIG. 37.
Figure 43:
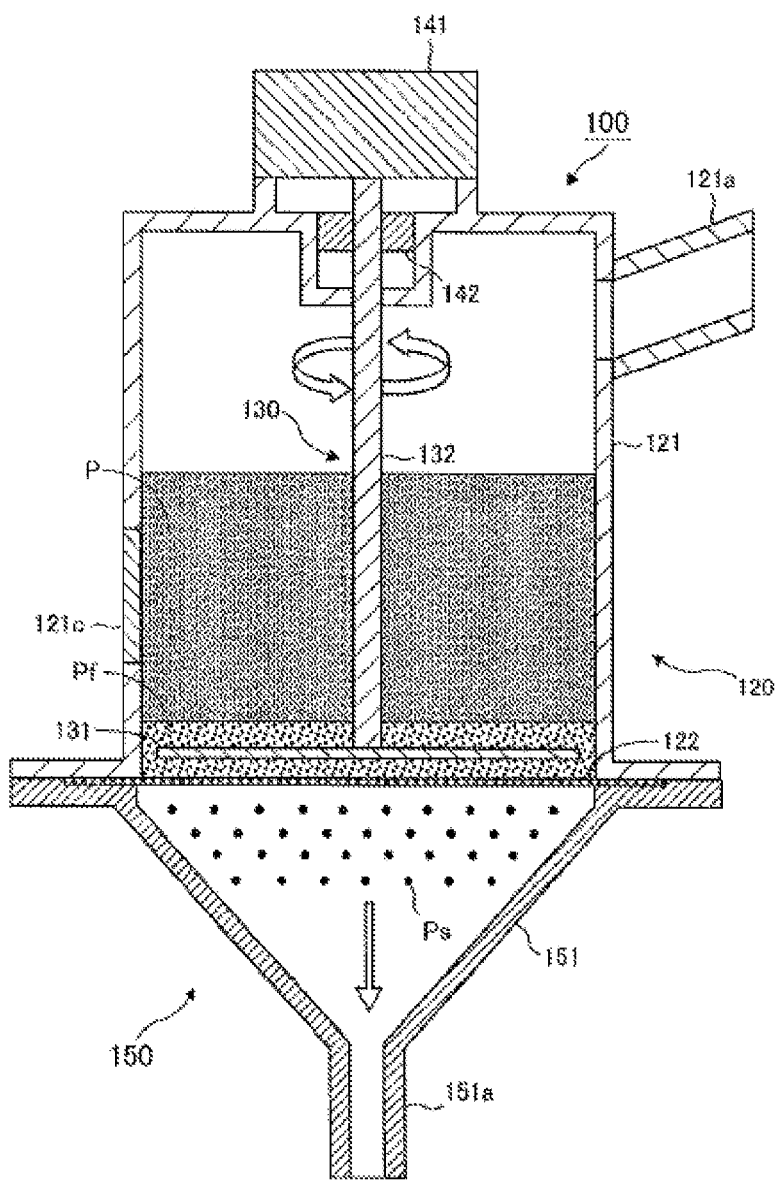
FIG. 43 schematically illustrates a state where powder is being sieved by the powder-charging device illustrated in FIG. 37.

Next, the operation of the powder-charging system 1 will be described with reference to FIGS. 36, 42, 13 and 43. FIG. 42 schematically illustrates a state where powder is supplied to the powder-charging device illustrated in FIG. 37. FIG. 43 schematically illustrates a state where powder is being sieved by the powder-charging device illustrated in FIG. 37.

<<Operation and Process Upon Initiation of Charging>>

When the operation panel of the display 55 receives, from an operator, a request for initiating the operation of the powder-charging device 100, the drive control section 562 sends a signal for rotating the rotator 130 to the blade-driving motor 141 based on the request. The blade-driving motor 141 rotates the rotator 130 based on the signal. As a result, the shaft 132 is rotated whereby the blade 131 attached to the tip of the shaft 132 rotates in close proximity to the filter 122 around the rotation axis Z. The rotation speed is not particularly limited but is 500 rpm to 4,000 rpm. In the present embodiment, when the blade 131 is rotated prior to supplying the powder to the sieve main body 120, the coarse particles remaining on the filter 122 after the previous operation can be fluidized to lead to cleaning of the surface of the filter 122. Thus, when the powder starts to be supplied, the sieve main body 120 can efficiently sieve the powder.

The powder to be supplied to the powder-charging device 100 has previously been charged from the powder-charging port 211 to the powder-housing unit 212 in the powder-supplying device 200. The supply control section 561 outputs, to the powder-supplying device 200, a signal for closing the closing valve 211a and a signal for closing the pressure release valve 213 based on a powder-supply-initiating request received by the operation panel of the display 55.

Based on the signals, the powder-supplying device 200 closes the closing valve 211a via a driving unit for the closing valve 211a and closes the pressure release valve 213 via a driving unit for the pressure release valve 213. Next, the first pressure-reducing valve 222 and the second pressure-reducing valve 223 are opened and compressive air is fed into the air header 225. In this case, the extent to which the first pressure-reducing valve 222 and the second pressure-reducing valve 223 are opened is adjusted based on the measurement results obtained by the first pressure meter 227, the second pressure meter 228, the third pressure meter 229 and the main body pressure meter 215, to thereby adjust the pressure of the compressive air to a predetermined value.

The gas fed into the air header 225 passes through the gas-permeating unit 226 to be uniformly dispersed in the powder housed in the powder-housing unit 212, whereby powder P housed in the powder-housing unit 212 is fluidized. The fluidized powder P in the powder-housing unit 212 is fed into the powder-discharging tube 231 due to the difference in pressure between the interior and the exterior of the powder-discharging tube 231. The powder P fed into the powder-discharging tube 231 is discharged to the powder-transporting tube 232, transported through the powder-transporting tube 232, and supplied to the powder-charging device 100. The extent to which the powder-flow-rate-adjusting valve 214 is opened is changed to finely adjust the interior pressure of the powder-housing unit 212, to thereby adjust the powder-charging rate.

As illustrated in FIG. 42, a certain amount of the powder supplied from the powder-charging device 200 is supplied via the supply portion 121a to the sieve main body 120 (supplying step). The powder P is deposited on the filter 122 in the frame 121. Here, when the ratio of the opening of the filter to the particle diameter of the powder is equal to or smaller than a certain value, even particles (powder) P the diameter of which is smaller than the opening of the filter support each other (bridge) to be deposited on the filter 122. The blade 131 rotates in the toner deposited on the filter 122 to fluidize the toner (stirring step, see FIG. 13). In the sieve main body 120 in which the powder P has been deposited, the rotating blade 131 generates vortex V in the opposite direction to the direction in which the blade 131 rotates. Here, the vortex refers to a flow of fluid generated alternatively or randomly in the opposite direction to the direction in which a solid is moved in the fluid.

Coarse particles Pc deposited on the filter 122 are brought into contact with the blade 131 and beaten by the blade 131 as well as blown up by the vortex V generated through the rotation of the blade 131 (see FIG. 13, cleaning effect of the surface of the filter). Small-particle-diameter toner particles Ps easily pass through the filter 122 by virtue of this cleaning effect. Also, fluidized particles Pf illustrated in FIG. 43 are mixed with air by the action of the vortex V to be lower in bulk density. When the fluidized toner particles Pf fall by their own weight, small-particle-diameter powder particles Ps efficiently pass through the filter 122 with low stress. Notably, the sieve main body 120 does not vibrate the filter 122 with ultrasonic waves or vibrating waves and thus, can prevent the following problems: clogging of the filter 122 caused by aggregating or softening of the powder due to frictional heat; and expansion of the openings of the filter 122 due to frictional stress. The powder particles Ps having passed through the filter 122 pass through the nozzle 151 to be charged to the powder-charging container 40 (charging step).

<<Operation and Process Upon Charging>>

Figure 44:
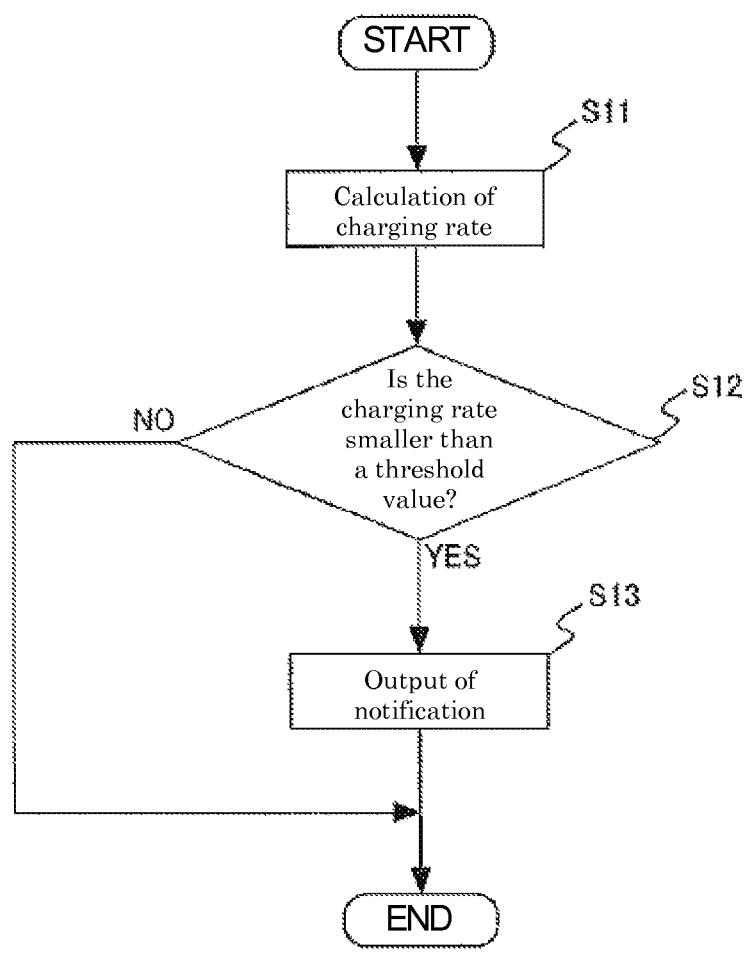
FIG. 44 is a flow diagram of the process of a powder-charging system.

Upon charging the powder, the powder-charging system 1 according to the present embodiment notifies predetermined information to the operator based on the charged amount of the powder. The process of the powder-charging system 1 is described with reference to FIG. 44 in this state. FIG. 44 is a flow diagram of the process of the control section 56 of the powder-charging system main body 50.

The mass (charged amount) of the powder charged to the powder-charged container 40 is measured with the powder-charging balance 53 and output via an I/O port 507 to the control section 56. The calculation section 563 obtains the charged amount measured by the powder-charging balance 53 at predetermined time intervals to calculate the powder-charging rate (step S11). In this case, the calculation section 563 can calculate the powder-charging rate by calculating change in the charged amount for a predetermined period of time.

When the charging rate is calculated by the calculation section 563, the notification section 564 judges whether the calculated charging rate is small than a predetermined threshold value (step S12). This predetermined threshold value is previously stored in the NVRAM 504 based on the input from an operation panel of an operator. When judging that the charging rate is smaller than the predetermined threshold value (YES in step S12), the notification section 564 prepares predetermined information to be notified to the operator and outputs the predetermined information to the display 55 (step S13). The operator confirms the predetermined information output on the display 55 to be able to predict failures of the powder-charging system 1. When judging that the charging rate is not smaller than the predetermined threshold value (NO in step S12), the notification section 564 terminates the process without preparing information to be notified to the operator.

<<Operation and Process Upon Termination of Charging>>

Figure 45:
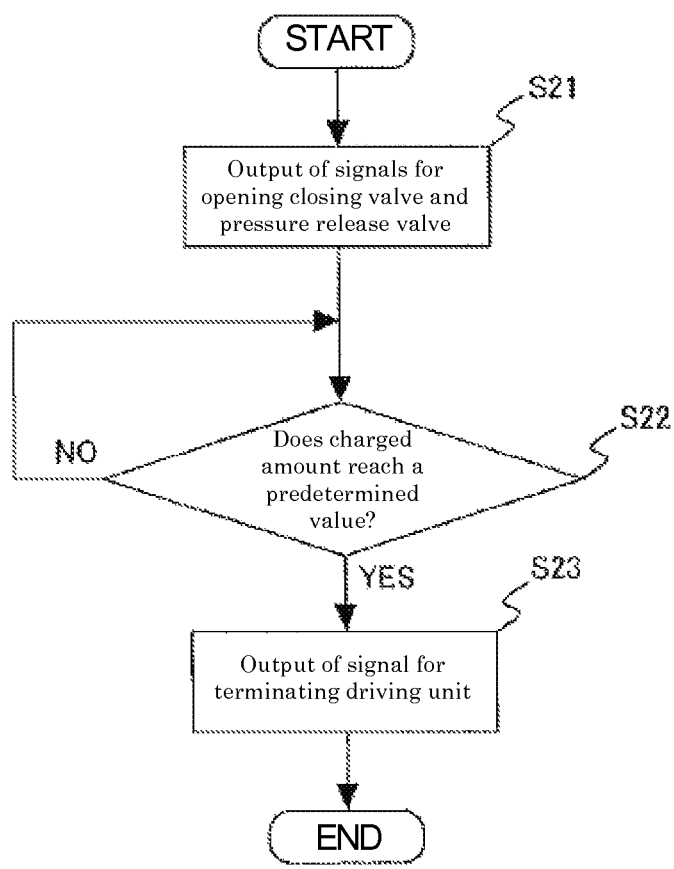
FIG. 45 is a flow diagram of the process of a powder-charging system.

Next, the operation and process of the powder-charging system 1 upon terminating charging of the powder is described with reference to FIG. 45. FIG. 45 is a flow diagram of the process of the control section 56 of the powder-charging system main body 50.

When the charged amount measured by the powder-charging balance 53 reaches a predetermined value smaller than the target value, the supply control section 561 outputs, to the powder-supplying device 200, a signal for opening the closing valve 211a and a signal for opening the pressure release valve 213 (step S21). Based on the signals, the powder-supplying device 200 opens the closing valve 211a via a driving unit for the closing valve 211a and opens the pressure release valve 213 via a driving unit for the pressure release valve 213. As a result, the interior and the exterior of the powder-housing unit 212 become equal in pressure whereby the supply of powder from the powder-supplying device 200 is terminated.

By allowing the blade 131 to rotate in a state the supply of powder from the powder-supplying device 200 is terminated, the amount of the powder in the sieve main body 120 of the powder-charging device 100 becomes small, resulting in that the rate at which the powder-charging device 20 supplies powder to the powder-charged container 40 becomes small. Next, the drive control section 562 judges whether the charged amount of powder measured by the powder-charging balance 53 reaches the target amount (step S22). When judging that the charged amount reaches the target amount (YES in step S22), the drive control section 562 outputs to the blade-driving motor 141 a signal for terminating the rotation of the rotator 130 (step S23). Then, the blade-driving motor 141 terminates the rotation of the rotator 130 based on the signal. As a result, the rotation of the blade is terminated whereby the powder-charging device 100 terminates charging of the powder to the powder-charged container 40. In this case, since the charging of the powder can be terminated in a state where the powder charging rate of the powder-charging device 100 has become small, it is possible to accurately control the charged amount of the powder. In addition, the amount of the powder left on the filter 122 upon termination of the apparatus is also small to prevent clogging due to the residual powder. When the charged amount measured by the powder-charging balance 53 does not fall within a predetermined range after completion of charging the powder, the notification section 564 can display predetermined information on the display panel. Based on the predetermined information, the operator can confirm that the charged amount in the powder-charged container 40 is excessive or insufficient.

[Embodiment No. 2B]

Figure 46:
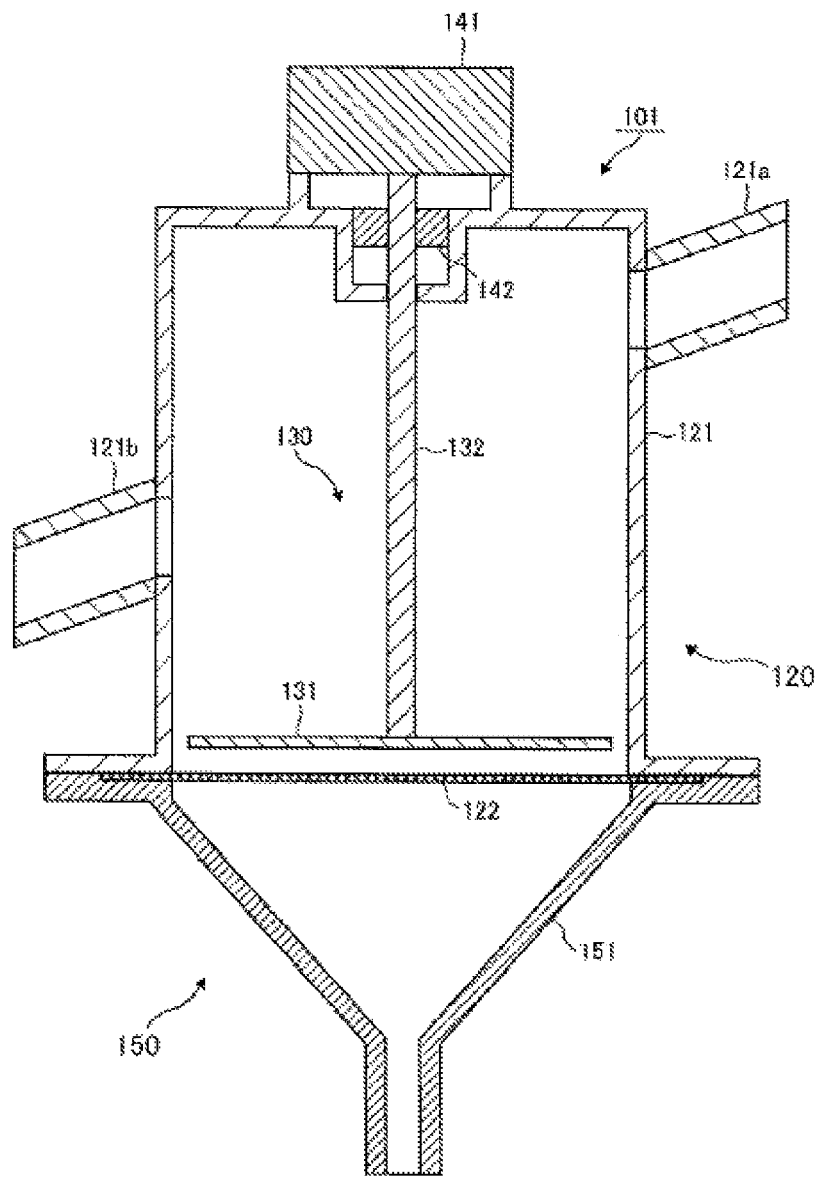
FIG. 46 is a cross-sectional view of a powder-charging device according to one embodiment of the present invention.

Referring now to FIG. 46, a powder-charging device according to embodiment No. 2B of the present invention will be described. Different points from the powder-charging device according to embodiment No. 1B are described. FIG. 46 is a cross-sectional view of the powder-charging device according to embodiment No. 2B of the present invention. Notably, in FIG. 46, the same members as the powder-charging device according to embodiment No. 1B are indicated by the same reference symbols, and their detail descriptions are omitted.

A powder-charging device 101 illustrated in FIG. 46 is the same as the powder-charging device 100 of the powder-charging system 1 according to embodiment No. 1B except that a discharge portion 121b is provided in the frame 121.

<Discharge Portion>

The frame 121 is provided with the discharge portion 121b through which excessive powder is discharged from the sieve main body 121 when the powder deposited on the filter 122 and housed in the sieve main body 120 exceeds a predetermined amount. When the amount of the powder supplied from the supply portion 121a is much larger than the amount of the powder passing through the filter 122, the amount of the powder deposited on the filter 122 continues to increase. In the present embodiment, the discharge portion 121b serves to discharge the excessive powder to the outside, enabling the powder-discharging apparatus 100 to continuously operate for a long period of time. In addition, it is possible to efficiently sieve a large amount of powder.

The size, shape, structure and material of the discharge portion 121b are not particularly limited, so long as the discharge portion 121b can discharge excessive powder from the sieve main body 120, and may be appropriately selected depending on the size, shape and structure of the sieve main body 120. Examples of the material of the discharge portion 121b include: metals such as stainless steel, aluminum and iron; and resins such as ABS, FRP, polyester resins and polypropylene resins. The shape and size of the discharge portion 121b are not particularly limited and may be appropriately selected depending on the intended purpose. The discharge portion 121b is preferably provided at the side surface, end surface or upper surface of the frame 121 at the side where the powder is supplied. In one possible configuration, the powder discharged from the discharge portion 121b is directly supplied from the supply portion 121a and sieved again.

[Supplemental Description of Embodiments]

Although the powder-charging devices (100, 101) according to each embodiment have been described, the present invention is not limited to the above embodiments and may be variously modified without departing from the spirit of the present invention. For example, in the above embodiments, although the shaft 132 is provided with the blade 131 in one step, the blades 131 in two steps may be provided at different heights of the shaft 132, if necessary.

In the above embodiments, although the filter 122 is provided on the entire surface of the sieve main body 120 at the side where the powder is discharged as illustrated in FIGS. 38 to 46, the powder-charging device of the present invention is not limited to this configuration. The filter 122 may be provided on a part of the surface of the sieve main body 120 where the toner is discharged.

Figure 47:
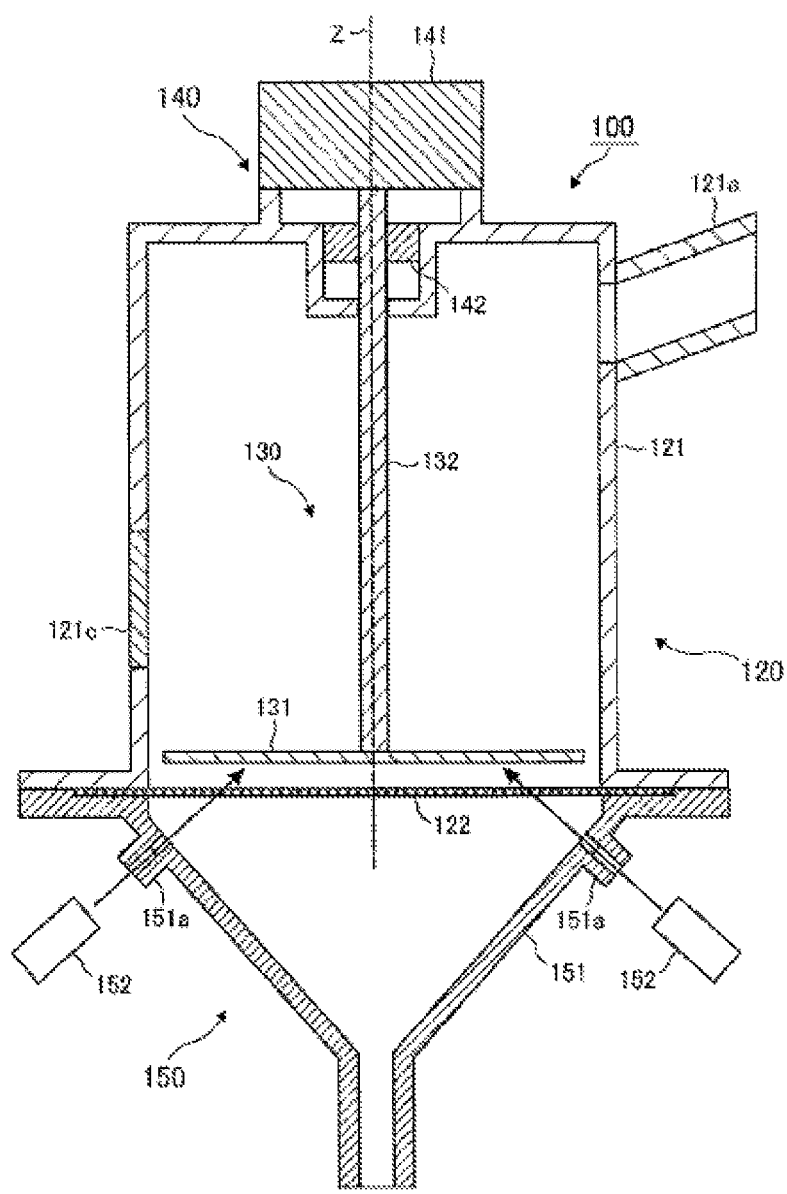
FIG. 47 is a cross-sectional view of a powder-charging device according to one embodiment of the present invention.

As illustrated in FIG. 47, the nozzle 151 of the powder-charging device 100 may be provided with an air introduction port 151a. FIG. 47 is a cross-sectional view of a powder-charging device according to one embodiment of the present invention. In the powder-charging device 100 illustrated in FIG. 47, the charging portion 150 is provided with a gas-introducing unit 152 for introducing gas from the outside of the nozzle 151 into the sieve main body 120 through the air introduction port 151a and the filter 122. By introducing gas from the gas-introducing unit 152 into the sieve main body 120 through the filter 122, it is possible to clean the powder deposited on or in the filter 122. When the operation of the powder-charging device 100 is terminated, the cleaning door 121c can be opened to collect the powder on the filter 122 for cleaning.

In the above embodiment, the supply control section 561 and the drive control section 562 output predetermined signals based on operator's requests received by the operation panel of the display 55. The present invention is, however, not limited to the above embodiment. For example, the above embodiment can be replaced with a configuration where requests are received based on detection signals indicating that a light curtain, a timer and the powder-charged container 40 are set in the powder-charging system.

In the above embodiments, the powder-supplying device 200 is used as a device for supplying the powder to the powder-charging device 100. However, the present invention is not limited to the embodiments. In the above embodiments, the powder-supplying device 200 can be replaced with a pump such as a bellows-type pump, a diaphragm-type pump or a snake-type pump; a unit such as force feeding by compression air, a coil screw, or an auger; or falling by its own weight of the powder.

[Effects Of Embodiments]

The sieve main body 120 of the powder-charging device (100, 101) according to the above embodiments has the blade 131 that is disposed in close proximity to the filter 122 and rotatably around the rotation axis Z crossing the filter 122. In the sieving, the blade 131 stirs only the powder present at the bottom of the frame 121 without entirely stirring the powder therein, leading to energy saving. Also, the powder particles passing through the filter 122 through rotation of the blade 131 are mainly moved in the direction of the rotation axis Z.

Thus, the sieve main body 120 does not require a large space for collecting the powder particles having passed through the filter 122. When mounted in the powder-charging device (100, 101), the sieving device 100 can prevent it from being enlarged. The sieving device 100 performs sieving by driving the blade 131 without vibrating the filter 122. The sieving device 100 provides an effect of preventing the continuation of the discharge of the toner due to the vibration of the filter after termination of the operation.

When the blade 131 of the sieve main body 120 according to the above embodiment is rotated, the powder P is fluidized. When the fluidized powder particles Pf fall by their own weight, the small-particle-diameter powder particles Ps efficiently pass through the filter 122 with low stress. The sieve main body 120 is downsized as compared with the ultrasonic sieving device having the comparable performance, retaining portability of the powder-charging device 100.

The frame 121 of the powder-charging device 101 according to the above embodiment is provided with the discharge portion 121b. The discharge portion 121b can discharge excessive powder and air in the sieve main body 120 to the outside, enabling the powder-charging device 101 to continuously operate for a long period of time.

The powder-charging device 100 according to the above embodiment has the gas-introducing unit 152 configured to introduce gas from the outside of the nozzle 151 into the sieve main body 120 through the air introduction port 151a and the filter 122. By introducing gas from the gas-introducing unit 152 into the sieve main body 120 through the filter 122, it is possible to clean the powder deposited on or in the filter 122.

The frame 121 of the sieve main body 120 is provided with the cleaning door 121c openable and closable. With this configuration, when the operation of the powder-charging device 100 is terminated, the cleaning door 121c can be opened to collect the powder on the filter 122 for cleaning.

In the powder-charging system 1 according to the above embodiment, the supply control section 561 of the powder-charging system main body 50 outputs, to the powder-supplying device 200, a signal for closing the closing valve 211a and a signal for closing the pressure release valve 213 (step S21). Then, the drive control section 562 outputs to the blade-driving motor 141 a signal for terminating the rotation of the rotator 130 (step S23). As a result, since the operation of the powder-charging device 100 can be terminated in a state where the powder charging rate of has become small, it is possible to accurately control the charged amount of the powder.

The calculation section 563 of the powder-charging system main body 50 according to the present embodiment obtains the charged amount measured by the powder-charging balance 53 at predetermined time intervals to calculate the powder-charging rate (step S11). When the charging rate is smaller than a predetermined threshold value (YES in step S12), the notification section 564 prepares predetermined information to be notified to the operator and outputs the predetermined information to the display 55 (step S13). The operator confirms the predetermined information output on the display 55 to be able to predict failures of the powder-charging system 1.

The powder-supplying device 200 according to the above embodiment disperses gas in the powder housed in the powder-housing unit 212, and supplies the fluidized powder to the powder-charging device 100. As a result, the powder supplied to the powder-charging device 100 becomes low in bulk density, enabling the powder-charging device 100 to efficiently sieve the powder with low stress.

In the powder-charging device (100, 101) according to the above embodiments, the blade 131 is set so that the length (Dz) of the blade 131 in the direction parallel with respect to the rotation axis Z is shorter than the length (Dx) of the blade 131 in the rotation direction around the rotation axis Z. With this configuration, the rotating blade 131 easily generates vortex in the opposite direction to the direction in which the blade 131 is rotated, to thereby efficiently fluidize powder particles.

In the powder-charging device (100, 101) according to the above embodiments, the distance between the blade 131 and the filter 122 can be set to 5 mm or less. With this configuration, the vortex generated in the opposite direction to the direction in which the blade 131 is rotated can easily reach the filter 122, sufficiently fluidizing the powder deposited on the filter 122.

In the powder-charging device (100, 101) according to the above embodiments, the blade 131 is attached to the shaft 132 disposed at the rotation axis Z. With this configuration, the blade 131 can accurately be rotated around the rotation axis Z.

In the powder-charging device (100, 101) according to the above embodiments, each of the ends of the blade 131 is in close proximity to the frame 121. With this configuration, the powder can be prevented from being collected near the frame 121 by the action of centrifugal force generated by rotation of the blade 131. As a result, it is possible to efficiently sieve the powder.

EXAMPLES

Referring to the drawings, the present invention will be described in detail by way of Examples, which should not be construed as limiting the present invention thereto. In the following Examples, "toner" was used as "powder" and a method of sieving toner with "sieving device" corresponds to "sieving method" of the present embodiment.

Example 1

In Example 1, the sieving device 100 according to embodiment No. 1 as illustrated in FIG. 1 was used. The sieving device 100 in Example 1 has a frame 121 provided with a supply portion 121a, a filter 122 disposed at the powder-discharged side of the frame 121, and a rotator 130 equipped with a blade 131.

A toner is supplied to the frame 121 which is hollow cylindrical. The material of the frame 121 is stainless steel (SUS). The size of the frame 121 is 135 mm×135 mm×186 mm. The interior volume thereof is 2,661 mL. The blade-driving motor 141 in FIG. 1 is driven to rotate the rotator 130 equipped with the blade 131.

The filter 122 is disposed at the toner-discharged side of the frame 121. The filter 122 in Example 1 is made of stainless steel. The filter 122 has an opening size of 48 μm and an opening ratio of 33.6%

The frame 121 is provided at the central portion with the rotator 130 having at least the blade 131 so as to be rotatable in the direction indicated by arrow E in FIG. 4. The rotator 130 has the blade 131 and a shaft 132 connected with the blade 131. The shaft 132 is rotatably connected with the blade-driving motor 141. In Example 1, the blade 131 and the shaft 132 are made of stainless steel, the thickness of the blade 131 is 1.5 mm, the number of blades 131 is two, and the angle formed between the blade 131 and the filter 122 is 0°.

As illustrated in FIG. 3, the blade 131 is rotatably disposed in close proximity to and above the toner-charged surface of the filter 122. In Example 1, the distance between the blade 131 and the filter 122: D1 (see FIG. 2) is 2 mm. Also, the distance of the frame 121 and each of the end portions of the blade 131: D2 (see FIG. 2) is 2.5 mm. The rotation speed of the blade 131 was set to 2,000 rpm.

The side surface at the toner-charging side of the frame 121 is provided with the supply portion 121a, through which the toner can supplied from a powder-supplying device 11 to the frame 121. In Example 1, the powder-supplying device 11 used is a powder-transporting pump.

Example 2

A sieving device 100 of Example 2 was produced in the same manner as in Example 1, except that the material of the frame 121 is an acrylic resin, the size of the frame 121 is 135 mm×135 mm×186 mm, the interior volume of the sieving device 100 is 2,661 mL, the filter 122 is made of polyester and has an opening size of 48 μm and an opening ratio of 34%, the blade 131 is made of stainless steel and has a thickness of 3.0 mm, D1=5.0 mm, D2=17.5 mm, and the rotation speed of the blade 131 is 3,000 rpm.

Example 3

A sieving device 100 of Example 3 was produced in the same manner as in Example 1, except that the material of the frame 121 is stainless steel, the size of the frame 121 is 100 mm×100 mm×186 mm, the interior volume of the sieving device 100 is 1,460 mL, the filter 122 is made of stainless steel and has an opening size of 43 μm and an opening ratio of 34.7% (#350), the blade 131 is made of stainless steel and has a thickness of 3.0 mm, D1=2.0 mm, D2=10.0 mm, and the rotation speed of the blade 131 is 1,500 rpm.

Example 4

A sieving device 100 of Example 4 was produced in the same manner as in Example 1, except that the material of the frame 121 is an acrylic resin, the size of the frame 121 is 135 mm×135 mm×300 mm, the interior volume of the sieving device 100 is 4,292 mL, the filter 122 is made of polyester and has an opening size of 37 μm and an opening ratio of 26%, the blade 131 is made of nylon and has a thickness of 1.5 mm, D1=2.0 mm, D2=2.5 mm, and the rotation speed of the blade 131 is 1,000 rpm.

Example 5

—Production of Toner Sieving Device—

In Example 5, the sieving device 101 according to embodiment No. 2 as illustrated in FIG. 15 was used. The sieving device 101 used in Example 5 has the same configuration as the sieving device 100 in Example 1 as illustrated in FIGS. 1 to 6, except that the frame 121 is provided with the discharge portion 121b.

Next, in the below-described manner, foreign matter-containing toners of Experimental Examples 1 to 4 were prepared and used for sieving experiments with the sieving devices in Examples.

Experimental Example 1

—Preparation of Toner—

A polyester resin (weight average molecular weight: 9,000, acid value: 33 mgKOH/g) (82 parts by mass), a Ti—Fe colorant (Ti content: 14% by mass, BET specific surface area: 17 m$^2$/g) (13 parts by mass), a charge controlling agent (SPI- LONBLACK TR-H, product of HODOGAYA CHEMICAL CO., LTD.) (2 parts by mass) and a low-molecular-weight polypropylene (weight average molecular weight: 6,000) (3 parts by mass) were kneaded with a biaxial extruder, pulverized and classified so as to have a weight average particle diameter of 5.5 μm. Using HENSCHEL MIXER, the resultant mixture was mixed with fine titanium oxide particles (MT-150AI, product of TAYCA Co.) (1.0 part by mass) and fine silica powder (R972, product of Clariant Japan Co.) (1.5 parts by mass). Through the above procedure, a toner of Experimental Example 1 was produced. The obtained toner was found to have a number average diameter of 6.0 μm and a saturation magnetization us of 4.1 emu/g. The proportion of toner particles having a diameter of 5 μm or lower in this toner was found to 70% by number.

<Foreign Matter>

A styrene-n-butyl methacrylate copolymer (100 parts by mass), carbon black (8 parts by mass) and zinc salicylate (8 parts by mass) were mixed together. The resultant mixture was melt-kneaded with a heat roller mill, followed by cooling and then coarsely milling using a hammer mill. Thereafter, the thus-treated product was finely milled with a fine mill employing an air jet process. The obtained fine powder was classified to prepare foreign matter having an average particle diameter of 100 μm and containing on particles having a diameter of 50 μm or less.

<Powder>

The above-produced toner of Experimental Example 1 was added to 50 g of the foreign matter so that the total mass became 1,000 g, to thereby obtain powder.

<Evaluation>

The obtained powder was sieved using the sieving device of Example 1. Notably, the blade 131 was rotated at 2,000 rpm. Then, the proportion of the foreign matter in the toner before or after sieving and the number average particle diameter of the toner were measured in the below-described manner. The results are shown in Table 1.

<Proportion of Foreign Matter in Toner Before or After Sieving>

Foreign matter in the toner before sieving A (g/100 g):

The proportion of the foreign matter was calculated based on the formulation in sample preparation.

Mass of foreign matter and toner on the filter before sieving B (g):

The difference between a mass of a blank filter and a mass of the filter 122 used in each Example was calculated to obtain a mass of foreign matter and toner on the filter 122 before sieving.

Mass of toner after sieving C (g):

The mass of the sample having passed through the filter 122 was measured.

Mass of foreign matter and toner on the filter after sieving D (g):

The difference between a mass the blank filter and a mass of the filter 122 used in each Example was calculated to obtain a mass of foreign matter and toner on the filter 122 after sieving.

Foreign matter in toner after sieving E (g/C(O)):

The mass D (g) of the foreign matter and the toner on the filter 122 after sieving was divided by the mass C (g) of the toner after sieving to obtain toner foreign matter in toner after sieving E (g/C(O)).

(Measurement of Number Average Particle Diameter of Toner)

A surfactant (0.1 mL to 5 mL), preferably an alkylbenzene sulfonic acic salt, was added as a dispersing agent to an aqueous electrolyte solution (100 mL to 150 mL). Here, the aqueous electrolyte solution was an about 1% by mass aqueous NaCl solution prepared using 1st grade sodium chloride, and examples of commercially available products thereof include ISOTON-II (product of Coulter, Inc.). Subsequently, a measurement sample (2 mg to 20 mg) was added to the aqueous electrolyte solution. The resultant aqueous electrolyte solution containing the measurement sample suspended therein was dispersed with an ultrasonic wave disperser for about 1 min to about 3 min. The dispersed aqueous electrolyte solution was analyzed with Coulter Counter TA-II or Coulter Multisizer II (these products are of Coulter, Inc.) using an aperture of 100 μm to measure the number or volume of the toner. Then, the volume particle size distribution and number particle size distribution were calculated from the obtained values. From these distributions, the number average particle diameter of the toner was obtained.

Experimental Example 2

—Preparation of Dispersion Liquid of Fine Organic Resin Particles (1)—

Into a reaction vessel to which a stirring rod and a thermometer had been set, 683 parts by mass of water, 14 parts by mass of sodium salt of sulfuric acid ester of ethylene oxide adduct of methacrylic acid ("ELEMINOL RS-30," product of Sanyo Chemical Industries Ltd.), 137 parts by mass of styrene, 55 parts by mass of butyl acrylate, 83 parts by mass of methacrylic acid, 8 parts by mass of n-dodecymercaptan ("THIOKALCOL 20," product of Kao Corporation) and 1.2 parts by mss of ammonium persulfate were charged, and then stirred at 400 rpm for 15 min to thereby obtain a white emulsion. The resultant emulsion was heated to a system temperature of 75° C. and was allowed to react for 4 hours. Then, 30 parts by mass of a 1% by mass aqueous ammonium persulfate solution was added thereto, followed by aging at 71° C. for 6 hours, to thereby obtain an aqueous dispersion liquid (fine organic resin particle dispersion liquid (1)) of vinyl resin particles (copolymer of styrene-methacrylic acid-sodium salt of sulfuric acid ester of ethylene oxide adduct of methacrylic acid). The solid content concentration of the obtained fine organic resin particle dispersion liquid (1) was found to be 30% by mass. Some of the fine organic resin particles contained in the fine organic resin particle dispersion liquid (1) were dried to isolate the resin. The isolated resin was then measured for glass transition temperature (Tg) and weight average molecular weight (Mw), which were found to be 90° C. and 8,000, respectively.

—Synthesis of Unmodified Polyester (Low-Molecular-Weight Polyester) (1)—

Into a reaction vessel equipped with a condenser, a stirrer, and a nitrogen-introducing tube, 229 parts by mass of bisphenol A ethyleneoxide (2 mol) adduct, 529 parts by mass of bisphenol A propionoxide (3 mol) adduct, 208 parts by mass of terephthalic acid, 46 parts by mass of isophthalic acid, and 2 parts by mass of dibutyltin oxide were charged, allowing the resultant mixture to react for 5 hours at 230° C. under normal pressure. Subsequently, the reaction mixture was allowed to react for 5 hours at a reduced pressure of 10 mmHg to 15 mmHg. Trimellitic anhydride (44 parts by mass) was added to the reaction vessel, and the reaction mixture was allowed to react at 180° C. for 2 hours to synthesize unmodified polyester (1). The thus-obtained unmodified polyester (1) had a weight average molecular weight (Mw) of 3,200 in the THF soluble matter, a glass transition temperature (Tg) of 42° C., and an acid value of 21 mgKOH/g.

<Preparation Step of Oil-in-Water Type Dispersion Liquid>

An oil-in-water type dispersion liquid containing particles dispersed was prepared in the following manner.

—Preparation of Solution or Dispersion Liquid of Toner Materials—

—Preparation of Master Batch (MB)—

1,200 parts by mass of water, 540 parts by mass of carbon black ("Printex 35," product of Degussa, DBP oil absorption amount: 42 mL/100 g, pH: 9.5), and 1,200 parts by mass of the unmodified polyester (1) were mixed by means of HENSCHEL MIXER (product of Mitsui Mining Co., Ltd.). The resultant mixture was kneaded at 150° C. for 30 min by a two-roller mill, cold-rolled, and pulverized by a pulverizer (product of Hosokawa micron Co., Ltd.), to thereby prepare a master batch.

—Preparation of Organic Solvent Phase—

A reaction vessel to which a stirring rod and a thermometer were set was charged with carnauba wax (110 parts by mass), CCA ("salicylic acid metal complex E-84," product of Orient Chemical Industries, Ltd.) (22 parts by mass) and ethyl acetate (743 parts by mass), and the mixture was heated to 80° C. under stirring. The resultant mixture was maintained at 80° C. for 5 hours and then cooled to 30° C. for 1 hour. Subsequently, the masterbatch (500 parts by mass) and ethyl acetate (500 parts by mass) were charged into the reaction vessel, followed by mixing for 1 hour, to thereby prepare a raw material solution. The prepared raw material solution (1,875 parts by mass) was placed in a reaction vessel, and the carbon black was dispersed with a bead mill ("ULTRA VISCOMILL," product of AIMEX CO., Ltd.) under the following conditions: a liquid feed rate of 1 kg/hr, disc circumferential velocity of 6 m/s, 0.5 mm-zirconia beads packed to 80% by volume, and 3 passes. Next, a 65% by mass ethyl acetate solution of the unmodified polyester (1) (3,039 parts by mass) was added thereto, and passed once with the bead mill under the above conditions, to thereby obtain an organic solvent phase.

—Synthesis of Prepolymer—

Into a reaction vessel equipped with a condenser, a stirrer, and a nitrogen-introducing tube, 685 parts by mass of bisphenol A ethyleneoxide (2 mol) adduct, 81 parts by mass of bisphenol A propyleneoxide (2 mol) adduct, 281 parts by mass of terephthalic acid, 24 parts by mass of trimellitic anhydride, and 3 parts by mass of dibutyltin oxide were charged, allowing the resultant mixture to react for 10 hours at 230° C. under normal pressure. Subsequently, the reaction mixture was allowed to react for 8 hours at a reduced pressure of 10 mmHg to 15 mmHg, to thereby obtain an intermediate polyester. The thus-obtained intermediate polyester was found to have a number average molecular weight (Mn) of 2,200, a weight average molecular weight (Mw) of 9,400, a glass transition temperature (Tg) of 53° C., an acid value of 0.4 mgKOH/g, and a hydroxyl group value of 55 mgKOH/g.

Subsequently, into a reaction vessel equipped with a condenser, a stirrer, and a nitrogen-introducing tube, 411 parts by mass of the intermediate polyester, 86 parts by mass of isophorone diisocyanate, and 500 parts by mass of ethyl acetate were charged, allowing the resultant mixture to react for 8 hours at 100° C. to thereby synthesize a prepolymer (i.e., a polymer reactive with an active hydrogen group-containing compound). The prepolymer thus obtained was found to have a free isocyanate content of 1.53% by mass.

—Synthesis of Ketimine (the Above Active Hydrogen Group-Containing Compound)—

A reaction vessel equipped with a stirring rod and a thermometer was charged with isophorone diamine (170 parts by mass) and methyl ethyl ketone (75 parts by mass), followed by reaction at 50° C. for 5 hours, to thereby produce a ketimine compound (the above active hydrogen group-containing compound). The amine value of the ketimine compound (the above active hydrogen group-containing compound) was found to be 418. A reaction vessel was charged with the organic solvent phase (749 parts by mass), the prepolymer (115 parts by mass), the ketimine compound (2.9 parts by mass) and a tertially amine compound ("U-CAT660M," product of San-Apro Ltd.) (3.5 parts by mass), and mixed with a TK homomixer (product of Tokushu Kika Kogyo Co., Ltd.) at 7.5 m/s for 1 min, to thereby prepare a solution or dispersion liquid of toner materials.

—Preparation of Aqueous Medium Phase—

Water (990 parts by mass), a 48.5% by mass aqueous solution of sodium dodecyldiphenyl ether disulfonate (ELEMINOL MON-7, product of Sanyo Chemical Industries Ltd.) (45 parts by mass) and ethyl acetate (90 parts by mass) were mixed together and stirred to obtain an opaque white liquid (aqueous medium phase).

—Emulsification/Dispersion—

The aqueous medium phase (1,200 parts by mass) was added to the solution or dispersion liquid of the toner materials. The resultant mixture was mixed using a TK homomixer (product of Tokushu Kika Kogyo Co., Ltd.) at a circumferential speed of 15 m/s for 20 min, to thereby prepare an oil-in-water dispersion liquid (emulsified slurry). The particle diameter (Mv) of the dispersion particles in the oil-in-water dispersion liquid (emulsified slurry) was measured using a particle size distribution analyzer ("NANOTRAC UPA-150EX," product of NIKKISO CO., LTD.) and was found to be 0.40 μm.

<Toner Granulation Step>

—Control of Particle Diameter of Dispersion Particles—

While the oil-in-water dispersion liquid (emulsified slurry) was being stirred at a circumferential speed of 0.7 m/s using a paddle-type stirring device, the fine organic resin particle dispersion liquid (1) was added to the oil-in-water dispersion liquid in an amount of 4 parts by mass per 100 parts by mass of the solid content of the oil-in-water dispersion liquid. Then, 20% by mass solution of sodium dodecylbenzenesulfonate ("NEOGEN SC-A," product of Daiichi Kogyo Seiyaku Co.) (10 parts by mass) was added to the resultant mixture to control the particle diameter of the dispersion particles in the emulsified slurry. The particle diameter of the dispersion particles was measured with the above particle size distribution analyzer ("NANOTRAC UPA-150EX," product of NIKKISO CO., LTD.) and was found to be 5.2 μm.

—Removal of Organic Solvent—

The emulsified slurry controlled in particle diameter was added to a reaction vessel to which a stirrer and a thermometer had been set, followed by desolvating at 30° C. for 8 hours and then aging at 45° C. for 4 hours, to thereby obtain a dispersion slurry.

—Washing/Drying—

The dispersion slurry (100 parts by mass) was filtrated under reduced pressure. Ion-exchanged water (100 parts by mass) was added to the filtration cake, followed by mixing with a TK homomixer (rotation speed: 10.0 m/s for 10 min) and then filtration. Next, ion-exchanged water (100 parts by mass) was added to the obtained filtration cake, followed by mixing with a TK homomixer (rotation speed: 10.0 m/s for 10 min) and then filtration. Next, 10% by mass hydrochloric acid solution (100 parts by mass) was added to the obtained filtration cake, followed by mixing with a TK homomixer (rotation speed: 10.0 m/s for 10 minutes) and then filtration. Next, ion-exchanged water (300 parts) was added to the obtained filtration cake, followed by mixing with a TK homomixer (rotation speed: 10.0 m/s for 10 min) and then filtration. A series of these treatments was performed twice to obtain the final filtration cake. The obtained final filtration cake was dried with an air-circulating drier at 45° C. for 48 hours, and then was caused to pass through a sieve with a mesh size of 75 µm, to thereby obtain tone base particles of Experimental Example 2

—External Addition Treatment—
Using HENSCHEL MIXER (product of Mitsui Mining Co., Ltd.), 1.5 parts by mass of hydrophobic silica and 0.5 parts by mass of hydrophobized titanium oxide, serving as external additives, were mixed with 100 parts by mass of the toner base particles of Experimental Example 2, to thereby produce a toner of Experimental Example 2.

The obtained toner of Experimental Example 2 was found to have a number average particle diameter (Dn) of 5.1 µm. The produced toner of Experimental Example 2 was added to the above-obtained foreign matter (50 g) so that the total mass became 1,000 g, to thereby obtain powder. The thus-obtained powder was sieved using the sieving device of Example 2. Notably, the blade 131 was rotated at 3,000 rpm. Thereafter, the proportion of the foreign matter in the toner before or after sieving and the number average particle diameter of the toner were measured in the same manner as in Experimental Example 1. The results are shown in Table 1.

Experimental Example 3

Into a reaction vessel to which a stirring rod and a thermometer had been set, 683 parts by mass of water, 11 parts by mass of sodium salt of sulfuric acid ester of ethylene oxide adduct of methacrylic acid ("ELEMINOL RS-30," product of Sanyo Chemical Industries Ltd.), 83 parts by mass of styrene, 83 parts by mass of methacrylic acid, 110 parts by mass of butyl acrylate and 1 part by mss of ammonium persulfate were charged, and then stirred at 400 rpm for 15 min to thereby obtain a white emulsion. The resultant emulsion was heated to a system temperature of 75° C. and was allowed to react for 5 hours. Then, 30 parts by mass of a 1% by mass aqueous ammonium persulfate solution was added thereto, followed by aging at 75° C. for 5 hours, to thereby obtain an aqueous dispersion liquid [fine resin particle dispersion liquid 1] of a vinyl resin (a copolymer of styrene-methacrylic acid-sodium salt of sulfuric acid ester of ethylene oxide adduct of methacrylic acid).

The volume average particle diameter of the [fine resin particle dispersion liquid 1] was found to be 105 nm, when measured using a particle size distribution analyzer (LA-920, product of Horiba, Ltd.). Part of the [fine resin particle dispersion liquid 1] was dried to isolate the resin. The isolated resin was found to have a glass transition temperature (Tg) of 59° C. and a weight average molecular weight of 150,000.
—Production Example of Polyester—
Into a reaction vessel equipped with a condenser, a stirrer, and a nitrogen-introducing tube, 66 parts by mass of bisphenol A ethyleneoxide (2 mol) adduct, 535 parts by mass of bisphenol A propyrenoxide (2 mol) adduct, 231 parts by mass of terephthalic acid, and 41 parts by mass of isophthalic acid were charged, allowing the resultant mixture to undergo condensation reaction for 10 hours at 210° C. under normal pressure and nitrogen flow. Subsequently, salicylic acid (127 parts by mass) was added to the reaction mixture and allowed to undergo condensation reaction for another 5 hours at 210° C. While being dehydrated, the reaction mixture was allowed to undergo condensation reaction for another 5 hours at a reduced pressure of 0 mmHg to 15 mmHg, followed by cooling, to thereby produce [polyester 1]. The thus-obtained polyester resin was found to have a weight average molecular weight of 3,800 in the THF soluble matter, an acid value of 19 mgKOH/g, a hydroxyl group value of 55 mgKOH/g, where the hydroxyl group value of the phenolic hydroxyl group: 50 mgKOH/g, and a glass transition temperature of 53° C.
—Production of Prepolymer—
Into a reaction vessel equipped with a condenser, a stirrer, and a nitrogen-introducing tube, 795 parts by mass of bisphenol A ethyleneoxide (2 mol) adduct, 200 parts by mass of isophthalic acid, 65 parts by mass of terephthalic acid, and 2 parts by mass of dibutyltin oxide were charged, allowing the resultant mixture to undergo condensation react for 8 hours at 210° C. under normal pressure and nitrogen flow. Subsequently, while being dehydrated, the reaction mixture was allowed to undergo condensation reaction for another 5 hours at a reduced pressure of 10 mmHg to 15 mmHg, followed by cooling to 80° C. The reaction mixture was allowed to react with isophoron diisocyanate (170 parts by mass) for 2 hours in ethyl acetate to thereby obtain [prepolymer 1]. In the [prepolymer 1], the weight average molecular weight was found to be 5,000 and the average number of functional groups was found to be 2.25.
—Production of Ketimine Compound—
A reaction vessel equipped with a stirring rod and a thermometer was charged with isophorone diamine (30 parts by mass) and methyl ethyl ketone (70 parts by mass), followed by reaction at 50° C. for 5 hours, to thereby produce [ketimine compound 1].
—Preparation of Dispersion Liquid—
A beaker was charged with the [prepolymer 1] (33 parts by mass), the [polyester 1] (132 parts by mass) and ethyl acetate (80 parts by mass), followed by stirring for dissolution. Separately, carnauba wax (15 parts by mass), serving as a releasing agent, carbon black (20 parts by mass) and ethyl acetate (120 parts by mass) were added to a bead mill where they were dispersed for 30 min. The obtained two liquids were mixed together and stirred with a TK homomixer at 12,000 rpm for 5 min. The resultant mixture was subjected to dispersion treatment with a bead mill for 10 min to thereby obtain [toner material oily dispersion liquid 1].
—Production of Toner—
A beaker was charged with ion-exchanged water (529.5 parts by mass), the [fine resin particle dispersion liquid 1] (70 parts by mass) and sodum dodecylbenzenesulfonate (0.5 parts by mass). While the resultant aqueous dispersion liquid was being stirred with a TK homomixer at 12,000 rpm, the [toner material oily dispersion liquid 1] (400 parts by mass) and the [ketimine compound 1] (8.4 parts by mass) were added thereto, followed by reaction for 30 min under stirring. Subsequently, the reaction mixture was placed to a flask equipped with a condenser and aged using a hot-water bath.

After the organic solvent had been removed from the aged dispersion liquid, the resultant dispersion liquid was subjected to filtration, washing, drying and pneumatic classification, to thereby obtain spherical toner base particles. The obtained toner base particles (100 parts by mass) and a charge controlling agent (product of Orient Chemical Industries, Ltd., BONTRON E-84) (0.25 parts by mass) were charged to and mixed together in a Q-type mixer (product of Mitsui Mining Co., Ltd.) where the circumferential speed of the turbine-driven impellor had been set to 50 m/sec.

In this mixing treatment, a cycle of 2-min operation and 1-min suspension was performed five times, so that the total treatment time became 10 min. Furthermore, hydrophobic silica (H2000, product of Clariant Japan Co.) (0.5 parts by mass) was added to the resultant mixture, followed by being subjected to mixing treatment. In this mixing treatment, a cycle of 30-sec mixing and 1-min suspension was performed five times with the circumferential speed set to 15 m/sec. Through the above procedure, a toner of Experimental Example 3 was obtained. The obtained toner of Experimental Example 3 was found to have a number average particle diameter (Dn) of 5.5 μm.

The produced toner of Experimental Example 3 was added to the above-obtained foreign matter (50 g) so that the total mass became 1,000 g, to thereby obtain powder. The thus-obtained powder was sieved using the sieving device of Example 3. Notably, the blade 131 was rotated at 1,500 rpm. Thereafter, the proportion of the foreign matter in the toner before or after sieving and the number average particle diameter of the toner were measured in the same manner as in Experimental Example 1. The results are shown in Table 1.

Experimental Example 4

The procedure of Experimental Example 3 was repeated, except that the sieving device of Example 3 was changed to the sieving device of Example 4 and the rotation speed of the blade 131 was changed from 1,500 rpm to 1,000 rpm, to thereby sieve powder. Thereafter, the proportion of the foreign matter in the toner before or after sieving and the number average particle diameter of the toner were measured in the same manner as in Experimental Example 1. The results are shown in Table 1.

TABLE 1

|  | Experimental Ex. 1 | Experimental Ex. 2 | Experimental Ex. 3 | Experimental Ex. 4 |
|---|---|---|---|---|
| Sieving device for powder | Ex. 1 | Ex. 2 | Ex. 3 | Ex. 4 |
| Foreign matter in the toner before sieving A (g/100 g) | 5 |  | 5 |  |
| Mass of foreign matter and toner on the filter before sieving B (g) |  | 0 |  | 0 |
| Mass of toner after sieving C (g) | 93 | 94 | 93 | 91 |
| Mass of foreign matter and toner on the filter after sieving D (g) | 7 | 6 | 7 | 9 |
| Foreign matter in toner after sieving E (g/C (g)) | 0 | 0 | 0 | 0 |
| Number average particle diameter of toner (μm) | 6.0 | 5.1 | 5.5 | 5.5 |

Example 1B

In Example 1B, there was used the powder-charging system 1 containing the powder-charging device 100 illustrated in FIG. 37 and the powder-supplying device 200 illustrated in FIG. 39. The powder-charging device 100 in Example 1B has a frame 121 provided with a supply portion 121a, a filter 122 disposed at the powder-discharged side of a sieve main body 120, and a rotator 130 equipped with at least a blade 131.

A toner is supplied to the sieve main body 120 which is hollow cylindrical. The material of the frame 121 is stainless steel (SUS). The size of the frame 121 is 135 mm×135 mm×186 mm. The interior volume thereof is 2,661 mL. The blade-driving motor 141 in FIG. 37 is driven to rotate the rotator 130 equipped with the blade 131. The specification of the blade-driving motor 141 is as follows.

Power: 60 W
Rated torque: 0.2 N·m
Rated rotation speed: 3,000 r/min (maximum: 4,000 r/min)

The filter 122 is disposed at the toner-discharged side of the frame 121. The filter 122 in Example 1B is made of stainless steel. The filter 122 has an opening size of 48 μm and an opening ratio of 33.6%

The sieve main body 120 is provided at the central portion with the rotator 130 having at least the blade 131 so as to be rotatable in the direction indicated by arrow E in FIG. 4. The rotator 130 has the blade 131 and a shaft 132 connected with the blade 131. The shaft 132 is rotatably connected with the blade-driving motor 141. In Example 1B, the blade 131 and the shaft 132 are made of stainless steel, the thickness of the blade 131 is 1.5 mm, the number of the blades 131 is two, and the angle formed between the blade 131 and the filter 122 is 0°.

As illustrated in FIG. 38, the blade 131 is rotatably disposed in close proximity to and above the toner-charged surface of the filter 122. In Example 1B, the distance between the blade 131 and the filter 122: D1 (see FIG. 2) is 2 mm. Also, the distance of the frame 121 and each of the end portions of the blade 131: D2 (see FIG. 2) is 2.5 mm. The powder-charging container 40 used in Example 1B was a 500-cc measuring cylinder.

The powder-housing unit 212 of the powder-supplying device 200 used was an acrylic resin cylinder 200 mm in diameter and 500 mm in height the top and bottom portions of which are sandwiched between stainless steel flanges fixed together by a bolt. The stainless steel flange provided on the top of the acrylic resin cylinder is provided with a powder-charging port 211, a pressure release valve 213 and a powder-flow-rate-adjusting valve 214. A gas-permeating unit 226 used was a panel made of sintered resin (product name: FILTEREN). In Example 1B, oil-free dry air having a dew point of −10° C. under atmospheric pressure was used, and its air flow rate was adjusted based on the measurement result of the air flow rate meter 224 (FLOW CELL FLOW METER (product name)) to feed air at 2 L/min. The powder-discharging tube 231 used was a stainless steel tube. The powder-transporting tube 232 used was a urethane tube having an inner diameter of 6 mm.

Example 2B

A powder-charging system 1 of Example 2B was produced in the same manner as in Example 1B, except that the material of the frame 121 of the sieve main body 120 is an acrylic resin, the size of the frame 121 is 135 mm×135 mm×186 mm, the interior volume of the sieve main body 120 is 2,661 mL, the filter 122 is made of polyester and has an opening size of 48 μm and an opening ratio of 34%, the blade 131 is made of stainless steel and has a thickness of 3.0 mm, and D1=5.0 mm, D2=17.5 mm.

Example 3B

A powder-charging system 1 of Example 3B was produced in the same manner as in Example 1B, except that the material of the frame 121 of the sieve main body 120 is SUS, the size of the frame 121 is 100 mm×100 mm×186 mm, the interior volume of the sieve main body 120 is 1,460 mL, the filter 122 is made of stainless steel and has an opening size of 43 μm and an opening ratio of 34.7% (#350), the blade 131 is made of stainless steel and has a thickness of 3.0 mm, D1=2.0 mm, and D2=10.0 mm.

Example 4B

A powder-charging system 1 of Example 4B was produced in the same manner as in Example 1B, except that the material of the frame 121 of the sieve main body 120 is an acrylic resin, the size of the frame 121 is 135 mm×135 mm×300 mm, the interior volume of the sieve main body 120 is 4,292 mL, the filter 122 is made of polyester and has an opening size of 37 nm and an opening ratio of 26%, the blade 131 is made of nylon and has a thickness of 1.5 mm, and D1=2.0 mm, D2=2.5 mm.

Next, in the same manner as in Experimental Examples 1 to 4, foreign matter-containing powder (toner) used in Experimental Examples 1B to 4B were produced and used in a sieving experiment using each powder-charging device of the present Example.

Experimental Example 1B

—Production of Toner—

Foreign matter-containing powder (toner) used in Experimental Example 1B was obtained in the same manner as in Experimental Example 1.

[Test for Charge Accuracy]

A powder-charging balance 53 was used to measure tare by mass of the powder-charged container 40 (500 ml-measuring cylinder) containing no powder. Next, the sieve main body 120 of the powder-charging device 100 was charged with 200 g of powder of Experimental Example 1B. Next, the blade-driving motor 141 was driven to rotate the blade 131 at 500 r/min, to initiate charging of the powder to the powder-charged container 40. When the mass measured by the powder-charging balance 53 reached a value of the tare plus 100 g, the operation of the blade-driving motor 141 was terminated. Thereafter, the mass of the powder-charged container 40 was measured with the powder-charging balance 53. This charging with rotating the blade was performed five times every 100 g. The tare and 500 g were subtracted from the sum of the obtained five measurements, and the obtained value was used as an index of charge accuracy. The calculated values are shown in Table 2. Notably, the closer the index of charge accuracy is to 0 g, the better the charge accuracy is. In addition, the time required that the powder charging was terminated after the termination of the operation of the blade-driving motor 141 (i.e., termination time) was determined based on the measurement obtained by the powder-charging balance 53. The termination times are shown in Table 2.

Experimental Example 2B

A toner of Experimental Example 2B was produced in the same manner as in Experimental Example 2. The obtained toner was found to have a number average particle diameter (Dn) of 5.1 μm. Then, the procedure of Experimental Example 1B was repeated, except that the powder-charging device 100 of Example 2B and the toner of Experimental Example 2B were used, to thereby calculate an index of charge accuracy and termination time. The results are shown in Table 2.

Experimental Example 3B

A toner of Experimental Example 3B was produced in the same manner as in Experimental Example 3. The obtained toner of Experimental Example 3B was found to have a number average particle diameter (Dn) of 5.5 μm.

The thus-produced toner of Experimental Example 3B was added to 50 g of the foreign matter produced in Experimental Example 1 so that the total mass became 1,000 g, to thereby produce powder. Then, the procedure of Experimental Example 1B was repeated, except that the powder-charging device 100 of Example 3B and the powder of Experimental Example 3B were used, to thereby calculate an index of charge accuracy and termination time. The results are shown in Table 2.

Experimental Example 4B

The procedure of Experimental Example 3B was repeated, except that the sieving device of Example 3B was changed to the sieving device of Example 4B, to thereby calculate an index of charge accuracy and termination time. The results are shown in Table 2.

TABLE 2

| | Powder-charging system | Index of charge accuracy (g) | Termination time (s) |
| --- | --- | --- | --- |
| Experimental Ex. 1B | Ex. 1B | 1.1 | 2.9 |
| Experimental Ex. 2B | Ex. 2B | 1.2 | 2.5 |
| Experimental Ex. 3B | Ex. 3B | 0.7 | 3.7 |
| Experimental Ex. 4B | Ex. 4B | 0.9 | 3.3 |

As is clear from the calculation results of indices of charge accuracy, the powder-charging device 100 can charge powder into the powder-charged container 40 with short termination time and quite small error. When the ultrasonic sieve is used to charge powder, the filter is vibrated through inertia even after termination of the apparatus, so that charging of powder to the powder-charged container is not terminated. As a result, the termination time and error in charged amount become large.

Aspects of the present invention are as follows.

<1> A sieving device including:
a hollow cylindrical body;
a filter disposed at a bottom portion of the hollow cylindrical body; and
a blade configured to rotate in close proximity to the filter around a rotation axis thereof crossing the filter to thereby stir powder supplied to the hollow cylindrical body.

<2> The sieving device according to <1>, wherein a length of the blade in a direction along the rotation axis is shorter than a length of the blade in a direction in which the blade is rotated.

<3> The sieving device according to <1> or <2>, wherein a distance between the blade and the filter is 5 mm or less.

<4> The sieving device according to any one of <1> to <3>, further including a shaft, wherein the shaft is disposed at the rotation axis, and the blade is attached to the shaft.

<5> The sieving device according to any one of <1> to <4>, wherein an end of the blade is in close proximity to the hollow cylindrical body.

<6> The sieving device according to any one of <1> to <5>, further including a powder discharge portion, wherein the powder discharge portion is provided in the hollow cylindrical body and wherein the powder discharge portion is configured to discharge an extra amount of the powder from the hollow cylindrical body when the powder supplied to the hollow cylindrical body exceeds a predetermined amount.

<7> The sieving device according to any one of <1> to <6>, wherein the powder is toner.

<8> A sieving system including:
the sieving device according to any one of <1> to <7>; and
a powder-supplying device configured to supply powder to the sieving device.

<9> A sieving method including:
supplying powder to a sieving device including a hollow cylindrical body, a filter disposed at a bottom portion of the hollow cylindrical body, and a blade; and
rotating the blade in close proximity to the filter around a rotation axis thereof crossing the filter to thereby stir the powder supplied to the sieving device.

<10> A sieving device for developing device including:
a sieve main body including a hollow cylindrical body, a filter disposed at a bottom portion of the hollow cylindrical body, and a blade configured to rotate in close proximity to the filter around a rotation axis thereof crossing the filter to thereby stir toner supplied to the hollow cylindrical body; and
a feeding unit connected to a developing device for developing a latent electrostatic image and configured to feed, to the developing device, the toner which has passed through the filter by rotation of the blade.

<11> The sieving device for developing device according to <10>, wherein the feeding unit is a nozzle.

<12> The sieving device for developing device according to <10> or <11>, further including a recovering door which allows an opening for recovering the toner to be open or closed, wherein the recovering door is provided in the hollow cylindrical body.

<13> A developing unit including:
the sieving device for developing device according to any one of <10> to <13>, and
a developing device configured to develop a latent electrostatic image with the toner which has passed through the filter by rotation of the blade.

<14> The developing unit according to <13>, further including a supplying device configured to supply the toner to the sieving device for developing device.

<15> An image forming apparatus including:
the developing unit according to <13> or <14>;
a transfer unit configured to transfer a toner image developed with the developing unit to a recording medium; and
a fixing unit configured to fix the transferred toner image on the recording medium.

<16> A developing method including:
supplying toner to a sieve main body including a hollow cylindrical body, a filter disposed at a bottom portion of the hollow cylindrical body, and a blade;
rotating the blade in close proximity to the filter around a rotation axis thereof crossing the filter to thereby stir the toner supplied to the sieve main body; and
developing a latent electrostatic image with the toner which has passed through the filter by rotation of the blade.

<17> The developing method according to <16>, further including rotating the blade prior to the supplying the toner.

<18> A powder-charging device including:
a sieve main body including a hollow cylindrical body, a filter disposed at a bottom portion of the hollow cylindrical body, and a blade configured to rotate in close proximity to the filter around a rotation axis thereof crossing the filter to thereby stir powder supplied to the hollow cylindrical body; and
a feeding unit configured to feed, to a predetermined container, the powder which has passed through the filter by rotation of the blade.

<19> The powder-charging device according to <18>, further including a discharge portion, wherein the discharge portion is provided in the hollow cylindrical body and wherein the discharge portion is configured to discharge an extra amount of the powder from the hollow cylindrical body when the powder supplied to the hollow cylindrical body exceeds a predetermined amount.

<20> The powder-charging device according to <18> or <19>, further including a first gas-introducing unit, wherein the first gas-introducing unit is configured to introduce gas from outside to inside of the sieve main body through the filter.

<21> The powder-charging device according to any one of <18> to <20>, further including a recovering door which allows an opening for recovering the powder contained in the sieve main body to be open or closed, wherein the recovering door is provided in the hollow cylindrical body.

<22> A powder-charging system including:
the powder-charging device according to any one of <18> to <21>;
a powder-supplying device configured to supply powder to the powder-charging device;
a control device including a drive control unit configured to control rotation of the blade of the powder-charging device and a supply control unit configured to control supply of the powder from the powder-supplying device to the powder-charging device.

<23> The powder-charging system according to <22>, wherein upon termination of charging of the powder, the supply control unit terminates the supply of the powder and then the drive control unit terminates the rotation of the blade.

<24> The powder-charging system according to <22> or <23>, further including a measuring device, wherein the measuring device measures a mass of the powder charged by the powder-charging device, wherein the control device further includes a notification unit configured to notify predetermined information based on a charging rate of the powder calculated from a measurement result obtained by the measuring device.

<25> The powder-charging system according to any one of <22> to <24>, wherein the powder-supplying device further includes:
a housing unit configured to house the powder;
a second gas-introducing unit configured to introduce gas to the powder housed in the housing unit;
a transporting unit configured to transport to the powder-charging device the powder fluidized by the gas introduced with the second gas-introducing unit.

<26> A powder-charging method including:
supplying powder to a sieve main body including a hollow cylindrical body, a filter disposed at a bottom portion of the hollow cylindrical body, and a blade;
rotating the blade in close proximity to the filter around a rotation axis thereof crossing the filter to thereby stir the powder supplied to the sieve main body; and
charging to a predetermined container the powder which has passed through the filter by rotation of the blade.

This application claims priority to Japanese application No. 2011-059483, filed on Mar. 17, 2011, and incorporated herein by reference.

What is claimed is:
1. A sieving device comprising:
a hollow cylindrical body;
a filter disposed at only a bottom portion of the hollow cylindrical body;

a blade configured to rotate in close proximity to the filter around a rotation axis thereof crossing the filter to thereby stir powder supplied to the hollow cylindrical body;

a driving unit configured to drive the rotation of the blade; and a shaft disposed at, and aligned with, the rotation axis, wherein the blade is attached to only a bottom end portion of the shaft, the shaft is not in contact with the bottom portion of the hollow cylindrical body, and the driving unit drives the rotation of the blade at a rotational speed of 3 m/s or more.

2. The sieving device according to claim 1, wherein a length of the blade in a direction along the rotation axis is shorter than a length of the blade in a direction in which the blade rotates.

3. The sieving device according to claim 1, wherein a distance between the blade and the filter is 5 mm or less.

4. The sieving device according to claim 1, wherein an end of the blade is in close proximity to the hollow cylindrical body.

5. The sieving device according to claim 1, further comprising a powder discharge portion, wherein the powder discharge portion is provided in the hollow cylindrical body and wherein the powder discharge portion is configured to discharge an extra amount of the powder from the hollow cylindrical body when the powder supplied to the hollow cylindrical body exceeds a predetermined amount.

6. The sieving device according to claim 1, wherein the powder is toner.

7. A sieving device for developing device comprising:

a sieve main body comprising a hollow cylindrical body, a filter disposed at only a bottom portion of the hollow cylindrical body, and a blade configured to rotate in close proximity to the filter around a rotation axis thereof crossing the filter to thereby stir toner supplied to the hollow cylindrical body;

a feeding unit connected to a developing device for developing a latent electrostatic image and configured to feed, to the developing device, the toner which has passed through the filter by rotation of the blade; and a shaft disposed at, and aligned with, the rotation axis, wherein the blade is attached to only a bottom end portion of the shaft, and the shaft is not in contact with the bottom portion of the hollow cylindrical body.

8. The sieving device for developing device according to claim 7, wherein the feeding unit is a nozzle.

9. The sieving device according to claim 7, wherein a length of the blade in a direction along the rotation axis is shorter than a length of the blade in a direction in which the blade rotates.

10. The sieving device according to claim 7, wherein a distance between the blade and the filter is 5 mm or less.

11. The sieving device according to claim 7, wherein an end of the blade is in close proximity to the hollow cylindrical body.

12. A powder-charging device comprising:

a sieve main body comprising a hollow cylindrical body, a filter disposed at only a bottom portion of the hollow cylindrical body, and a blade configured to rotate in close proximity to the filter around a rotation axis thereof crossing the filter to thereby stir powder supplied to the hollow cylindrical body;

a feeding unit configured to feed, to a predetermined container, the powder which has passed through the filter by rotation of the blade;

a driving unit configured to drive the rotation of the blade; and a shaft disposed at, and aligned with, the rotation axis, wherein the blade is attached to only a bottom end portion of the shaft, the shaft is not in contact with the bottom portion of the hollow cylindrical body, and the driving unit drives the rotation of the blade at a rotational speed of 3 m/s or more.

13. The powder-charging device according to claim 12, further comprising a first gas-introducing unit, wherein the first gas-introducing unit is configured to introduce gas from outside to inside of the sieve main body through the filter.

* * * * *